US012698864B2

(12) United States Patent
Heo et al.

(10) Patent No.: US 12,698,864 B2
(45) Date of Patent: Aug. 4, 2026

(54) LIQUEFIED GAS STORAGE TANK AND SHIP COMPRISING SAME

(71) Applicant: HYUNDAI HEAVY INDUSTRIES CO., LTD., Ulsan (KR)

(72) Inventors: Won Seok Heo, Ulsan (KR); Seong Bo Park, Ulsan (KR); Hye Min Cho, Ulsan (KR); Ki Joong Kim, Ulsan (KR); Cheon Jin Park, Ulsan (KR); Min Kyu Park, Ulsan (KR); Jung Kyu Park, Ulsan (KR); Byeong Jin Jeong, Ulsan (KR); Dong Woo Kim, Ulsan (KR); Sung Kyu Hong, Ulsan (KR); Gwang Soo Go, Ulsan (KR); Jee Yeon Heo, Ulsan (KR)

(73) Assignee: HYUNDAI HEAVY INDUSTRIES CO., LTD., Ulsan (KR)

( * ) Notice: Subject to any disclaimer, the term of this patent is extended or adjusted under 35 U.S.C. 154(b) by 230 days.

(21) Appl. No.: 18/257,013

(22) PCT Filed: Dec. 14, 2021

(86) PCT No.: PCT/KR2021/018985
§ 371 (c)(1),
(2) Date: Jun. 12, 2023

(87) PCT Pub. No.: WO2022/131755
PCT Pub. Date: Jun. 23, 2022

(65) Prior Publication Data

US 2024/0133519 A1 Apr. 25, 2024
US 2024/0230030 A9 Jul. 11, 2024

(30) Foreign Application Priority Data

Dec. 14, 2020 (KR) ........................ 10-2020-0174789
Apr. 8, 2021 (KR) ........................ 10-2021-0046140
(Continued)

(51) Int. Cl.
*F17C 3/02* (2006.01)
*B63B 25/14* (2006.01)

(52) U.S. Cl.
CPC .............. *F17C 3/027* (2013.01); *B63B 25/14* (2013.01); *F17C 2203/0358* (2013.01);
(Continued)

(58) Field of Classification Search
CPC .............. F17C 3/027; F17C 2203/0358; F17C 2203/0631; F17C 2203/0634;
(Continued)

(56) References Cited

U.S. PATENT DOCUMENTS

2016/0252210 A1 9/2016 Bougault et al.
2017/0158291 A1 6/2017 Heo
2017/0276295 A1 9/2017 Herry et al.

FOREIGN PATENT DOCUMENTS

CN 107923574 A 4/2018
FR 2987099 A1 * 8/2013 .............. F17C 3/027
(Continued)

OTHER PUBLICATIONS

Office Action for the Korean Patent Application No. 10-2022-0042540 issued by the Korean Intellectual Property Office on Oct. 6, 2023.
(Continued)

*Primary Examiner* — Orlando E Aviles
*Assistant Examiner* — Niki M Eloshway
(74) *Attorney, Agent, or Firm* — IP & T GROUP LLP

(57) ABSTRACT

A liquefied gas storage tank includes a corner block disposed on a corner portion, wherein the corner block includes a
(Continued)

lower block, an upper block and an upper connecting block, the upper block includes a first inner fixing unit and a second inner fixing unit respectively provided inside a first surface and a second surface, bonded and connected to a secondary barrier, and each having a structure in which a primary inner plywood, a primary corner insulating material, and a primary outer plywood are stacked, and an inner bent portion installed at a corner spatial portion between the first inner fixing unit and the second inner fixing unit, and both side surfaces of the inner bent portion that are perpendicular to the secondary barrier each have a height reduced from a total height of each of the first and second inner fixing units.

15 Claims, 36 Drawing Sheets

(30) Foreign Application Priority Data

Apr. 9, 2021 (KR) ........................ 10-2021-0046751
Jun. 2, 2021 (KR) ........................ 10-2021-0071792
Nov. 26, 2021 (KR) ........................ 10-2021-0165922

(52) U.S. Cl.
CPC ................ *F17C 2203/0631* (2013.01); *F17C 2203/0634* (2013.01); *F17C 2221/01* (2013.01); *F17C 2221/033* (2013.01); *F17C 2221/035* (2013.01); *F17C 2270/0107* (2013.01)

(58) Field of Classification Search
CPC .......... F17C 2203/2221; F17C 2203/01; F17C 2221/033
USPC ......................................................... 220/4.12
See application file for complete search history.

(56) References Cited

FOREIGN PATENT DOCUMENTS

| | | | | | |
|---|---|---|---|---|---|
| FR | 3073272 | B1 | | 11/2019 | |
| JP | 60-196496 | A | | 10/1985 | |
| JP | 2002-145387 | A | | 5/2002 | |
| JP | 2006-300320 | A | | 11/2006 | |
| JP | 2010-48421 | A | | 3/2010 | |
| JP | 4616279 | B2 | | 1/2011 | |
| JP | 6585635 | B2 | | 10/2019 | |
| JP | 2021011950 | A | | 2/2021 | |
| KR | 10-1997-0005076 | B1 | | 4/1997 | |
| KR | 20-0345090 | | | 3/2004 | |
| KR | 10-0553017 | B1 | | 2/2006 | |
| KR | 10-0568618 | B1 | | 4/2006 | |
| KR | 10-0760481 | B1 | | 9/2007 | |
| KR | 10-0801795 | B1 | | 2/2008 | |
| KR | 10-2008-0097519 | A | | 11/2008 | |
| KR | 10-2010-0022679 | A | | 3/2010 | |
| KR | 10-0972653 | B1 | | 7/2010 | |
| KR | 10-0997363 | B1 | | 11/2010 | |
| KR | 10-1019178 | B1 | | 3/2011 | |
| KR | 10-1055701 | B1 | | 8/2011 | |
| KR | 20110130637 | A | | 12/2011 | |
| KR | 10-1108630 | B1 | | 1/2012 | |
| KR | 20120013227 | A | | 2/2012 | |
| KR | 10-2012-0074441 | A | | 7/2012 | |
| KR | 10-1215629 | B1 | | 12/2012 | |
| KR | 10-2013-0143347 | A | | 12/2013 | |
| KR | 10-1349875 | B1 | | 1/2014 | |
| KR | 20140003357 | A | | 1/2014 | |
| KR | 10-2014-0019458 | A | | 2/2014 | |
| KR | 10-1411540 | B1 | | 6/2014 | |
| KR | 10-1412680 | B1 | | 6/2014 | |
| KR | 10-2015-0142021 | A | | 12/2015 | |
| KR | 10-2016-0033121 | A | | 3/2016 | |
| KR | 10-2016-0035261 | A | | 3/2016 | |
| KR | 20160043162 | A | | 4/2016 | |
| KR | 20160072290 | A | | 6/2016 | |
| KR | 10-1672221 | B1 | | 11/2016 | |
| KR | 10-2016-0141780 | A | | 12/2016 | |
| KR | 10-2017-0022661 | A | | 3/2017 | |
| KR | 20170022661 | A | * | 3/2017 | |
| KR | 10-1739463 | B1 | | 6/2017 | |
| KR | 10-2017-0120862 | A | | 11/2017 | |
| KR | 10-1792479 | B1 | | 11/2017 | |
| KR | 20170137606 | A | | 12/2017 | |
| KR | 10-2018-0007031 | A | | 1/2018 | |
| KR | 10-1837281 | B1 | | 3/2018 | |
| KR | 10-1834291 | B1 | | 4/2018 | |
| KR | 10-2018-0060576 | A | | 6/2018 | |
| KR | 10-2018-0061945 | A | | 6/2018 | |
| KR | 20180061945 | A | * | 6/2018 | |
| KR | 10-2018-0077539 | A | | 7/2018 | |
| KR | 20190011554 | A | | 2/2019 | |
| KR | 10-2019-0022062 | A | | 3/2019 | |
| KR | 10-1959391 | B1 | | 3/2019 | |
| KR | 10-2019-0078547 | A | | 7/2019 | |
| KR | 20190082026 | A | | 7/2019 | |
| KR | 10-1973086 | B1 | | 8/2019 | |
| KR | 10-2011866 | B1 | | 8/2019 | |
| KR | 10-2015919 | B1 | | 8/2019 | |
| KR | 10-2047992 | B1 | | 12/2019 | |
| KR | 10-2020-0012633 | A | | 2/2020 | |
| KR | 10-2060706 | B1 | | 2/2020 | |
| KR | 10-2020-0023483 | A | | 3/2020 | |
| KR | 10-2075975 | B1 | | 3/2020 | |
| KR | 20200021759 | A | | 3/2020 | |
| KR | 10-2020-0046079 | A | | 5/2020 | |
| KR | 10-2020-0051668 | A | | 5/2020 | |
| KR | 10-2020-0055938 | A | | 5/2020 | |
| KR | 20200088360 | A | | 7/2020 | |
| KR | 20200091990 | A | | 8/2020 | |
| KR | 10-2020-0118169 | A | | 10/2020 | |
| KR | 10-2020-0130055 | A | | 11/2020 | |
| KR | 10-2188368 | B1 | | 12/2020 | |
| KR | 20210058055 | A | | 5/2021 | |
| KR | 10-2022-0016428 | A | | 2/2022 | |
| KR | 10-2022-0084974 | A | | 6/2022 | |
| KR | 10-2022-0084977 | A | | 6/2022 | |
| KR | 10-2022-0084979 | A | | 6/2022 | |
| WO | WO-2019012237 | A1 | * | 1/2019 | ............. F17C 3/027 |

OTHER PUBLICATIONS

Office Action for the Korean Patent Application No. 10-2022-0043073 issued by the Korean Intellectual Property Office on Oct. 7, 2023.
Office Action for the Korean Patent Application No. 10-2022-0049130 issued by the Korean Intellectual Property Office on Oct. 10, 2023.
Notice of Allowance for the Korean Patent Application No. 10-2021-0186218 issued by the Korean Patent Office on Sep. 25, 2023.
Office Action for the Korean Patent Application No. 10-2022-0001641 issued by the Korean Patent Office on Aug. 7, 2023.
Office Action for the Korean Patent Application No. 10-2022-0001660 issued by the Korean Patent Office on Aug. 7, 2023.
Office Action for the Korean Patent Application No. 10-2022-0001672 issued by the Korean Patent Office on Aug. 8, 2023.
Office Action for the Korean Patent Application No. 10-2022-0010218 issued by the Korean Patent Office on Aug. 19, 2023.
Office Action for Japanese Patent Application No. 2023-535622 issued by the Japanese Patent Office on Jun. 4, 2024.
Extended European Search Report for the European Patent Application No. 21907059.6 issued by the European Patent Office on Feb. 24, 2025.
Extended European Search Report for the European Patent Application No. 25150019.5 issued by the European Patent Office on May 21, 2025.
Office Action for Chinese Patent Application No. 202180079986.4 issued by the Chinese Patent Office on Jun. 13, 2025.

(56) References Cited

OTHER PUBLICATIONS

Notice of Allowance (=Notification to Grant Patent Right for Invention) for Chinese Patent Application No. 202180079986.4 issued by the Chinese Patent Office on Oct. 20, 2025.

* cited by examiner

| Tensile Stress YY-direction [MPa] | Temperature [°C] |
| --- | --- |
| 37.155 | -57.940 |

| Tensile Stress YY-direction [MPa] | Temperature [°C] |
|---|---|
| 12.084 | -59.025 |

| Tensile Stress YY-direction [MPa] | Temperature [°C] |
|---|---|
| 10.982 | -67.914 |

| Tensile Stress YY-direction [MPa] | Temperature [°C] |
|---|---|
| 12.003 | -64.358 |

| Tensile Stress YY-direction [MPa] | Temperature [°C] |
|---|---|
| 12.084 | -59.025 |

LIQUEFIED GAS STORAGE TANK AND SHIP COMPRISING SAME

CROSS-REFERENCE TO RELATED APPLICATION

This application is a national stage entry of International Patent Application No. PCT/KR2021/018985 filed on Dec. 14, 2021, which claims priorities of Korean Patent Application No. 10-2020-0174789 filed on Dec. 14, 2020, Korean Patent Application No. 10-2021-0046140 filed on Apr. 8, 2021, Korean Patent Application No. 10-2021-0046751 filed on Apr. 9, 2021, Korean Patent Application No. 10-2021-0071792 filed on Jun. 2, 2021, and Korean Patent Application No. 10-2021-0165922 filed on Nov. 26, 2021. The disclosure of each of the foregoing applications is incorporated herein by reference in its entirety

TECHNICAL FIELD

The present invention relates to a liquefied gas storage tank and a vessel including the same.

BACKGROUND ART

Recently, liquefied gases, such as liquefied natural gas (LNG) and liquefied petroleum gas (LPG), have been widely used to replace gasoline or diesel according to technological development.

In addition, a storage tank (so-called "cargo tank") for storing LNG in a cryogenic liquid state is installed in vessels, such as LNG cargo vessels, LNG regasification vessels (RVs), LNG floating, production, storage, and off-loading (FPSO) vessels, and LNG floating storage and regasification units (FSRUs) for transporting or storing the liquefied gases such as LNG at sea.

In addition, boil off gas (BOG) may be generated in the liquefied gas storage tank affected by external heat, and a key technology for designing the liquefied gas storage tank is for reducing a boil off rate (BOR), which is a rate of vaporization of BOG, through an insulation design. In addition, since the liquefied gas storage tank is exposed to various loads such as sloshing, it may be essential to secure a mechanical strength of an insulation panel.

Considering this point, studies are being actively conducted to not only secure the mechanical strength of the insulation panel but also increase insulation performance even in a right angle or obtuse angle corner portion in the liquefied gas storage tank and reduce stresses generated by various loads, such as sloshing, the deformation of a hull, and a temperature change.

Technical Problem

The present invention has been made in efforts to solve the above problem of the related art and is directed to providing a liquefied gas storage tank and a vessel including the same, in which a structure of a corner block is improved, thereby reducing a low-temperature load, sloshing load, and stress load of a secondary corner barrier.

Technical Solution

A liquefied gas storage tank according to one aspect of the present invention includes a corner block that is disposed on a corner portion in which a first surface and a second surface at different angles meet each other and forms a storage space accommodating liquefied gas, wherein the corner block may include a lower block provided inside the first and second surfaces and formed of a single board, an upper block bonded and connected to a secondary barrier of the lower block, and an upper connecting block bonded and connected to the secondary barrier on an upper surface of the lower block disposed adjacent thereto each other to connect the lower blocks, the upper block may include a first inner fixing unit and a second inner fixing unit respectively provided inside the first surface and the second surface, bonded and connected to the secondary barrier, and each having a structure in which a primary inner plywood, a primary corner insulating material, and a primary outer plywood are stacked, and an inner bent portion installed at a corner spatial portion between the first inner fixing unit and the second inner fixing unit, and both side surfaces of the inner bent portion that are perpendicular to the secondary barrier may each have a height reduced from a total height of each of the first and second inner fixing units. The inner bent portion may have first protrusions provided on both side surfaces, and the first protrusion may extend outward from the corner spatial portion as much as a predetermined length from the inner bent portion inserted into the corner spatial portion formed by the first and second inner fixing units, have a cross-sectional shape which is similar to a shape of the inner bent portion and in which a curved portion, which is in contact with the secondary barrier, collinearly extends from a curved portion of the inner bent portion, and form first steps between both side surfaces that are perpendicular to the secondary barrier and both side surfaces of the inner bent portion.

The upper connecting block may include a first corner connecting fixing unit and a second corner connecting fixing unit respectively provided inside the first surface and the second surface, bonded and connected to the secondary barrier, and each having a structure in which a first corner connecting plywood, a corner connecting insulating material, and a second corner connecting plywood are stacked, and a corner connecting bent portion installed in a corner spatial portion between the first corner connecting fixing unit and the second corner connecting fixing unit, wherein both side surfaces of the inner bent portion that are perpendicular to the secondary barrier may each have a height reduced from a total height of each of the first and second corner connecting fixing units, second protrusions may be provided on both side surfaces, and the second protrusion may extend outward from the corner spatial portion as much as a predetermined length from the corner connecting bent portion inserted into the corner spatial portion formed by the first and second corner connecting fixing units, have a cross-sectional shape which is similar to a shape of the corner connecting bent portion and in which a curved portion, which is in contact with the secondary barrier, collinearly extends from a curved portion of the corner connecting bent portion, and extend to form second steps between both side surfaces that are perpendicular to the secondary barrier and both side surfaces of the corner connecting bent portion.

The first and second protrusions may be in contact with each other when the upper connecting block is installed between the adjacent upper blocks, and step spaces are formed between the first and second inner fixing units and the first and second corner connecting fixing units, a stuffing piece may be inserted and installed in the step space, and the stuffing piece may have a positive (+) tolerance to seal the step space and may be formed in a shape corresponding to a shape of the step space.

The first and second inner fixing units may be symmetrically provided with respect to a direction in which the corner portion is equally divided and have first side surfaces that are in close contact with both side surfaces of the inner bent portion and perpendicular to the secondary barrier and second side surfaces that extend from the first side surfaces toward the storage space in the same direction as the direction of the division, the upper block may further include a corner inner packing material inserted and installed in spaces formed between the first side surfaces in close contact with both side surfaces of the inner bent portion and between the second side surfaces facing each other, and the corner inner packing material may be formed to have a positive (+) tolerance to seal the space in a state of being inserted into the space between the second side surfaces.

A liquefied gas storage tank according to another aspect of the present invention includes a corner block that is disposed on a corner portion in which a first surface and a second surface at different angles meet each other and forms a storage space accommodating liquefied gas, wherein the corner block may include a lower block provided inside the first surface and the second surface and formed of a single board, an integrated upper block bonded and connected to a secondary barrier of the lower block and formed of a single board, an upper connecting block bonded and connected to the secondary barrier exposed between the integrated upper blocks disposed adjacent to each other, and a barrier fixing member installed on an upper surface of the integrated upper block and configured to fix a primary barrier, the integrated upper block may include one primary outer plywood provided inside each of the first surface and the second surface and bonded and connected to the secondary barrier, one primary corner insulating material stacked on the primary outer plywood, and one primary inner plywood stacked on the primary corner insulating material, and the barrier fixing member may be formed of a plurality of unit barrier fixing members side by side installed adjacent to each other on the one primary inner plywood.

The integrated upper block may include a plurality of upper slits formed in an upper portion thereof at a predetermined depth, and the plurality of upper slits may pass through the primary inner plywood and may be formed to at least a portion of the primary corner insulating material in order to cope with contraction or expansion stress of the primary corner insulating material, and may be formed at corresponding positions between the plurality of unit barrier fixing members so that the plurality of unit barrier fixing members interlock with contraction or expansion of the primary corner insulating material.

The integrated upper block may include a plurality of upper slits formed in an upper portion thereof at a predetermined depth, and a plurality of lower slits formed in a lower portion thereof at a predetermined depth, wherein the plurality of upper slits and the plurality of lower slits may be formed at positions that are misaligned.

The primary outer plywood may have a plurality of first grooves formed in a lower surface bonded and connected to the secondary barrier, the plurality of first grooves may be formed in a direction perpendicular to a corner side of the storage tank to check a squeeze-out of an adhesive into a non-adhesive region when the primary outer plywood is bonded on the secondary barrier with the adhesive, the non-adhesive region may be provided as a plurality of non-adhesive regions set at intermediate portions in addition to both side edge portions of the primary outer plywood, and each of the plurality of non-adhesive regions may be set at a predetermined distance and width in the direction perpendicular to the corner side of the storage tank and set at a corresponding position between the plurality of unit barrier fixing members.

The plurality of first grooves may be formed along both side boundary portions of the plurality of non-adhesive regions and disposed to be misaligned with the plurality of upper slits.

A liquefied gas storage tank according to still another aspect of the present invention includes a corner block that is disposed on a corner portion in which a first surface and a second surface at different angles meet each other and forms a storage space accommodating liquefied gas, wherein the corner block may include a lower block provided inside the first and second surfaces and formed of a single board, an upper block bonded and connected to a secondary barrier of the lower block, and an upper connecting block bonded and connected to the secondary barrier on an upper surface of the lower block disposed adjacent thereto to connect the lower blocks, the upper connecting block may include a first corner connecting fixing unit and a second corner connecting fixing unit respectively provided inside the first surface and the second surface, bonded and connected to the secondary barrier, and each having a structure in which a first corner connecting plywood, a corner connecting insulating material, and a second corner connecting plywood are stacked, and a corner connecting bent portion installed in a corner spatial portion between the first corner connecting fixing unit and the second corner connecting fixing unit, and both side surfaces of the corner connecting bent portion that are perpendicular to the secondary barrier may each have a height reduced from a total height of each of the first and second corner connecting fixing units.

The corner connecting bent portion may have second protrusions provided on both side surfaces, and the second protrusion may extend outward from the corner spatial portion as much as a predetermined length from the corner connecting bent portion inserted into the corner spatial portion formed by the first and second corner connecting fixing units, have a cross-sectional shape which is similar to a shape of the corner connecting bent portion and in which a curved portion, which is in contact with the secondary barrier, collinearly extends from a curved portion of the corner connecting bent portion, and extend to form second steps between both side surfaces that are perpendicular to the secondary barrier and both side surfaces of the corner connecting bent portion.

The first and second corner connecting fixing units may be symmetrically provided with respect to a direction in which the corner portion is equally divided, and may have first side surfaces that are in close contact with both side surfaces of the corner connecting bent portion and perpendicular to the secondary barrier and second side surfaces that extend from the first side surfaces toward the storage space in the same direction as the direction of the division, the upper connecting block may further include a corner inner packing material inserted and installed in spaces formed between the first side surfaces in close contact with both side surfaces of the corner connecting bent portion and between the second side surfaces facing each other, and the corner inner packing material may be formed to have a positive (+) tolerance to seal the space in a state of being inserted into the space between the second side surfaces.

The second corner connecting plywood may have a second groove formed in a lower surface bonded and connected to the secondary barrier, and the second groove may be formed in a direction horizontal to a corner side of the storage space to check a squeeze-out of an adhesive into a non-adhesive region when the second corner connecting plywood is bonded on the secondary barrier with the adhesive.

The second groove may be formed in a portion adjacent to a rear edge of the second corner connecting plywood to check the squeeze-out of the adhesive into the corner connecting bent portion that is the non-adhesive region.

Advantageous Effects

In a liquefied gas storage tank and a vessel including the same according to the present invention, a structure of a corner block is improved, thereby reducing a low-temperature load, sloshing load, and stress load of a secondary corner barrier.

In addition, in the liquefied gas storage tank and the vessel including the same according to the present invention, by forming first and second inner fixing units for holding a barrier fixing member to which a primary corner barrier is fixed in the corner block, which are made of a component in which plywood is combined with an insulating material of polyurethane foam rather than being made of only the plywood, it is possible to increase insulation performance, reduce a weight, and reduce costs compared to the conventional one made of only the plywood.

In addition, in the liquefied gas storage tank and the vessel including the same according to the present invention, by forming thicknesses of a primary corner insulation wall in the corner block connected to a primary flat insulation wall in a planar block and a secondary corner insulation wall in the corner block connected to a secondary flat insulation wall in the planar block identically or similarly to each other, it is possible to form a relatively thicker primary corner insulation wall (however, the thickness of the secondary corner insulation wall is a thickness at which a mechanical strength can be maintained to a predetermined level) than the conventional one, thereby reducing the low-temperature load and sloshing load of the secondary corner barrier, and it is possible to not only prevent damage to the secondary corner barrier but also reduce the low-temperature load of the secondary corner barrier, thereby preventing brittle fracture of a hull.

In addition, in the liquefied gas storage tank and the vessel including the same according to the present invention, by forming the relatively thicker primary corner insulation wall than the conventional one, it is possible to increase a length of a portion in which the secondary corner barrier is not attached to the secondary corner insulation wall, thereby not only further reducing a probability of the damage to the secondary corner barrier including a corner connecting barrier due to an increase in flexibility of the secondary corner barrier but also easily absorbing the deformation of the hull and further reducing the low-temperature stress in the secondary corner barrier.

In addition, in the liquefied gas storage tank and the vessel including the same according to the present invention, by forming the first inner fixing unit and the second inner fixing unit that are respectively provided inside a first surface and a second surface at different angles and spaced a predetermined distance from each other and providing an inner intermediate fixing unit between the first and second inner fixing units, it is possible to reduce a bent angle of the primary corner barrier by the inner intermediate fixing unit, thereby not only reducing the sloshing load in the primary corner barrier but also increasing a mechanical strength of a corner portion.

In addition, in the liquefied gas storage tank and the vessel including the same according to the present invention, by forming chamfers at corners in which a first outer fixing unit and a second outer fixing unit are respectively fixed to the first surface and the second surface at different angles and face each other and filling the chamfers with low-density polyurethane foam, it is possible to further increase insulation performance of the corner portion by the low-density polyurethane foam.

In addition, in the liquefied gas storage tank and the vessel including the same according to the present invention, by forming steps at the corners in which the first outer fixing unit and the second outer fixing unit are respectively fixed to the first surface and the second surface at different angles and face each other and filling the steps with glass wool, it is possible to increase the flexibility of the secondary corner barrier including the corner connecting barrier formed above the glass wool, thereby further preventing the damage to the secondary corner barrier.

In addition, in the liquefied gas storage tank and the vessel including the same according to the present invention, by forming the first outer fixing unit and the second outer fixing unit that are respectively fixed to the first surface and the second surface at different angles and spaced a predetermined distance from each other and providing an outer intermediate fixing unit between the first and second outer fixing units, it is possible to mitigate contraction or expansion stress caused by temperatures of the outer fixing units by each gap formed between the first outer fixing unit and the outer intermediate fixing unit and between the second outer fixing unit and the outer intermediate fixing unit when compared to one conventional gap, thereby preventing the damage to the secondary corner barrier fixed to the outer fixing units.

In addition, in the liquefied gas storage tank and the vessel including the same according to the present invention, by forming chamfers at the corners in which the first outer fixing unit and the second outer fixing unit are respectively fixed to the first surface and the second surface at different angles and face each other and installing the secondary corner barrier along surfaces of the first and second outer fixing units including the chamfer portions, it is possible to increase a length of a portion in which the secondary corner barrier is bent to protrude to the outside and not attached to the secondary corner insulation wall, thereby not only further reducing the probability of the damage to the secondary corner barrier including the corner connecting barrier due to an increase in the flexibility of the secondary corner barrier but also easily absorbing the deformation of the hull and further reducing the low-temperature stress in the secondary corner barrier.

In addition, in the liquefied gas storage tank and the vessel including the same according to the present invention, by arranging a plurality of the primary corner insulation walls, which includes a primary inner plywood that forms a step with a primary corner insulating material, on the secondary corner insulation wall and forming the adjacent primary corner insulation walls disposed adjacent to each other, it is possible to not only easily handle the installation of the barrier fixing member through a stepped portion between the primary inner plywoods disposed adjacent to each other but also seat a packing material only on the stepped portion, thereby reducing the consumption of the packing material.

In addition, in the liquefied gas storage tank and the vessel including the same according to the present invention, by forming an inner bent portion of the primary corner insulation wall formed of a first inner half bent portion bonded and connected to the first inner fixing unit and a second inner half bent portion bonded and connected to the second inner fixing unit and finishing a space between the first and second inner half bent portions with a corner inner finishing material, it is possible to block heat convection in the inner bent portions and prevent a heat convection phenomenon.

In addition, in the liquefied gas storage tank and the vessel including the same according to the present invention, by reducing a size of the inner bent portion (or the corner connecting bent portion) of the primary corner insulation wall to about half size of the first and second inner fixing units (or the first and second corner connecting fixing units) of the primary corner insulation wall (or the corner connecting insulation wall), it is possible to reduce a space (non-adhesive region between the inner bent portion and the secondary barrier at the corner portion) in which the heat convection is generated in the inner bent portion (or the corner connecting bent portion) as a reduced area due to a change in temperature becomes smaller than the conventional inner bent portion formed at the same height as the first and second inner fixing units, thereby reducing the heat convection phenomenon.

In addition, in the liquefied gas storage tank and the vessel including the same according to the present invention, by reducing the size of the inner bent portion (or the corner connecting bent portion) of the primary corner insulation wall to about half size of the first and second inner fixing units (or the first and second corner connecting fixing units) of the primary corner insulation wall (or the corner connecting insulation wall), it is possible to finish a spatial portion formed between the remaining halves of the first and second inner fixing units (or the first and second corner connecting fixing units) with the corner inner packing material so that the corner inner packing material is inserted into the inner bent portion (or the corner connecting bent portion) at a predetermined depth, thereby further reducing the heat convection phenomenon in the inner bent portion (or the corner connecting bent portion).

In addition, in the liquefied gas storage tank and the vessel including the same according to the present invention, by forming an integrated upper block in which a plurality of unit upper blocks are integrated into one compared to the conventional upper block having the plurality of unit upper blocks side by side disposed adjacent to each other, it is possible to omit a heat convection path generated between the conventional unit upper blocks, thereby reducing the heat convection phenomenon.

In addition, in the liquefied gas storage tank and the vessel including the same according to the present invention, by forming both side surfaces of the inner bent portion having a reduced size and the corner connecting bent portion having a reduced size that have a protruding structure and finishing a space formed by the protruding structures of the inner bent portion and the corner connecting bent portion with a stuffing piece when an upper connecting block is installed between the adjacent integrated upper blocks, it is possible to form the heat convection path that is generated between the integrated upper block and the upper connecting block and has a bent path by the protruding structure and the stuffing piece, thereby reducing the heat convection phenomenon.

In addition, in the liquefied gas storage tank and the vessel including the same according to the present invention, by installing a plurality of unit barrier fixing members on an upper surface of a portion corresponding to each of the plurality of unit upper blocks constituting the conventional upper block in the integrated upper block, forming upper slits in an upper portion of the integrated upper block exposed between the plurality of unit barrier fixing members at a predetermined depth, and forming lower slits in a lower portion of the integrated upper block at a predetermined depth to be alternatively formed with the upper slit, it is possible to mitigate contraction or expansion stress of the integrated upper block by the upper and lower slits. In addition, in the liquefied gas storage tank and the vessel including the same according to the present invention, by forming a plurality of first grooves in the primary outer plywood of the integrated upper block connected to the secondary corner barrier in a direction perpendicular to a corner side of the storage tank and forming the plurality of first grooves in a portion adjacent to both side edges of the primary outer plywood and boundary portions of both sides of a plurality of non-adhesive regions set in an intermediate portion, it is possible to prevent a bonding defect of the integrated upper block having a greater coupling area than the conventional upper block.

In addition, in the liquefied gas storage tank and the vessel including the same according to the present invention, by forming the plurality of first grooves in the primary outer plywood of the integrated upper block, it is possible to check a squeeze-out of an adhesive into the non-adhesive region when the primary outer plywood is bonded and connected to the secondary barrier with the adhesive and prevent the adhesive from overflowing onto the non-adhesive region.

In addition, in the liquefied gas storage tank and the vessel including the same according to the present invention, by forming a second groove in a second corner connecting plywood of the upper connecting block connected to the corner connecting barrier in a direction horizontal to the corner side of the storage tank and forming the second groove in a portion adjacent to a rear edge of the second corner connecting plywood, it is possible to not only directly and visually check the squeeze-out of the adhesive in an adhesive region into the non-adhesive region but also reduce a non-adhesive section of the corner portion as the adhesive is squeezed out and bonded and connected to the non-adhesive section over the second groove, thereby preventing a load applied to the secondary barrier from becoming greater and preventing a bonding defect of the upper connecting block.

MODES OF THE INVENTION

Figure 1:
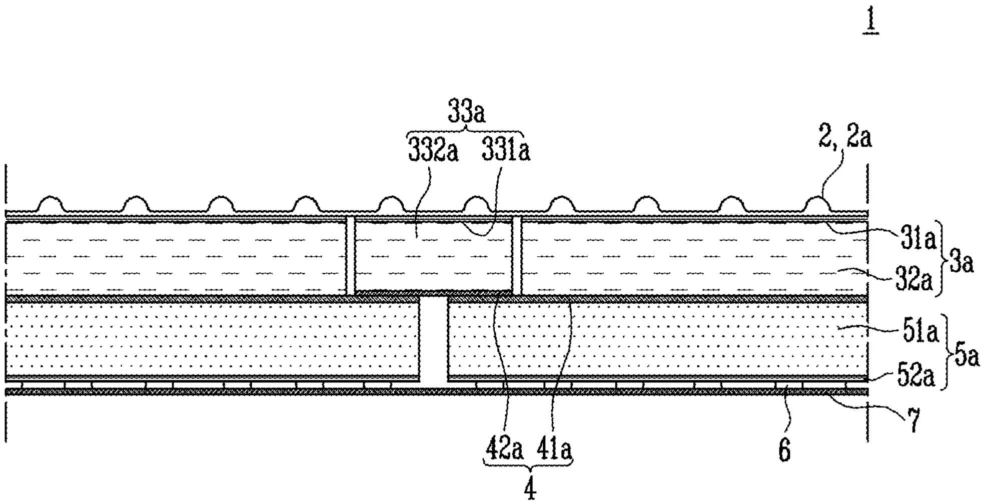
FIG. 1 is a partial cross-sectional view of a planar portion showing a liquefied gas storage tank according to a first embodiment of the present invention.

Objects, specific advantages, and new features of the present invention will become more apparent from the following detailed description and exemplary embodiments associated with the accompanying drawings. In the specification, in adding reference numerals to components of each drawing, it should be noted that the same components have the same numbers as possible even when the components are displayed on different drawings. In addition, in describing the present invention, when it is determined that a detailed description of related known technologies may unnecessarily obscure the subject matter of the present invention, the detailed description thereof will be omitted.

In addition, it should be understood that the accompanying drawings are only for easy understanding of the embodiments disclosed in the specification, and the technical spirit disclosed in the specification is not limited by the accompanying drawings and includes all changes, equivalents, or substitutes included in the spirit and technical scope of the present invention.

In addition, terms including ordinal numbers, such as first and second, may be used to describe various components, but the components are not limited by the terms. These terms are only used for the purpose of distinguishing one component from another.

In addition, it should be noted that among the terms used throughout the specification, the term “outside” refers to an outside of the tank with respect to the liquefied gas storage tank, and the term “inside” refers to an inside of the tank with respect to the liquefied gas storage tank.

Hereinafter, in the specification, liquefied gas may be used as the meaning including all gaseous fuels that are generally stored in a liquid state, such as liquefied natural gas (LNG), liquefied petroleum gas (LPG), ethylene, and ammonia, and liquefied gas in the case of being not in the liquid state by heating or pressurizing may also be expressed as liquefied gas for convenience. Likewise, this may also be applied to boil off gas (BOG). In addition, for convenience, the LNG may be used as the meaning including not only natural gas (NG) in a liquid state but also LNG in a supercritical state, and the BOG may be used as the meaning including not only a BOG in a gaseous state but also liquefied BOG.

Hereinafter, exemplary embodiments of the present invention will be described in detail with reference to the accompanying drawings.

Figure 2:
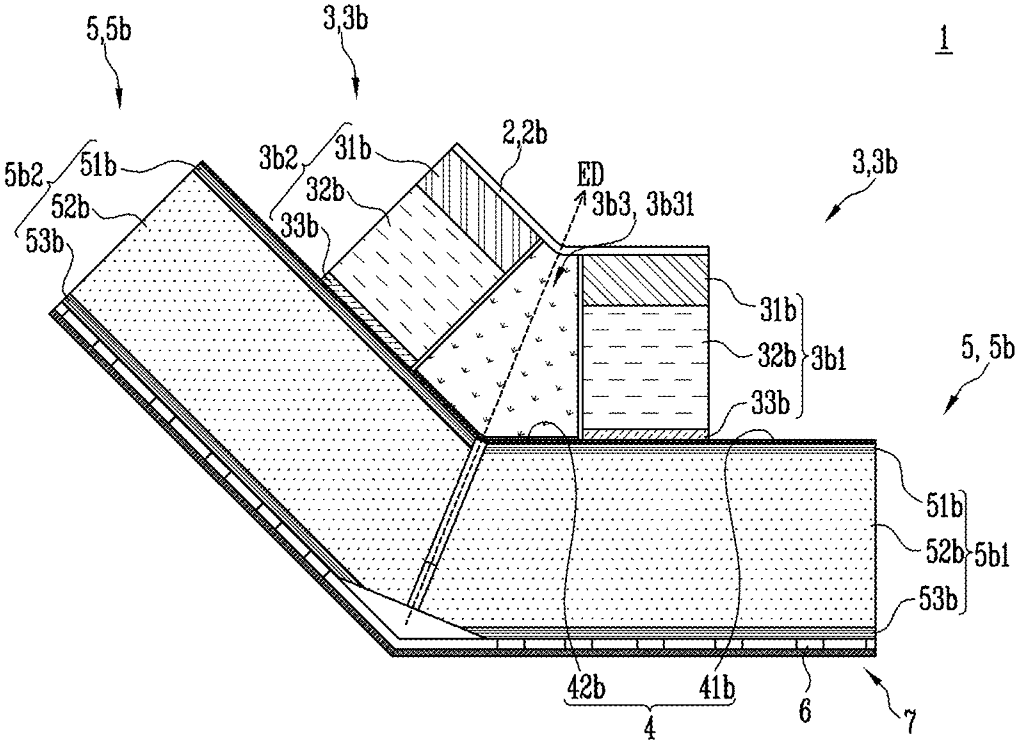
FIG. 2 is a cross-sectional view of a corner portion for describing the liquefied gas storage tank according to the first embodiment of the present invention.
Figure 3:
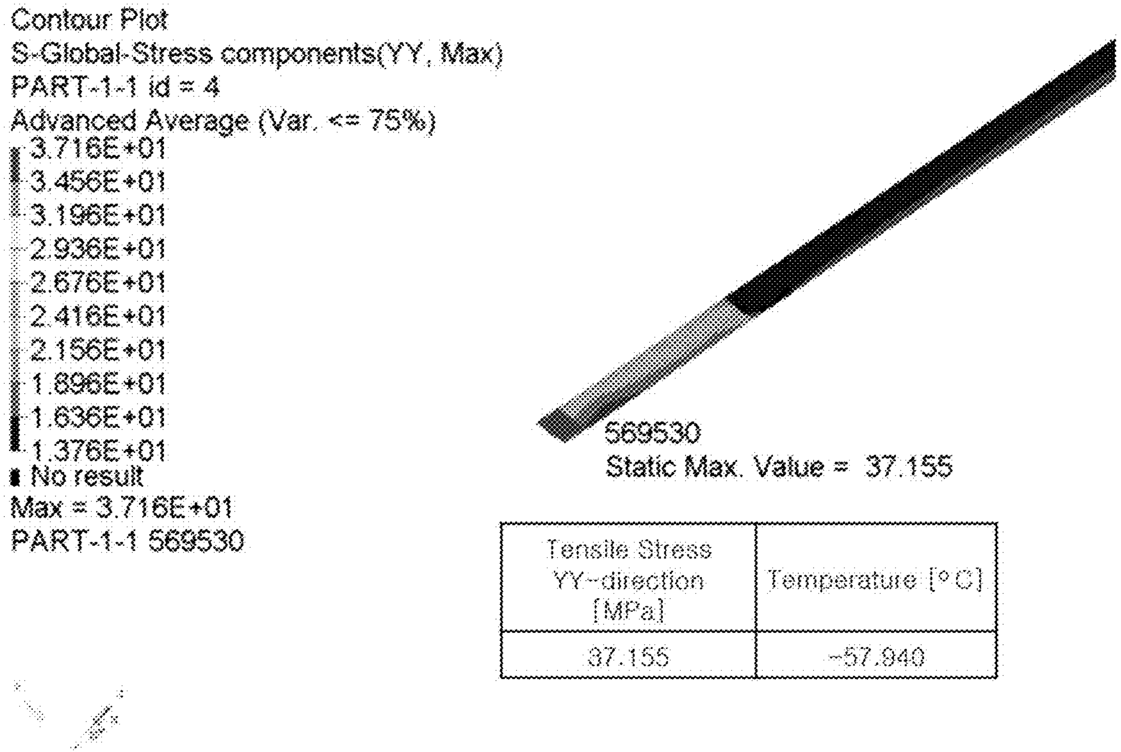
FIG. 3 is a view showing a structural analysis result for the corner portion of the liquefied gas storage tank according to the first embodiment of the present invention.
Figure 4:
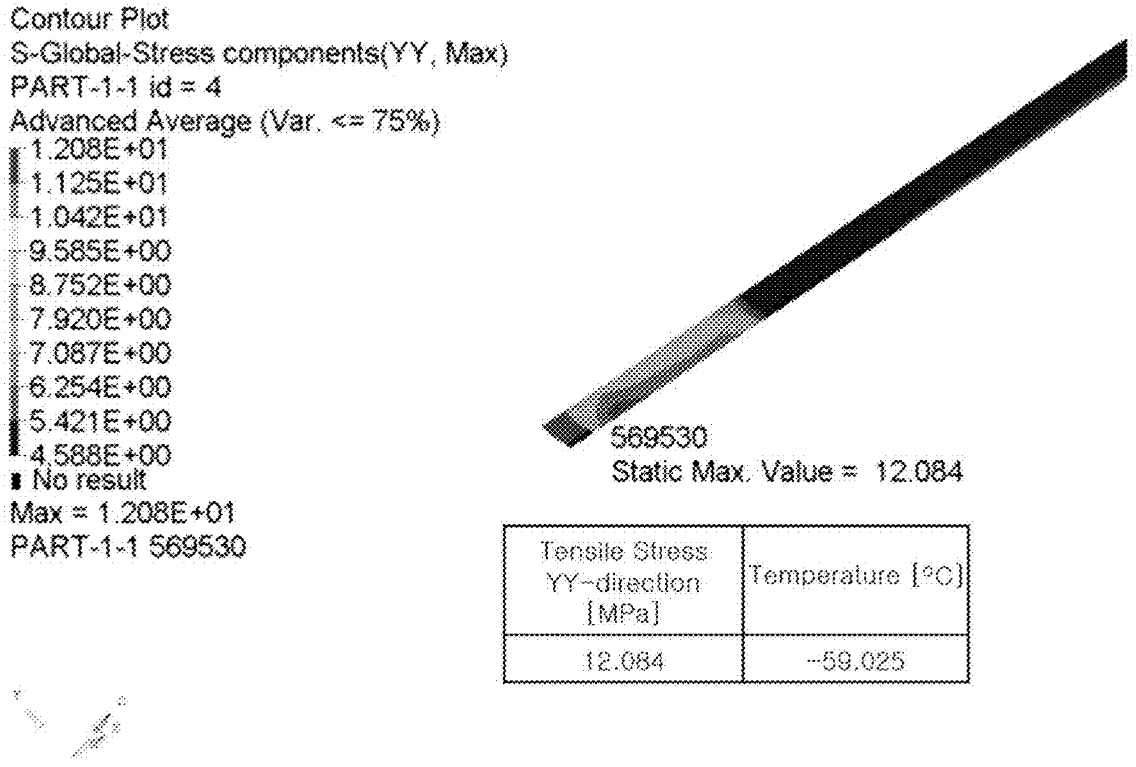
FIG. 4 is a view showing another structural analysis result for the corner portion of the liquefied gas storage tank according to the first embodiment of the present invention.

FIG. 1 is a partial cross-sectional view of a planar portion showing a liquefied gas storage tank according to a first embodiment of the present invention, FIG. 2 is a cross-sectional view of a corner portion for describing the liquefied gas storage tank according to the first embodiment of the present invention, FIG. 3 is a view showing a structural analysis result for the corner portion of the liquefied gas storage tank according to the first embodiment of the present invention, and FIG. 4 is a view showing another structural analysis result for the corner portion of the liquefied gas storage tank according to the first embodiment of the present invention.

Although not shown, the vessel equipped with the liquefied gas storage tank 1 to be described below has a concept including offshore structures for performing specific tasks by floating at a certain point in the sea in addition to commercial vessels for transporting cargo from a departure to a destination. In addition, it should be noted that the liquefied gas storage tank 1 in the present invention includes any type of tank for storing liquefied gas.

The liquefied gas storage tank 1 may be provided on a vessel to store liquefied gas, such as LNG that is a cryogenic (about −160° C. to −170° C.) substance, and may include a planar structure and a corner structure. For example, horizontal walls in a front-rear direction, a floor between the horizontal walls, a vertical wall, and a ceiling of the liquefied gas storage tank 1 may correspond to the planar structure. In addition, for example, a structure in which the horizontal walls, the floor, the vertical wall, and the ceiling of the liquefied gas storage tank 1 meet may correspond to the corner structure. Here, the corner structure may include an obtuse angle corner structure or a right angle corner structure. When a thickness of a primary insulation wall 3 or a secondary insulation wall 5 is changed, the obtuse angle corner structure or the right angle corner structure may be changed.

The planar structure of the liquefied gas storage tank 1 may be formed in a combination of a plurality of planar blocks as shown in FIG. 1, and the corner structure of the liquefied gas storage tank 1 may be formed in a combination of a plurality of corner blocks as shown in FIG. 2. The plurality of planar blocks may be connected to a plurality of corner blocks on a corner portion of the liquefied gas storage tank 1.

As shown in FIGS. 1 and 2, the liquefied gas storage tank 1 may include a primary barrier 2 in contact with liquefied gas, a primary insulation wall 3 installed outside the primary barrier 2, a secondary barrier 4 installed outside the primary insulation wall 3, and a secondary insulation wall 5 disposed outside the secondary barrier 4. The liquefied gas storage tank 1 may be supported by a hull 7 through a mastic 6 installed between the secondary insulation wall 5 and the hull 7.

In the above description, the primary barrier 2 may include a primary flat barrier 2*a* in the planar block and a primary corner barrier 2*b* in the corner block, the primary insulation wall 3 may include a primary flat insulation wall 3*a* in the planar block and a primary corner insulation wall 3*b* in the corner block, the secondary barrier 4 may include a secondary flat barrier 41*a* in the planar block and a secondary corner barrier 41*b* in the corner block, and the secondary insulation wall 5 may include a secondary flat insulation wall 5*a* in the planar block and a secondary corner insulation wall 5*b* in the corner block.

In the above description, when a plurality of planar blocks or a plurality of corner blocks are disposed adjacent to each other, the secondary barrier 4 in the planar block and the corner block may include a flat connecting barrier 42*a* or a corner connecting barrier 42*b* connecting the adjacent secondary flat barriers 41*a* disposed adjacent to each other or the adjacent secondary corner barriers 41*b* disposed adjacent to each other.

In the liquefied gas storage tank 1, it may be necessary to optimize thicknesses of the primary insulation wall 3 and the secondary insulation wall 5 in order to optimize insulation performance and storage capacities. For example, when polyurethane foam is used as main materials of the primary insulation wall 3 and the secondary insulation wall 5, the total of the thickness of the primary insulation wall 3 and the thickness of the secondary insulation wall 5 may be in a range of 250 mm to 500 mm, and in the embodiment, the thickness of the primary insulation wall 3 and the thickness of the secondary insulation wall 5 in the planar block and the corner block may be the same or similar.

In other words, compared to the fact that the thickness of the primary insulation wall in the planar block and the corner block is small that is about one-third of the thickness of the secondary insulation wall in the conventional liquefied gas storage tank, in the embodiment, the thickness of the primary insulation wall 3 and the thickness of the secondary insulation wall 5 in the planar block and the corner block are the same or similar, and the reason will be found by the following description.

A planar portion of the liquefied gas storage tank 1 according to the first embodiment of the present invention will be first described with reference to FIG. 1. The planar portion of the liquefied gas storage tank 1 is formed in a combination of the plurality of planar blocks, and it should be noted that a configuration of the planar block of the liquefied gas storage tank 1 to be described below is also applied to not only the first embodiment but also a second embodiment to an eighth embodiment to be described below in the same manner.

As shown in FIG. 1, the planar block of the liquefied gas storage tank 1 may be disposed on a planar portion of a first surface or a second surface at different angles, which forms a storage space accommodating liquefied gas, and may include the primary flat insulation wall 3*a* fixing the primary flat barrier 2*a* made of a metal material and disposed outside the primary flat barrier 2*a*, the secondary flat barrier 41*a* provided outside the primary flat insulation wall 3*a*, and the secondary flat insulation wall 5*a* disposed outside the secondary flat barrier 41*a*.

The primary flat barrier 2*a* may be disposed on the planar portion of the first surface or the second surface at different angles to form an accommodation space accommodating the liquefied gas, which is a cryogenic substance, and may be made of a metal material. For example, the metal material may be stainless steel, but is not limited thereto. The primary flat barrier 2*a* and the secondary flat barrier 41*a* can prevent the liquefied gas from leaking to the outside.

The primary flat barrier 2*a* may be fixedly coupled to an upper portion of the primary flat insulation wall 3*a* by a metal strip (not shown) and installed in direct contact with the liquefied gas, which is a cryogenic substance stored in the liquefied gas storage tank 1.

When the planar block and the corner block shown in FIG. 2 are disposed adjacent and connected to each other, the primary flat barrier 2*a* seals the primary flat insulation wall 3*a* and the primary corner barrier 2*b* shown in FIG. 2.

The primary flat insulation wall 3*a* may be designed to withstand an external impact or an internal impact caused by sloshing of the liquefied gas while blocking heat penetration from the outside and installed between the primary flat barrier 2*a* and the secondary flat barrier 41*a*.

The primary flat insulation wall 3*a* may have a structure in which a primary flat plywood 31*a* and a primary flat insulating material 32*a* are sequentially stacked outward from the primary flat barrier 2*a* and may be formed in the total of a thickness of the primary flat plywood 31*a* and a thickness of the primary flat insulating material 32*a*, for example, with a thickness of 160 mm to 250 mm, but the present invention is not limited thereto.

The primary flat plywood 31*a* may be installed between the primary flat barrier 2*a* and the primary flat insulating material 32*a*.

The primary flat insulating material 32*a* may be made of a material having excellent insulation performance and excellent mechanical strength to withstand the external impact or the internal impact caused by the sloshing of the liquefied gas while blocking the influence of external heat.

The primary flat insulating material 32*a* may be made of polyurethane foam between the primary flat plywood 31*a* and the secondary flat barrier 4*a* and occupies most of the thickness of the primary flat insulation wall 3*a*.

The primary flat insulation wall 3*a*, the secondary flat barrier 41*a*, and the secondary flat insulation wall 5*a* are portions of the configuration of the planar block, and the primary flat insulation wall 3*a* constituting the planar block may have a smaller width than the secondary flat insulation wall 5*a* that is another component of the planar block. Therefore, a portion of the secondary flat barrier 41*a* may be exposed to both sides of the primary flat insulation wall 3*a*. When the plurality of planar blocks are disposed adjacent to each other, a flat connecting insulation wall 33*a* may be installed in a spatial space between the adjacent primary flat insulation walls 3*a* disposed adjacent to each other, that is, a spatial portion to which the secondary flat barrier 41*a* is exposed.

The flat connecting insulation wall 33*a* may be disposed between the adjacent primary flat insulation walls 3*a* when the planar blocks are disposed adjacent to each other, provided in a form in which a flat connecting plywood 331*a* and a flat connecting insulating material 332*a*, which are the same as or similar to the primary flat insulation wall 3*a*, are stacked, and has a thickness that is the same as or similar to that of the primary flat insulation wall 3*a*.

When the plurality of planar blocks are disposed adjacent to each other, the flat connecting insulation wall 33*a* is installed to serve to block the influence of external heat while sealing the spatial portion formed between the adjacent secondary flat insulation walls 5*a* disposed adjacent to each other together with the flat connecting barrier 42*a*.

The secondary flat barrier 41*a* may be installed between the primary flat insulation wall 3*a* and the secondary flat insulation wall 5*a* and can prevent the liquefied gas from leaking to the outside together with the primary flat barrier 2*a*.

The secondary flat barrier 41*a*, the primary flat insulation wall 3*a*, and the secondary flat insulation wall 5*a* are portions of the configuration of the planar block, and when the planar blocks are disposed adjacent to each other, the adjacent secondary flat barriers 41*a* may be connected by the flat connecting barrier 42*a*.

When the planar blocks are disposed adjacent to each other, the flat connecting barrier 42*a* may connect the adjacent secondary flat barriers 41 exposed to the outside, and the flat connecting insulation wall 33*a* may be installed on the flat connecting barrier 42*a*.

The secondary flat insulation wall 5*a* may be designed to withstand the external impact or the internal impact caused by the sloshing of the liquefied gas while blocking the influence of external heat together with the primary flat insulation wall 3*a* and the flat connecting insulation wall 33*a*. In addition, the secondary flat insulation wall 5*a* may be installed between the secondary flat barrier 4*a* and the hull 7 and may include a secondary flat insulating material 51*a* and a secondary flat plywood 52*a*.

The secondary flat insulation wall 5*a* may have a structure in which the secondary flat insulating material 51*a* and the secondary flat plywood 52*a* are sequentially stacked outward from the secondary flat barrier 41*a* and may be formed to have the total of a thickness of the secondary flat insulating material 51*a* and a thickness of the secondary flat plywood 52*a*, for example, in a range of 150 mm to 240 mm that is the same as or similar to the thickness of the primary flat insulation wall 3*a*, but the present invention is not limited thereto.

The secondary flat insulating material 51*a* may be made of a material having excellent insulation performance and excellent mechanical strength to withstand the external impact or the internal impact caused by the sloshing of the liquefied gas while blocking the influence of external heat.

The secondary flat insulating material 51*a* may be made of polyurethane foam between the secondary flat barrier 41*a* and the secondary flat plywood 52*a* and occupies most of the thickness of the secondary flat insulation wall 5*a*.

The secondary flat plywood 52*a* may be installed between the secondary flat insulating material 51*a* and the hull 7.

As described above, the planar block of the liquefied gas storage tank 1 according to the embodiment may be formed so that the flat connecting insulation wall 33*a* included in the primary flat insulation wall 3*a* has a thickness that is the same as or similar to the thickness of the secondary flat insulation wall 5*a*. To be associated with this configuration, the flat connecting insulating material 332*a* of the flat connecting insulation wall 33*a* may be formed to have a thickness in a range of 90% to 110% of the secondary flat insulating material 51*a* so that the flat connecting insulating material 332*a* of the flat connecting insulation wall 33*a* has a thickness that is the same as or similar to that of the secondary flat insulating material 51*a*.

In other words, compared to the fact that the thickness of the primary insulation wall in the planar block is small that is about one-third of the thickness of the secondary insulation wall in the conventional liquefied gas storage tank, in the embodiment, the thickness of the primary flat insulation wall 3*a* and the thickness of the secondary flat insulation wall 5*a* are formed identically or similarly to each other, which is to prevent damage caused by a low-temperature stress of the secondary flat insulation wall 41*a*.

In general, the secondary flat barrier 41*a* and the secondary flat insulation wall 5*a* have a difference in contraction depending on a temperature to which the secondary flat barrier 41*a* and the secondary flat insulation wall 5*a* are exposed, and the secondary flat barrier 41*a* and the secondary flat insulation wall 5*a* may be more affected by the cooling or heating of the cryogenic liquefied gas as the thickness of the flat connecting insulation wall 33*a* becomes smaller. In addition, in this case, there is a problem that a risk of damage to the secondary flat barrier 41*a* increases because a temperature of the secondary flat barrier 41*a* is reduced and the contraction thereof increases, and thus the stress at low temperature increases. The problem may occur mainly in the flat connecting barrier 42*a* interconnecting the secondary flat barriers 41*a* by bonding or the like under the flat connecting insulation wall 33*a*. Both ends of the flat connecting barrier 42*a* under the flat connecting insulation wall 33*a* are connected to the secondary flat barriers 41*a* in the plurality of planar blocks disposed adjacent to each other because the flat connecting barrier 42*a* may be deformed so that both ends of the flat connecting barrier 42*a* move away from each other or are close to each other as the secondary flat insulation wall 5*a* in the planar block contracts.

In the embodiment, by forming the thicknesses of the primary flat insulation wall 3*a* including the flat connecting insulation wall 33*a* and the secondary flat insulation wall 5*a* identically or similarly to each other, it is possible to reduce the cryogenic loads of the flat connecting barrier 42*a*, particularly, as well as the secondary barrier 41*a* as the thickness of the primary flat insulation wall 3*a* including the flat connecting insulation wall 33*a* is relatively greater than the conventional one and also reduce the contraction of the secondary flat insulation wall 5*a* as the thickness of the secondary flat insulation wall 5*a* is relatively smaller than the conventional one, thereby reducing the stress at low temperature. As a result, the risk of damage to the secondary barrier 4 in a portion in which the plurality of planar blocks are disposed adjacent to each other becomes relatively lower than the conventional one.

The corner portion of the liquefied gas storage tank 1 according to the first embodiment of the present invention will be described with reference to FIG. 2. The corner portion of the liquefied gas storage tank 1 may be formed in a combination of a plurality of corner blocks. As a corner structure of the liquefied gas storage tank 1 to be described below, an obtuse angle corner structure at an angle of 135° will be described as an example, but the present invention is not limited to the value.

As shown in FIG. 2, the corner block of the liquefied gas storage tank 1 may be disposed at the corner portion in which the first surface and the second surface at different angles that form the storage space accommodating the liquefied gas and meet each other and may include the primary corner insulation wall 3*b* fixing the primary corner barrier 2*b* made of a metal material and disposed outside the primary corner barrier 2*b*, the secondary corner barrier 41*b* provided outside the primary corner insulation wall 3*b*, and the secondary corner insulation wall 5*b* disposed outside the secondary corner barrier 41*b*. Here, the primary corner insulation wall 3*b* may further include an inner bent portion 3*b*3.

The first surface and the second surface at different angles meet each other to form the accommodation space accommodating the liquefied gas, which is a cryogenic substance, and may be made of a metal material. The primary corner barrier 2*b* and the secondary corner barrier 41*b* can prevent the liquefied gas from leaking to the outside.

Although not shown in FIG. 2, the primary corner barrier 2*b* may be fixedly coupled to the primary corner insulation wall 3*b* by a barrier fixing member installed on an upper end of the primary corner insulation wall 3*b* in various methods, such as a bonding or bolting method, and installed in direct contact with the liquefied gas, which is the cryogenic substance stored in the liquefied gas storage tank 1. Therefore, the primary corner barrier 2*b* to be described below may be used as the meaning including the barrier fixing member or the like.

When the corner block and the planar block shown in FIG. 1 are disposed adjacent and connected to each other, the primary corner barrier 2*b* may seal the primary corner insulation wall 3*b* and the primary flat barrier 2*a* shown in FIG. 1 and may be fixed to a primary inner plywood 31*b* of a first inner fixing unit 3*b*1 and a primary inner plywood 31*b* of a second inner fixing unit 3*b*2 and provided to be bent from an inner surface of an insulating material 3*b*31 of the inner bent portion 3*b*3 at a predetermined angle, for example, an angle of 135°.

The primary corner insulation wall 3*b* may be designed to withstand an external impact or an internal impact caused by the sloshing of the liquefied gas while blocking the influence of external heat and installed between the primary corner barrier 2*b* and the secondary corner barrier 41*b*.

The primary corner insulation wall 3*b* may be provided inside each of the first surface and the second surface and may include the first inner fixing unit 3*b*1 and the second inner fixing unit 3*b*2 formed in a structure in which the primary inner plywood 31*b*, the primary corner insulating material 32*b*, and the primary outer plywood 33*b* are sequentially stacked outward from the primary corner barrier 2*b*.

Here, the first inner fixing unit 3*b*1 may be fixed to a primary outer fixing unit 5*b*1 and provided inside the first surface, and the second inner fixing unit 3*b*2 may be fixed to a secondary outer fixing unit 5*b*2 and provided inside the second surface.

In addition, the primary corner insulation wall 3*b* may include the inner bent portion 3*b*3 formed by filling a space between the first inner fixing unit 3*b*1 and the second inner fixing unit 3*b*2 with an insulating material 3*b*31.

The primary corner insulation wall 3*b* may be formed so that the total of a thickness of the primary inner plywood 31*b*, a thickness of the primary corner insulating material 32*b*, and a thickness of the primary outer plywood 33*b* is the same as the thickness (e.g., the thickness in a range of 160 mm to 250 mm) of the primary flat insulation wall 3*a*.

The primary inner plywood 31*b* may be installed between the primary corner barrier 2*b* and the primary corner insulating material 32*b*.

In the embodiment, as described above, since the primary insulation wall 3 in the planar block and the corner block is formed to have a relatively greater thickness than the conventional primary insulation wall, it is possible to reduce the thickness of the primary inner plywood 31*b* constituting the primary corner insulation wall 3*b* in the corner block and replace the remaining thickness with the primary corner insulating material 32*b* made of polyurethane foam.

The thickness of the primary inner plywood 31*b* in the embodiment may be in a range of 20 mm to 80 mm.

As described above, in the embodiment, by forming the first and second inner fixing units 3*b*1 and 3*b*2 for holding the barrier fixing member to which the primary corner barrier 2*b* of the corner block is fixed, which are made of a component combined with the primary corner insulating material 32*b* made of the polyurethane foam rather than being made of only the plywood having a thickness of about 92 mm like the conventional one, it is possible to increase insulation performance, reduce a weight, and reduce costs compared to the conventional one made of only the plywood.

The primary corner insulation material 32*b* may be disposed between the primary inner plywood 31*b* and the primary outer plywood 33*b* and made of high-density polyurethane foam, which is a material having excellent insulation performance and excellent mechanical strength, to withstand the external impact or the internal impact caused by the sloshing of the liquefied gas while blocking the influence of external heat.

The primary outer plywood 33*b* may be disposed between the primary corner insulating material 32*b* and the secondary corner barrier 41*b* and fixed to the secondary corner barrier 41*b*.

The primary outer plywood 33*b* may be formed with a thickness of 6.5 mm to 15 mm.

As described above, as the primary corner insulation wall 3*b* in the embodiment is formed in the structure in which the primary inner plywood 31*b*, the primary corner insulating material 32*b*, and the primary outer plywood 33*b* are sequentially stacked, the primary inner plywood 31*b* and the primary outer plywood 33*b* having a high strength may hold the heat contraction of the primary corner insulating material 32*b* so that the heat contraction of the primary corner insulating material 32*b* is not directly applied to the secondary barriers 4 (41*b* and 42*b*) between the first and second outer fixing units 5*b*1 and 5*b*2, and the primary corner insulating material 32*b* may be provided as an intermediate layer, thereby easily controlling tolerances of the primary inner plywood 31*b* and the primary outer plywood 33*b* sensitive to humidity.

The first and second inner fixing units 3*b*1 and 3*b*2 constituting the primary corner insulation wall 3*b* are each fixed to the secondary corner insulation wall 41*b* and the first and second outer fixing units 5*b*1 and 5*b*2 constituting the secondary corner insulation wall 5*b*, and a width of each of the first and second inner fixing units 3*b*1 and 3*b*2 may be smaller than a width of each of the first and second outer fixing units 5*b*1 and 5*b*2. Therefore, when the plurality of corner blocks are disposed adjacent to each other along a side of the corner portion in which the first surface and the second surface at different angles face each other, the inner bent portion 3*b*3 may be formed in a spatial portion between the adjacent first and second inner fixing units 3*b*1 and 3*b*2 disposed adjacent to each other, that is, a spatial portion to which the secondary corner barrier 41*b* is exposed.

The inner bent portion 3*b*3 may be formed by being filled with the insulating material 3*b*31.

The insulating material 3*b*31 of the inner bent portion 3*b*3 may be made of low-density polyurethane foam, and the secondary barrier 4 in which the secondary corner barrier 41*b* and the corner connecting barrier 42*b* are stacked may be provided on an outer surface bent at a predetermined angle, for example, an angle of 135°.

When the plurality of corner blocks are disposed adjacent to each other, the insulating material 3*b*31 of the inner bent portion 3*b*3 may serve to block the influence of external heat while sealing the spatial portion formed between the adjacent first and second outer fixing units 5*b*1 and 5*b*2 disposed adjacent to each other together with the corner connecting barrier 42*b*.

The secondary corner barrier 41*b* may be provided outside the primary corner insulation wall 3*b*. The secondary corner barrier 41*b* may be installed between the primary corner insulation wall 3*b* and the secondary corner insulation wall 5*b* and can prevent the liquefied gas from leaking to the outside together with the primary corner barrier 2*b*.

The secondary corner barrier 41*b*, the primary corner insulation wall 3*b*, and the secondary corner insulation wall 5*b* are portions of the configuration of the corner block, and when the corner blocks are disposed adjacent to each other, the adjacent secondary barriers 41*b* between the first and second outer fixing units 5*b*1 and 5*b*2 may be connected by the corner connecting barrier 42*b*.

When the corner blocks are disposed adjacent to each other, the corner connecting barrier 42*b* may connect the adjacent secondary corner barriers 41*b* exposed to the outside, and the insulating material 3*b*31 of the inner bent portion 3*b*3 may be installed on the corner connecting barrier 42*b* to serve to block the influence of external heat while sealing the spatial portion formed between the insulating material 3*b*31 of the inner bent portion 3*b*3 and the first and second outer fixing units 5*b*1 and 5*b*2 disposed adjacent to each other. In the embodiment, the corner connecting barrier 42*b* may be formed not only between the first and second inner fixing units 3*b*1 and 3*b*2, but also to extend at least a length overlapping the first and second inner fixing units 3*b*1 and 3*b*2.

At a point in which the first and second outer fixing units 5*b*1 and 5*b*2 meet each other, the secondary barrier 4 in which the secondary corner barrier 41*b* and the corner connecting barrier 42*b* are stacked may be provided to be bent.

The secondary corner insulation wall 5*b* may be disposed outside the secondary corner barrier 41*b*. The secondary corner insulation wall 5*b* may be designed to withstand the external impact or the internal impact caused by the sloshing of the liquefied gas while blocking the influence of external heat together with the primary corner insulation wall 3*b* and the insulating material 3*b*31 of the inner bent portion 3*b*3. In addition, the secondary corner insulation wall 5*b* may be installed between the secondary corner barrier 4*b* and the hull 7 and may include a secondary inner plywood 51*b*, a secondary corner insulating material 52*b*, and a secondary outer plywood 53*b*.

The secondary corner insulation wall 5*b* may be fixed inside each of the first surface and the second surface and may include the first outer fixing unit 5*b*1 and the second outer fixing unit 5*b*2 formed in a structure in which the second inner plywood 51*b*, the secondary corner insulating material 52*b*, and the secondary outer plywood 53*b* are sequentially stacked outward from the secondary corner barrier 41*b*.

Here, the first outer fixing unit 5*b*1 may be fixed inside the first surface, and the second outer fixing unit 5*b*2 may be fixed inside the second surface.

Side surfaces in which the first outer fixing unit 5*b*1 fixed to the first surface and the second outer fixing unit 5*b*2 fixed to the second surface face each other may be provided to be inclined in a direction ED in which the corner portion is equally divided. In the embodiment, the corner portion has been described as being equally divided but the present invention is not limited thereto, and since the corner portion may not be equally divided according to a corner position, it goes without saying that the corner portion may be provided to be inclined in the direction ED in which the corner portion is unequally divided.

The secondary corner insulation wall 5*b* may be formed so that the total of a thickness of the secondary inner plywood 51*b*, a thickness of the secondary corner insulating material 52*b*, and a thickness of the secondary outer plywood 53*b* is the same as the thickness (e.g., the thickness in a range of 150 mm to 240 mm) of the secondary flat insulation wall 5*a*.

The secondary inner plywood 51*b* may be disposed between the secondary corner barrier 41*b* and the secondary corner insulating material 52*b*, and the secondary corner barrier 41*b* may be fixed thereto. The secondary inner plywood 51*b* may be formed with a thickness 6.5 mm to 15 mm.

The secondary corner insulating material 52*b* may be made of a material having excellent insulation performance and excellent mechanical strength to withstand the external impact or the internal impact caused by the sloshing of the liquefied gas while blocking the influence of external heat.

The secondary corner insulating material 52*b* may be made of polyurethane foam between the secondary inner plywood 51*b* and the secondary outer plywood 53*b* and occupies most of the thickness of the secondary corner insulation wall 5*b*.

The secondary outer plywood 53*b* may be installed between the secondary corner insulation material 52*b* and the hull 7. The secondary outer plywood 53*b* may be formed with a thickness of 6.5 mm to 25 mm.

In the liquefied gas storage tank 1 according to the embodiment, as the thickness of the primary insulation wall 3 becomes relatively greater than the conventional one, the secondary barrier 4 in the corner block as well as in the planar block moves toward the hull 7, thereby increasing a curvature radius thereof, and in this case, as the curvature radius of the secondary barrier 4 at the corner portion increases, a length of a portion in which the secondary barrier 4 is not attached to the secondary insulation wall 5 also increases. This means that the flexibility of the secondary barrier 4 in the obtuse angle corner structure increases, and thus in the secondary barrier 4 in the obtuse angle corner structure, the deformation of nearby portions, for example, the deformation of the hull is easily absorbed, and the low-temperature stress is also reduced. In the embodiment, the length of the non-adhesive portion may be, for example, in a range of 0 mm to 100 mm, and preferably, 50 mm to 100 mm.

As described above, in the secondary barrier 4 in the obtuse angle corner structure according to the present invention, the stress at low temperature applied to the conventional secondary barrier 4 can be more reduced than in the obtuse angle corner structure of the primary insulation wall 3 formed in a relatively smaller thickness. In addition, since the non-adhesive portion increases, the deformation of the hull can also be easily absorbed.

This was proven in FIGS. 3 and 4 through structural analysis results of the corner portion of the liquefied gas storage tank 1 according to the embodiment.

As structural analysis execution conditions, heat transfer analysis was performed assuming that the temperature was 20° C. at a position of the hull and −163° C. in the primary barrier, and the structural analysis was performed using a temperature distribution derived by this result.

In addition, the conventional liquefied gas storage tank for comparing the result obtained by the structural analysis of the liquefied gas storage tank 1 according to the embodiment is a case in which the thickness of the primary insulation wall in the planar block and the corner block was small that is one-third of the thickness of the secondary insulation wall, the fixing members corresponding to the first and second inner fixing units **3*b*1 and 3*b*2** were made of only plywood, and the length of the non-adhesive portion was 50 mm, and in the conventional liquefied gas storage tank, a stress value of the bent portion of the secondary barrier in a YY direction was about 66.8984 MPa, and a temperature thereof was about −135.857° C.

The stress value in the YY direction obtained as a result of the structural analysis is a stress value at the corner, the smaller the stress value, the less the stress, and the temperature is the temperature at the corner, the higher the temperature, the less the stress (indicating a value changed after installation at room temperature 25° C.).

It should be noted that the conditions are applied to the structural analysis of the liquefied gas storage tank 1 according to the second to seventh embodiments to be described below as well as the embodiment in the same manner.

FIG. 3 shows a result of structural analysis for a stress value in the YY direction and a temperature distribution of the secondary barrier 4 (**41*b* and 42*b*) at a bent portion at which the first and second outer fixing units 5*b*1 and 5*b*2 face each other when the length of the non-adhesive portion in the embodiment was 50 mm, and the stress value in the YY direction was 37.155 MPa, and the temperature was −57.940° C. Comparing these values with the stress value of the bent portion of the secondary barrier in the conventional liquefied gas storage tank being about 66.8984 MPa and the temperature being about −135.857° C., it can be seen that the stress in the secondary barrier 4 (41*b* and 42*b*) according to the embodiment is much less, which means a reduction in the effect due to the cooling or heating from the cryogenic substance, such as damage to the secondary barrier 4 (41*b* and 42*b***) caused by the low-temperature stress, in the embodiment compared to the conventional one.

FIG. 4 shows a result of structural analysis for a stress value in the YY direction and a temperature distribution of the secondary barrier 4 (**41*b* and 42*b*) at a bent portion at which the first and second outer fixing units 5*b*1 and 5*b*2 face each other when the length of the non-adhesive portion in the embodiment was 97 mm, and the stress value in the YY direction was 12.084 MPa, and the temperature thereof was −59.025° C. Comparing these values with the stress value of the bent portion of the secondary barrier in the conventional liquefied gas storage tank being about 66.8984 MPa and the temperature being about −135.857° C., it can be seen that the stress in the secondary barrier 4 (41*b* and 42*b*) according to the embodiment is much less, which means a reduction in the effect due to the cooling or heating from the cryogenic substance, such as damage to the secondary barrier 4 (41*b* and 42*b***) caused by the low-temperature stress, in the embodiment compared to the conventional one.

Therefore, in the embodiment, by forming the first and second inner fixing units **3*b*1 and 3*b*2 for holding the barrier fixing member to which the primary corner barrier 2*b* in the corner block is fixed, which are made of a component combined with the insulating material 3*b*31** made of the polyurethane foam rather than being made of only the plywood, it is possible to increase insulation performance, reduce the weight, and reduce the cost compared to the conventional one made of only the plywood.

In addition, in the embodiment, by forming the thicknesses of the primary corner insulation wall **3*b* in the corner block connected to the primary flat insulation wall 3*a* in the planar block and the secondary corner insulation wall 5*b* in the corner block connected to the secondary flat insulation wall 5*a* in the planar block identically or similarly to each other, the thickness of the primary corner insulation wall 3*b* becomes relatively greater (however, the thickness of the secondary corner insulation wall 5*b* is the thickness at which the mechanical strength may be maintained at a predetermined level), it is possible to reduce the low-temperature load and sloshing load of the secondary barrier 4 (41*b* and 42*b*) between the first and second outer fixing units 5*b*1 and 5*b*2 and not only prevent the damage to the secondary barrier 4 (41*b* and 42*b*) but also reduce the low-temperature load of the secondary barrier 4 (41*b* and 42*b*), thereby preventing brittle fracture of the hull 7**.

In addition, in the embodiment, by forming the thickness of the primary corner insulation wall **3*b* relatively greater than the conventional one, it is possible to increase the length of the portion in which the secondary barrier 4 (41*b* and 42*b*) is not attached to the secondary corner insulation wall 5*b*, thereby not only further reducing the probability of the damage to the secondary barrier 4 (41*b* and 42*b*) by an increase in the flexibility of the secondary barrier 4 (41*b* and 42*b*), but also easily absorbing the deformation of the hull and also further reducing the low-temperature stress in the secondary barrier 4 (41*b* and 42*b***).

Figure 5:
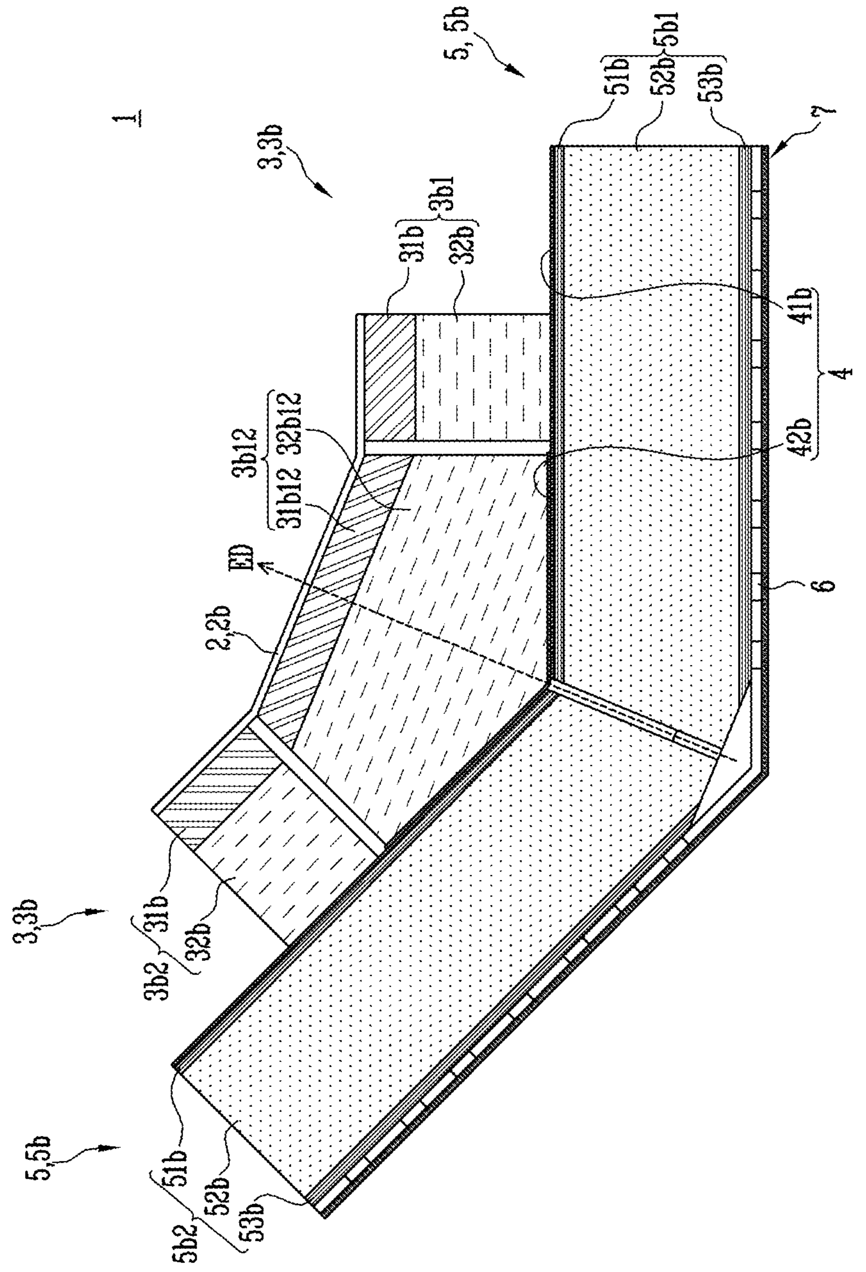
FIG. 5 is a cross-sectional view of a corner portion for describing a liquefied gas storage tank according to a second embodiment of the present invention.
Figure 6:
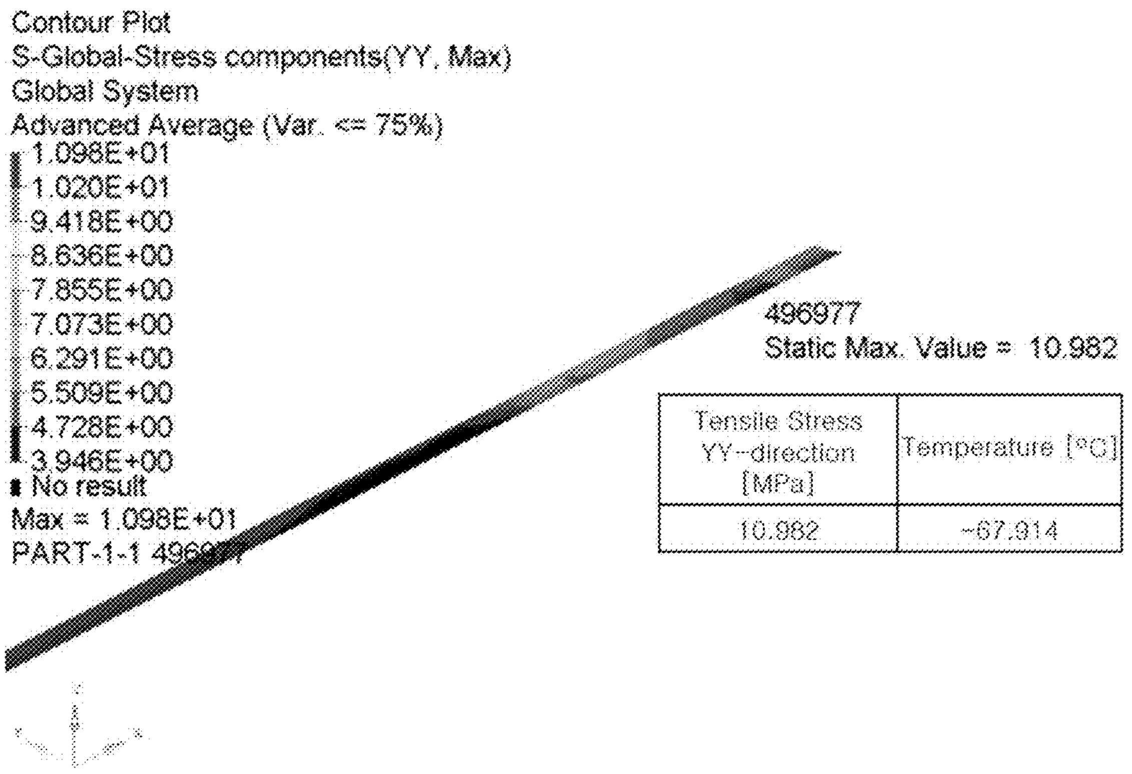
FIG. 6 is a view showing a structural analysis result for the corner portion of the liquefied gas storage tank according to the second embodiment of the present invention.

FIG. 5 is a cross-sectional view of a corner portion for describing a liquefied gas storage tank according to a second embodiment of the present invention, and FIG. 6 is a view showing a structural analysis result for the corner portion of the liquefied gas storage tank according to the second embodiment of the present invention.

The planar structure of the liquefied gas storage tank 1 in the embodiment may be formed in a combination of the plurality of planar blocks as shown in FIG. 1, and the corner structure of the liquefied gas storage tank 1 may be formed in a combination of the plurality of corner blocks as shown in FIG. 5. The plurality of planar blocks may be connected to a plurality of corner blocks on a corner portion of the liquefied gas storage tank 1.

In the liquefied gas storage tank 1 according to the embodiment, a configuration of the planar block is the same as or similar to the configuration described above with reference to FIG. 1. In other words, as shown in FIG. 1, the planar block of the liquefied gas storage tank 1 in the embodiment may be disposed on the planar portion of the first surface or the second surface at difference angles, which forms the storage space accommodating liquefied gas, and may include the primary flat insulation wall 3*a* fixing the primary flat barrier 2*a* made of a metal material and disposed outside the primary flat barrier 2*a*, the secondary flat barrier 41*a* provided outside the primary flat insulation wall 3*a*, and the secondary flat insulation wall 5*a* disposed outside the secondary flat barrier 41*a*.

Therefore, here, a detailed description of the configuration of the planar block of the liquefied gas storage tank 1 will be omitted to avoid overlapping descriptions. Hereinafter, the configuration of the corner block of the liquefied gas storage tank 1 in the embodiment will be mainly described in detail with reference to FIGS. 1 and 5. As shown in FIGS. 1 and 5, the liquefied gas storage tank 1 may include the primary barrier 2 in contact with the liquefied gas, the primary insulation wall 3 installed outside the primary barrier 2, the secondary barrier 4 installed outside the primary insulation wall 3, and the secondary insulation wall 5 disposed outside the secondary barrier 4. The liquefied gas storage tank 1 may be supported by a hull 7 through a mastic 6 installed between the secondary insulation wall 5 and the hull 7.

In the above description, the primary barrier 2 may include a primary flat barrier 2*a* in the planar block and a primary corner barrier 2*b* in the corner block, the primary insulation wall 3 may include a primary flat insulation wall 3*a* in the planar block and a primary corner insulation wall 3*b* in the corner block, the secondary barrier 4 may include a secondary flat barrier 41*a* in the planar block and a secondary corner barrier 41*b* in the corner block, and the secondary insulation wall 5 may include a secondary flat insulation wall 5*a* in the planar block and a secondary corner insulation wall 5*b* in the corner block. In the embodiment, as described in the first embodiment, the thickness of the primary insulation wall 3 and the thickness of the secondary insulation wall 5 may be the same or similar in the planar block and the corner block.

In the above description, when a plurality of planar blocks or a plurality of corner blocks are disposed adjacent to each other, the secondary barrier 4 in the planar block and the corner block may include a flat connecting barrier 42*a* or a corner connecting barrier 42*b* connecting the adjacent secondary flat barriers 41*a* disposed adjacent to each other or the adjacent secondary corner barriers 41*b* disposed adjacent to each other.

As shown in FIG. 5, a corner portion of the liquefied gas storage tank 1 according to the second embodiment of the present invention may be formed in a combination of the plurality of corner blocks. A corner structure of the liquefied gas storage tank 1 to be described below may be an obtuse angle corner structure having a predetermined angle, for example, an angle of 135°.

The corner block of the liquefied gas storage tank 1 may be disposed at the corner portion in which the first surface and the second surface at different angles that form the storage space accommodating liquefied gas and meet each other and may include the primary corner insulation wall 3*b* fixing the primary corner barrier 2*b* made of the metal material and disposed outside the primary corner barrier 2*b*, the secondary corner barrier 41*b* provided outside the primary corner insulation wall 3*b*, and the secondary corner insulation wall 5*b* disposed outside the secondary corner barrier 41*b*.

The first surface and the second surface at different angles meet each other to form the accommodation space accommodating the liquefied gas, which is a cryogenic substance, and may be made of a metal material. The primary corner barrier 2*b* and the secondary corner barrier 41*b* can prevent the liquefied gas from leaking to the outside.

Since the primary corner barrier 2*b* in the embodiment is basically the same as or similar to that of the first embodiment, here, a detailed description thereof will be omitted. However, the primary corner barrier 2*b* in the embodiment may have a different bent angle because the configuration of the primary corner insulation wall 3*b* is different from that of the first embodiment, which will be described below when the primary corner insulation wall 3*b* is described.

The primary corner insulation wall 3*b* may be designed to withstand the external impact or the internal impact caused by the sloshing of the liquefied gas while blocking the influence of external heat and installed between the primary corner barrier 2*b* and the secondary corner barrier 41*b*. Since the configuration of the primary corner insulation wall 3*b* in the embodiment is the same as or similar to that of the first embodiment excluding that the primary outer plywood 33*b* is omitted and the configuration of the portion in which the inner bent portion 3*b*3 formed by being filled with the insulating material 3*b*31 is disposed is changed, here, changed configurations will be mainly described.

The primary corner insulation wall 3*b* may be provided inside each of the first surface and the second surface and may include the primary inner fixing unit 3*b*1 and the secondary inner fixing unit 3*b*2 formed in a structure in which the primary inner plywood 31*b* and the primary corner insulating material 32*b* are sequentially stacked outward from the primary corner barrier 2*b*. Here, since the primary inner plywood 31*b* and the primary corner insulating material 32*b* in the embodiment may be the same as or similar to those of the first embodiment, a detailed description thereof will be omitted to avoid overlapping descriptions.

The first inner fixing unit 3*b*1 may be fixed to the first outer fixing unit 5*b*1 and provided inside the first surface, and the second inner fixing unit 3*b*2 may be fixed to the second outer fixing unit 5*b*2 and provided inside the second surface.

In addition, the primary corner insulation wall 3*b* may include an inner intermediate fixing unit 3*b*12 provided between the first inner fixing unit 3*b*1 and the second inner fixing unit 3*b*2.

The inner intermediate fixing unit 3*b*12 may include a corner intermediate insulating material 32*b*12 fixed to the corner connecting barrier 42*b* connecting the adjacent secondary corner barriers 41*b* and an inner intermediate plywood 31*b*12 disposed inside the corner intermediate insulating material 32*b*12 and having the primary corner barrier 2*b* fixed thereto.

The inner intermediate plywood 31*b*12 may be formed in a structure that is the same as or similar to that of the primary inner plywood 31*b*, and the primary corner barrier 2*b* and the primary inner plywood 31*b* may be fixed to the inner intermediate plywood 31*b*12.

The inner intermediate plywood 31*b*12 may be parallel to a direction perpendicular to a direction ED in which the inner intermediate plywood 31*b*12 is equally divided when the corner portion is equally divided. However, it goes without saying that the inner intermediate plywood 31*b*12 may not be parallel to the direction perpendicular to the direction ED in which the corner portion is divided when the corner portion is unequally divided.

The corner intermediate insulating material 32*b*12 may be made of the same or similar material as the primary corner insulating material 32*b*. The corner intermediate insulating material 32*b*12 may be made of high-density polyurethane foam.

When the plurality of corner blocks are disposed adjacent to each other, the corner intermediate insulating material 32*b*12 may serve to block the influence of external heat while sealing the spatial portion formed between the adjacent first and second outer fixing units 5*b*1 and 5*b*2 disposed adjacent to each other together with the corner connecting barrier 42*b*. In the embodiment, the corner connecting barrier 42*b* may be formed not only between the first and second inner fixing units 3*b*1 and 3*b*2, but also to extend at least a length overlapping the first and second inner fixing units 3*b*1 and 3*b*2.

By providing the inner intermediate plywood 31*b*12 between the first inner fixing unit 3*b*1 and the second inner fixing unit 3*b*2, the primary corner barrier 2*b* may be fixed to the primary inner plywood 31*b* of the first inner fixing unit 3*b*1, the inner intermediate plywood 31*b*12 of the inner intermediate fixing unit 3*b*12, and the primary inner plywood 31*b* of the second inner fixing unit 3*b*2 and may be provided to be bent in a range of angles of 150° to 160° between the first inner fixing unit 3*b*1 and the inner intermediate fixing unit 3*b*12 and between the inner intermediate fixing unit 3*b*12 and the second inner fixing unit 3*b*2.

Therefore, in the embodiment, by forming the first inner fixing unit 3*b*1 and the second inner fixing unit 3*b*2 that are respectively provided inside the first surface and the second surface at different angles and spaced a predetermined distance from each other and providing the inner intermediate fixing unit 3*b*12 between the first and second inner fixing units 3*b*1 and 3*b*2, it is possible to reduce the bent angle of the primary corner barrier 2*b* by the inner intermediate fixing unit 3*b*12, thereby not only reducing the sloshing load of the primary corner barrier 2*b* but also increasing the mechanical strength of the corner portion.

The secondary corner barrier 41*b* may be installed between the primary corner insulation wall 3*b* and the secondary corner insulation wall 5*b*, and when the corner blocks are disposed adjacent to each other, the adjacent secondary corner barriers 41*b* between the first and second outer fixing units 5*b*1 and 5*b*2 may be connected by the corner connecting barrier 42*b* and can prevent the liquefied gas from leaking to the outside together with the primary corner barrier 2*b*. Since the secondary corner barrier 41*b* in the embodiment is the same as or similar to that of the first embodiment, a detailed description thereof will be omitted to avoid overlapping descriptions.

The secondary corner insulation wall 5*b* may include the secondary inner plywood 51*b*, the secondary corner insulating material 52*b*, and the secondary outer plywood 53*b*. The secondary corner insulation wall 5*b* may be fixed inside each of the first surface and the second surface and may include the first outer fixing unit 5*b*1 and the second outer fixing unit 5*b*2 formed in a structure in which the second inner plywood 51*b*, the secondary corner insulating material 52*b*, and the secondary outer plywood 53*b* are sequentially stacked outward from the secondary corner barrier 41*b*. Since the secondary corner insulation wall 5*b* in the embodiment is the same as or similar to that of the first embodiment, a detailed description thereof will be omitted to avoid overlapping descriptions.

FIG. 6 shows a result of structural analysis for a stress value in a YY direction and a temperature distribution of the secondary barrier 4 (41*b* and 42*b*) at a bent portion at which the first and second outer fixing units 5*b*1 and 5*b*2 face each other, and the stress value in the YY direction was 10.982 MPa, and the temperature was −67.914° C. Comparing these values with the stress value of the bent portion of the secondary barrier in the conventional liquefied gas storage tank being about 66.8984 MPa and the temperature being about −135.857° C., it can be seen that the stress in the secondary barrier 4 (41*b* and 42*b*) according to the embodiment is much less, which means a reduction in the effect due to the cooling or heating from the cryogenic substance, such as damage to the secondary barrier 4 (41*b* and 42*b*) caused by the low-temperature stress, in the embodiment compared to the conventional one.

Figure 7:
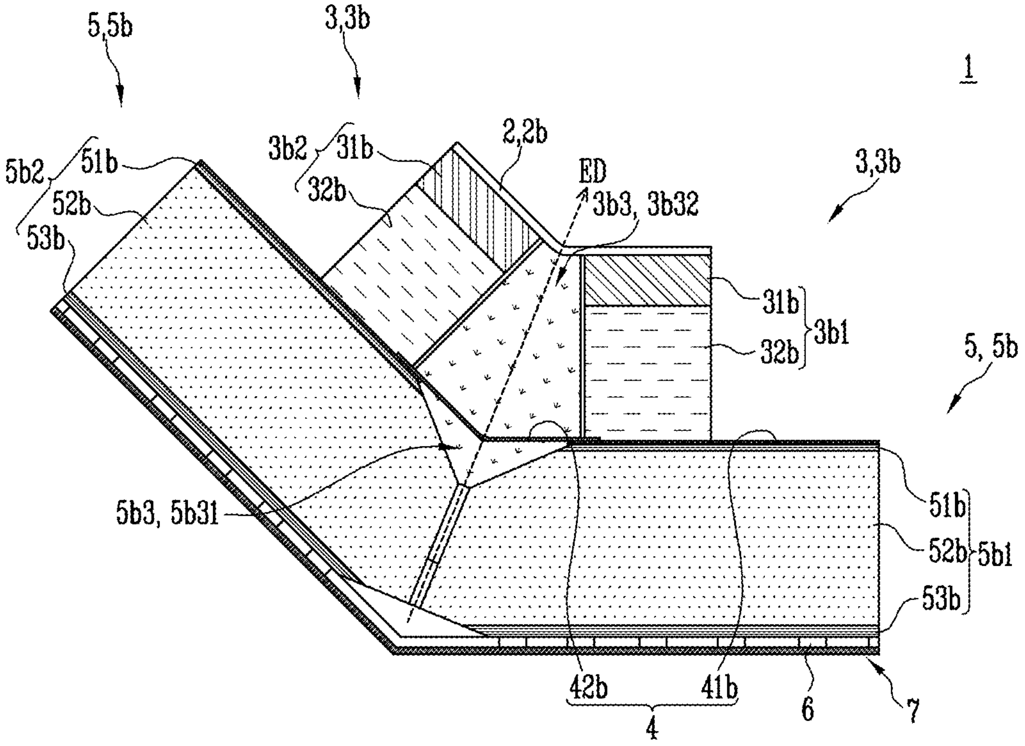
FIG. 7 is a cross-sectional view of a corner portion for describing a liquefied gas storage tank according to a third embodiment of the present invention.
Figure 8:
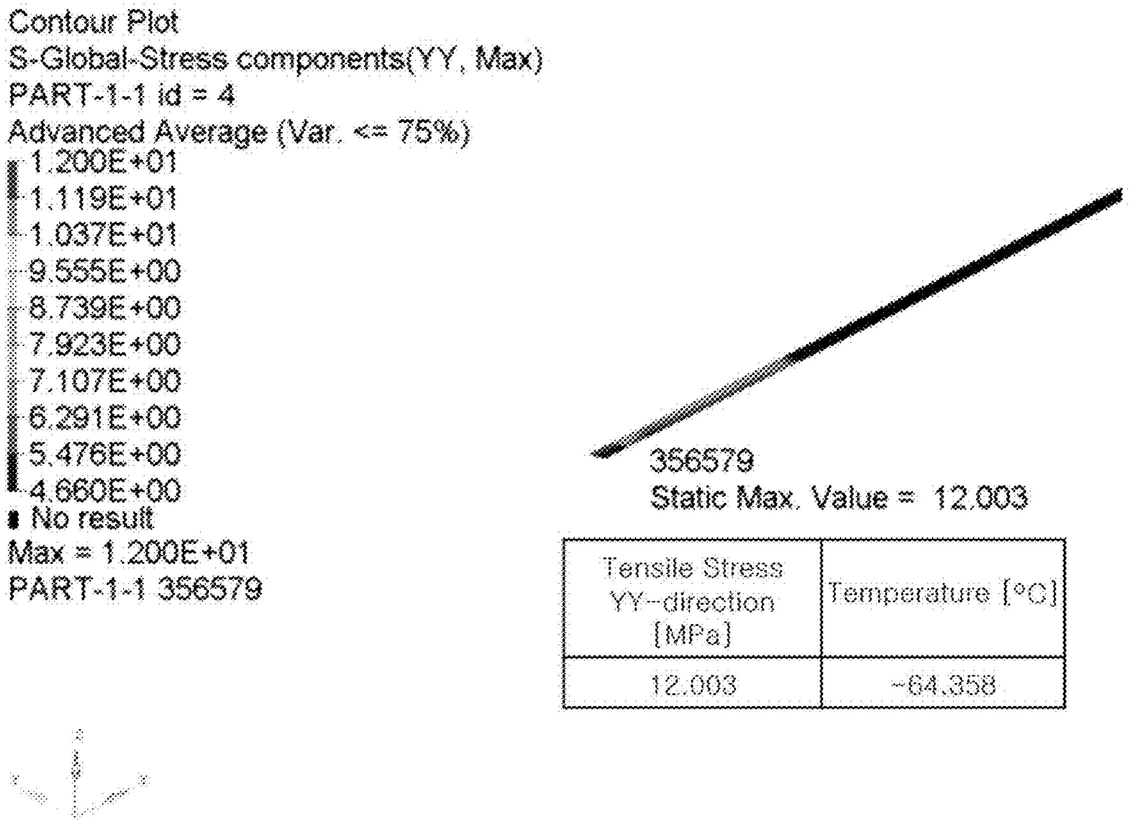
FIG. 8 is a view showing a structural analysis result for the corner portion of the liquefied gas storage tank according to the third embodiment of the present invention.

FIG. 7 is a cross-sectional view of a corner portion for describing a liquefied gas storage tank according to a third embodiment of the present invention, and FIG. 8 is a view showing a structural analysis result for the corner portion of the liquefied gas storage tank according to the third embodiment of the present invention.

The planar structure of the liquefied gas storage tank 1 in the embodiment may be formed in a combination of the plurality of planar blocks as shown in FIG. 1, and the corner structure of the liquefied gas storage tank 1 may be formed in a combination of the plurality of corner blocks as shown in FIG. 7. The plurality of planar blocks may be connected to a plurality of corner blocks on a corner portion of the liquefied gas storage tank 1.

In the liquefied gas storage tank 1 according to the embodiment, a configuration of the planar block is the same as or similar to the configuration described above with reference to FIG. 1. In other words, as shown in FIG. 1, the planar block of the liquefied gas storage tank 1 in the embodiment may be disposed on the planar portion of the first surface or the second surface at difference angles, which forms the storage space accommodating liquefied gas, and may include the primary flat insulation wall 3*a* fixing the primary flat barrier 2*a* made of a metal material and disposed outside the primary flat barrier 2*a*, the secondary flat barrier 41*a* provided outside the primary flat insulation wall 3*a*, and the secondary flat insulation wall 5*a* disposed outside the secondary flat barrier 41*a*.

Therefore, here, a detailed description of the configuration of the planar block of the liquefied gas storage tank 1 will be omitted to avoid overlapping descriptions. Hereinafter, the configuration of the corner block of the liquefied gas storage tank 1 according to the embodiment will be described in detail with reference to FIGS. 1 and 7.

As shown in FIGS. 1 and 7, the liquefied gas storage tank 1 may include the primary barrier 2 in contact with the liquefied gas, the primary insulation wall 3 installed outside the primary barrier 2, the secondary barrier 4 installed outside the primary insulation wall 3, and the secondary insulation wall 5 disposed outside the secondary barrier 4. The liquefied gas storage tank 1 may be supported by a hull 7 through a mastic 6 installed between the secondary insulation wall 5 and the hull 7. In the above description, the primary barrier 2 may include a primary flat barrier 2*a* in the planar block and a primary corner barrier 2*b* in the corner block, the primary insulation wall 3 may include a primary flat insulation wall 3*a* in the planar block and a primary corner insulation wall 3*b* in the corner block, the secondary barrier 4 may include a secondary flat barrier 41*a* in the planar block and a secondary corner barrier 41*b* in the corner block, and the secondary insulation wall 5 may include a secondary flat insulation wall 5*a* in the planar block and a secondary corner insulation wall 5*b* in the corner block. In the embodiment, as described in the first embodiment, the thickness of the primary insulation wall 3 and the thickness of the secondary insulation wall 5 may be the same or similar in the planar block and the corner block.

In the above description, when a plurality of planar blocks or a plurality of corner blocks are disposed adjacent to each other, the secondary barrier 4 in the planar block and the corner block may include a flat connecting barrier 42*a* or a corner connecting barrier 42*b* connecting the adjacent secondary flat barriers 41*a* disposed adjacent to each other or the adjacent secondary corner barriers 41*b* disposed adjacent to each other.

As shown in FIG. 7, the corner portion of the liquefied gas storage tank 1 according to the third embodiment of the present invention may be formed in a combination of the plurality of corner blocks. A corner structure of the liquefied gas storage tank 1 to be described below may be an obtuse angle corner structure having a predetermined angle, for example, an angle of 135°.

In the embodiment, unlike the drawings, it goes without saying that the primary corner insulation wall 3*b* may be positioned to expose the secondary corner barrier 41*b* formed on the secondary corner insulation wall 5*b* at the center of the corner. Therefore, it goes without saying that the exposed secondary corner barriers 41*b* may be finished by being interconnected by the corner connecting barrier 42*b* or the primary corner insulation wall 3*b* may be stacked on the secondary corner barrier 41*b* and/or the corner connecting barrier 42*b* after the corner connecting barrier 42*b* is formed so that the primary corner insulation wall 3*b* connects the adjacent secondary corner barriers 41*b* disposed adjacent to each other. In the embodiment, the corner connecting barrier 42*b* may be formed not only between the first and second inner fixing units 3*b*1 and 3*b*2, but also to extend at least a length overlapping the first and second inner fixing units 3*b*1 and 3*b*2.

The corner block of the liquefied gas storage tank 1 may be disposed at the corner portion in which the first surface and the second surface at different angles that form the storage space accommodating liquefied gas and meet each other and may include the primary corner insulation wall 3*b* fixing the primary corner barrier 2*b* made of the metal material and disposed outside the primary corner barrier 2*b*, the secondary corner barrier 41*b* provided outside the primary corner insulation wall 3*b*, and the secondary corner insulation wall 5*b* disposed outside the secondary corner barrier 41*b*.

The primary corner barrier 2*b* may be disposed at the corner portion in which the first surface and the second surface at different angles meet each other to form the accommodation space accommodating the liquefied gas, which is a cryogenic substance, and may be made of a metal material. The primary corner barrier 2*b* can prevent the liquefied gas from leaking to the outside together with the secondary corner barrier 41*b*.

Since the primary corner barrier 2*b* in the embodiment is basically the same as or similar to that of the first embodiment, here, a detailed description thereof will be omitted.

The primary corner insulation wall 3*b* may be designed to withstand the external impact or the internal impact caused by the sloshing of the liquefied gas while blocking the influence of external heat and installed between the primary corner barrier 2*b* and the secondary corner barrier 41*b*. Since the configuration of the primary corner insulation wall 3*b* in the embodiment is the same as or similar to that of the first embodiment excluding that the primary outer plywood 33*b* is omitted, here, changed configurations will be mainly described.

The primary corner insulation wall 3*b* may be provided inside each of the first surface and the second surface and may include the primary inner fixing unit 3*b*1 and the secondary inner fixing unit 3*b*2 formed in a structure in which the primary inner plywood 31*b* and the primary corner insulating material 32*b* are sequentially stacked outward from the primary corner barrier 2*b*. Here, since the primary inner plywood 31*b* and the primary corner insulating material 32*b* in the embodiment may be the same as or similar to those of the first embodiment, a detailed description thereof will be omitted to avoid overlapping descriptions.

The first inner fixing unit 3*b*1 may be fixed to the first outer fixing unit 5*b*1 and provided inside the first surface, and the second inner fixing unit 3*b*2 may be fixed to the second outer fixing unit 5*b*2 and provided inside the second surface.

In addition, the primary corner insulation wall 3*b* may include the inner bent portion 3*b*3 formed by filling a space between the first inner fixing unit 3*b*1 and the second inner fixing unit 3*b*2 with an insulating material 3*b*32. Since the insulating material 3*b*32 of the inner bent portion 3*b*3 in the embodiment may be the same as or similar to that of the first embodiment, a detailed description thereof will be omitted to avoid overlapping descriptions.

The secondary corner barrier 41*b* may be installed between the primary corner insulation wall 3*b* and the secondary corner insulation wall 5*b*, and when the corner blocks are disposed adjacent to each other, the adjacent secondary corner barriers 41*b* between the first and second outer fixing units 5*b*1 and 5*b*2 may be connected by the corner connecting barrier 42*b* and can prevent the liquefied gas from leaking to the outside together with the primary corner barrier 2*b*. A basic configuration of the secondary corner barrier 41*b* in the embodiment may be the same as or similar to that of the first embodiment. However, the arrangement relationship of the secondary corner barrier 41*b* including the corner connecting barrier 42*b* in the embodiment may be changed because some components of the secondary corner insulation wall 5*b* are different from those of the first embodiment, which will be described below when the secondary corner insulation wall 5*b* is described.

The secondary corner insulation wall 5*b* may include the secondary inner plywood 51*b*, the secondary corner insulating material 52*b*, and the secondary outer plywood 53*b*. The secondary corner insulation wall 5*b* may be fixed inside each of the first surface and the second surface and may include the first outer fixing unit 5*b*1 and the second outer fixing unit 5*b*2 formed in a structure in which the second inner plywood 51*b*, the secondary corner insulating material 52*b*, and the secondary outer plywood 53*b* are sequentially stacked outward from the secondary corner barrier 41*b*. The first outer fixing unit 5*b*1 and the second outer fixing unit 5*b*2 may be provided to be inclined in the direction ED in which the side surface at which the first outer fixing unit 5*b*1 and the second outer fixing unit 5*b*2 face each other equally divides the corner portion. In the embodiment, the corner portion has been described as being equally divided but the present invention is not limited thereto, and since the corner portion may not be equally divided according to a corner position, it goes without saying that the corner portion may be provided to be inclined in the direction ED in which the corner portion is unequally divided.

Chamfers may be formed at corners at which the first outer fixing unit **5*b*1 and the second outer fixing unit 5*b*2** face each other.

In addition, the secondary corner insulation wall **5*b* may include an outer bent portion 5*b*3 including an insulating material 5*b*31 filling the chamfer portions of the first outer fixing unit 5*b*1 and the second outer fixing unit 5*b*2. The insulating material 5*b*31 of the outer bent portion 5*b*3** may be made of low-density polyurethane form.

By providing the insulating material **5*b*31 of the outer bent portion 5*b*3 in the chamfer portions of the first outer fixing unit 5*b*1 and the second outer fixing unit 5*b*2, the secondary corner barrier 41*b* including the corner connecting barrier 42*b* may be fixed to the secondary inner plywood 51*b* of the first outer fixing unit 5*b*1, the insulating material 5*b*31 of the outer bent portion 5*b*3, and the secondary inner plywood 51*b* of the first outer fixing unit 5*b*2 and provided to be bent at a predetermined angle, for example, an angle of 135° inside the insulating material 5*b*31 of the outer bent portion 5*b*3**.

Therefore, in the embodiment, by forming the chamfers at the corners of the first outer fixing unit **5*b*1 and the second outer fixing unit 5*b*2 that are respectively fixed to the first surface and the second surface at different angles and face each other and providing the insulating material 5*b*31 of the outer bent portion 5*b*3** made of the low-density polyurethane foam on the chamfers, it is possible to further increase the insulation performance of the corner portion by the low-density polyurethane foam.

FIG. 8 shows a result of structural analysis for a stress value in a YY direction and a temperature distribution of the secondary barrier 4 (**41*b* and 42*b*) at a bent portion at which the first and second outer fixing units 5*b*1 and 5*b*2 face each other, and the stress value in the YY direction was 12.003 MPa, and the temperature was −64.358° C. Comparing these values with the stress value of the bent portion of the secondary barrier in the conventional liquefied gas storage tank being about 66.8984 MPa and the temperature being about −135.857° C., it can be seen that the stress in the secondary barrier 4 (41*b* and 42*b*) according to the embodiment is much less, which means a reduction in the effect due to the cooling or heating from the cryogenic substance, such as damage to the secondary barrier 4 (41*b* and 42*b***) caused by the low-temperature stress, in the embodiment compared to the conventional one.

Figure 9:
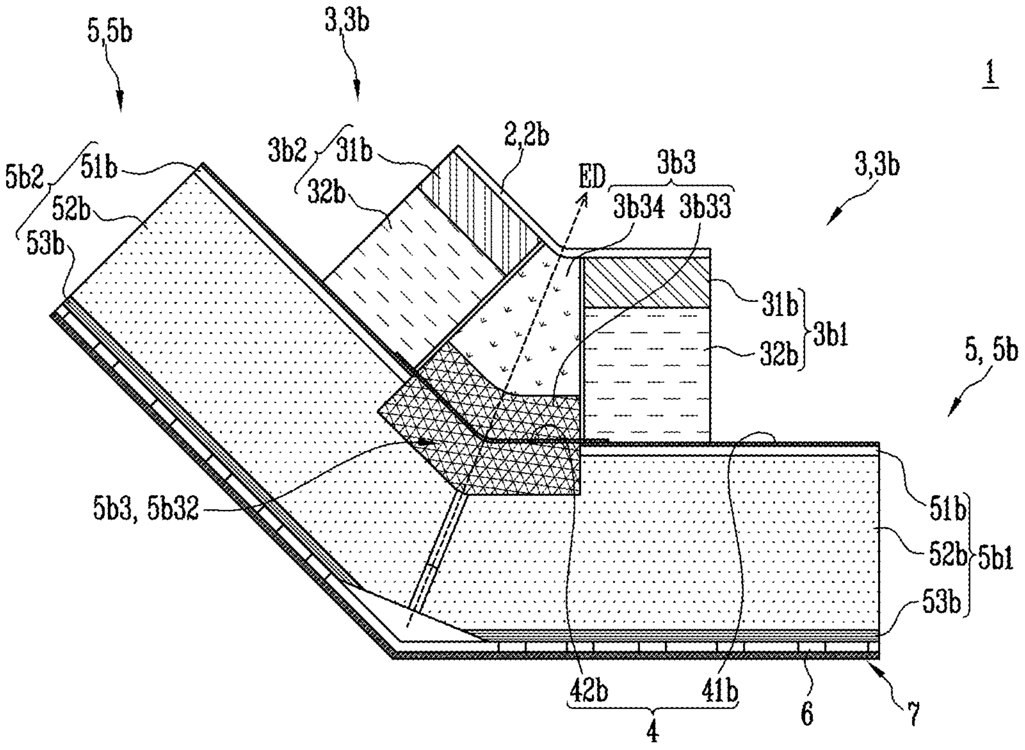
FIG. 9 is a cross-sectional view of a corner portion for describing a liquefied gas storage tank according to a fourth embodiment of the present invention.
Figure 10:
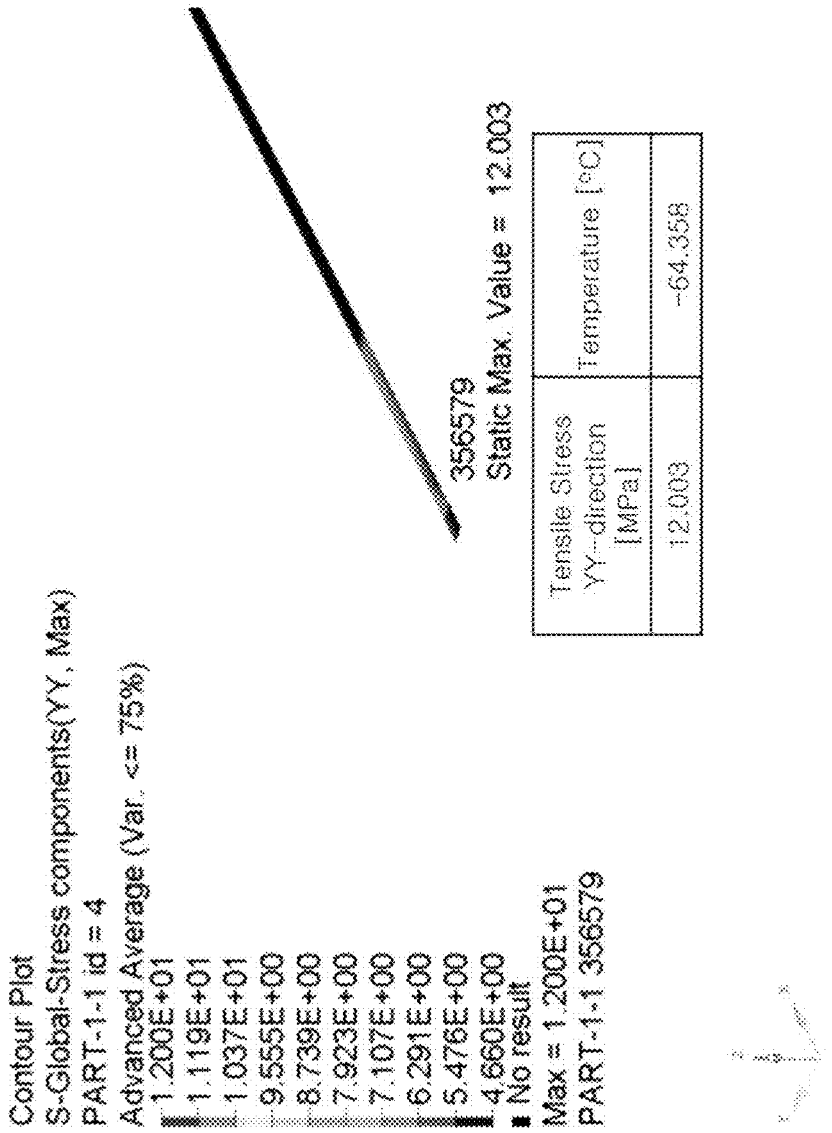
FIG. 10 is a view showing a structural analysis result for a corner portion of a liquefied gas storage tank according to a fourth embodiment of the present invention.

FIG. 9 is a cross-sectional view of a corner portion for describing a liquefied gas storage tank according to a fourth embodiment of the present invention, and FIG. 10 is a view showing a structural analysis result for a corner portion of a liquefied gas storage tank according to a fourth embodiment of the present invention.

The planar structure of the liquefied gas storage tank 1 in the embodiment may be formed in a combination of the plurality of planar blocks as shown in FIG. 1, and the corner structure of the liquefied gas storage tank 1 may be formed in a combination of the plurality of corner blocks as shown in FIG. 9. The plurality of planar blocks may be connected to a plurality of corner blocks on a corner portion of the liquefied gas storage tank 1.

In the liquefied gas storage tank 1 according to the embodiment, a configuration of the planar block is the same as or similar to the configuration described above with reference to FIG. 1. In other words, as shown in FIG. 1, the planar block of the liquefied gas storage tank 1 in the embodiment may be disposed on the planar portion of the first surface or the second surface at difference angles, which forms the storage space accommodating liquefied gas, and may include the primary flat insulation wall **3*a* fixing the primary flat barrier 2*a* made of a metal material and disposed outside the primary flat barrier 2*a*, the secondary flat barrier 41*a* provided outside the primary flat insulation wall 3*a*, and the secondary flat insulation wall 5*a* disposed outside the secondary flat barrier 41*a***.

Therefore, here, a detailed description of the configuration of the planar block of the liquefied gas storage tank 1 will be omitted to avoid overlapping descriptions. Hereinafter, the configuration of the corner block of the liquefied gas storage tank 1 in the embodiment will be mainly described in detail with reference to FIGS. 1 and 9.

As shown in FIGS. 1 and 9, the liquefied gas storage tank 1 may include the primary barrier 2 in contact with the liquefied gas, the primary insulation wall 3 installed outside the primary barrier 2, the secondary barrier 4 installed outside the primary insulation wall 3, and the secondary insulation wall 5 disposed outside the secondary barrier 4. The liquefied gas storage tank 1 may be supported by a hull 7 through a mastic 6 installed between the secondary insulation wall 5 and the hull 7.

In the above description, the primary barrier 2 may include a primary flat barrier **2*a* in the planar block and a primary corner barrier 2*b* in the corner block, the primary insulation wall 3 may include a primary flat insulation wall 3*a* in the planar block and a primary corner insulation wall 3*b* in the corner block, the secondary barrier 4 may include a secondary flat barrier 41*a* in the planar block and a secondary corner barrier 41*b* in the corner block, and the secondary insulation wall 5 may include a secondary flat insulation wall 5*a* in the planar block and a secondary corner insulation wall 5*b* in the corner block. In the embodiment, as described in the first embodiment, the thickness of the primary insulation wall 3 and the thickness of the secondary insulation wall 5** may be the same or similar in the planar block and the corner block.

In the above description, when a plurality of planar blocks or a plurality of corner blocks are disposed adjacent to each other, the secondary barrier 4 in the planar block and the corner block may include a flat connecting barrier **42*a* or a corner connecting barrier 42*b* connecting the adjacent secondary flat barriers 41*a* disposed adjacent to each other or the adjacent secondary corner barriers 41*b*** disposed adjacent to each other.

As shown in FIG. 9, the corner portion of the liquefied gas storage tank 1 according to the fourth embodiment of the present invention may be formed in a combination of the plurality of corner blocks. A corner structure of the liquefied gas storage tank 1 to be described below may be an obtuse angle corner structure having a predetermined angle, for example, an angle of 135°.

In the embodiment, unlike the drawings, it goes without saying that the primary corner insulation wall **3*b* may be positioned to expose the secondary corner barrier 41*b* formed on the secondary corner insulation wall 5*b* at the center of the corner. Therefore, it goes without saying that the exposed secondary corner barriers 41*b* may be finished by being interconnected by the corner connecting barrier 42*b* or the primary corner insulation wall 3*b* may be stacked on the secondary corner barrier 41*b* and/or the corner connecting barrier 42*b* after the corner connecting barrier 42*b* is formed so that the primary corner insulation wall 3*b* connects the adjacent secondary corner barriers 41*b* disposed adjacent to each other. In the embodiment, the corner connecting barrier 42*b* may be formed not only between the first and second inner fixing units 3b1 and 3b2, but also to extend at least a length overlapping the first and second inner fixing units 3b1 and 3b2**.

The corner block of the liquefied gas storage tank 1 may be disposed at the corner portion in which the first surface and the second surface at different angles that form the storage space accommodating liquefied gas and meet each other and may include the primary corner insulation wall 3b fixing the primary corner barrier 2b made of the metal material and disposed outside the primary corner barrier 2b, the secondary corner barrier 41b provided outside the primary corner insulation wall 3b, and the secondary corner insulation wall 5b disposed outside the secondary corner barrier 41b.

The first surface and the second surface at different angles meet each other to form the accommodation space accommodating the liquefied gas, which is a cryogenic substance, and may be made of a metal material. The primary corner barrier 2b can prevent the liquefied gas from leaking to the outside together with the secondary corner barrier 41b.

Since the primary corner barrier 2b in the embodiment is basically the same as or similar to that of the first embodiment, here, a detailed description thereof will be omitted.

The primary corner insulation wall 3b may be designed to withstand the external impact or the internal impact caused by the sloshing of the liquefied gas while blocking the influence of external heat and installed between the primary corner barrier 2b and the secondary corner barrier 41b. Since a configuration of the primary corner insulation wall 3b in the embodiment is the same as or similar to that of the first embodiment excluding that the primary outer plywood 33b is omitted and the configuration of the inner bent portion 3b3 is changed, here, changed configurations will be mainly described.

The primary corner insulation wall 3b may be provided inside each of the first surface and the second surface and may include the primary inner fixing unit 3b1 and the secondary inner fixing unit 3b2 formed in a structure in which the primary inner plywood 31b and the primary corner insulating material 32b are sequentially stacked outward from the primary corner barrier 2b. Here, since the primary inner plywood 31b and the primary corner insulating material 32b in the embodiment may be the same as or similar to those of the first embodiment, a detailed description thereof will be omitted to avoid overlapping descriptions.

The first inner fixing unit 3b1 may be fixed to the first outer fixing unit 5b1 and provided inside the first surface, and the second inner fixing unit 3b2 may be fixed to the second outer fixing unit 5b2 and provided inside the second surface.

In addition, the primary corner insulation wall 3b may be filled between the first inner fixing unit 3b1 and the second inner fixing unit 3b2 and may include an inner bent portion 3b3 including an outer insulating material 3b33 provided on the secondary corner barrier 41b including the corner connecting barrier 42b and an inner insulating material 3b34 provided between the outer insulating material 3b33 and the primary corner barrier 2b.

The outer insulating material 3b33 of the inner bent portion 3b3 may be made of glass wool, and the secondary barrier 4 in which the secondary corner barrier 41b and the corner connecting barrier 42b are stacked may be provided on an outer surface bent at a predetermined angle, for example, an angle of 135°.

The inner insulating material 3b34 of the inner bent portion 3b3 may be made of low-density polyurethane foam, and the primary corner barrier 2b may be provided on an inner surface bent at a predetermined angle, for example, an angle of 135°.

A thickness of each of the outer insulating material 3b33 and the inner insulating material 3b34 of the inner bent portion 3b3 may be freely formed. The secondary corner barrier 41b may be installed between the primary corner insulation wall 3b and the secondary corner insulation wall 5b, and when the corner blocks are disposed adjacent to each other, the adjacent secondary corner barriers 41b between the first and second outer fixing units 5b1 and 5b2 may be connected by the corner connecting barrier 42b and can prevent the liquefied gas from leaking to the outside together with the primary corner barrier 2b. A basic configuration of the secondary corner barrier 41b in the embodiment may be the same as or similar to that of the first embodiment. However, the arrangement relationship of the secondary corner barrier 41b including the corner connecting barrier 42b in the embodiment may be changed because some components of the primary corner insulation wall 3b and the secondary corner insulation wall 5b are different from those of the first embodiment, which will be described below when the secondary corner insulation wall 5b is described.

The secondary corner insulation wall 5b may include the secondary inner plywood 51b, the secondary corner insulating material 52b, and the secondary outer plywood 53b. The secondary corner insulation wall 5b may be fixed inside each of the first surface and the second surface and may include the first outer fixing unit 5b1 and the second outer fixing unit 5b2 formed in a structure in which the second inner plywood 51b, the secondary corner insulating material 52b, and the secondary outer plywood 53b are sequentially stacked outward from the secondary corner barrier 41b. The first outer fixing unit 5b1 and the second outer fixing unit 5b2 may be provided to be inclined in the direction ED in which the side surface at which the first outer fixing unit 5b1 and the second outer fixing unit 5b2 face each other equally divides the corner portion. In the embodiment, the corner portion has been described as being equally divided but the present invention is not limited thereto, and since the corner portion may not be equally divided according to a corner position, it goes without saying that the corner portion may be provided to be inclined in the direction ED in which the corner portion is unequally divided.

Steps may be formed at corners at which the first outer fixing unit 5b1 and the second outer fixing unit 5b2 face each other.

In addition, the secondary corner insulation wall 5b may include an outer bent portion 5b3 including an insulating material 5b32 filled between stepped portions of the first outer fixing unit 5b1 and the second outer fixing unit 5b2. The insulating material 5b32 of the outer bent portion 5b3 may be made of glass wool, which is the same material as the outer insulating material 3b33 of the inner bent portion 3b3.

By providing the insulating material 5b32 of the outer bent portion 5b3 on the stepped portions of the first outer fixing unit 5b1 and the second outer fixing unit 5b2, the secondary corner barrier 41b including the corner connecting barrier 42b may be fixed to the secondary inner plywood 51b of the first outer fixing unit 5b1, the insulating material 5b32 of the outer bent portion 5b3, and the secondary inner plywood 51b and provided to bent at a predetermined angle, for example, an angle of 135° inside the insulating material 5b32 of the outer bent portion 5b3.

Therefore, in the embodiment, by forming the steps on the corners of the first outer fixing unit 5b1 and the second outer fixing unit 5$b$2 that are respectively fixed to the first surface and the second surface at different angles and face each other, providing the insulating material 5$b$32 of the outer bent portion 5$b$3, which is made of glass wool, on the steps, and providing the outer insulating materials 3$b$33 of the inner bent portion 5$b$3, which is made of glass wool, with the secondary corner barrier 41$b$ including the corner connecting barrier 42$b$ interposed therebetween, it is possible to increase the flexibility of the secondary corner barrier 41$b$ including the corner connecting barrier 42$b$ formed between the glass wools, thereby further preventing the damage to the secondary corner barrier 41$b$ including the corner connecting barrier 42$b$.

FIG. 10 shows a result of structural analysis for a stress value in a YY direction and a temperature distribution of the secondary barrier 4 (41$b$ and 42$b$) at a bent portion at which the first and second outer fixing units 5$b$1 and 5$b$2 face each other, and the stress value in the YY direction was 12.003 MPa, and the temperature was −64.358° C. Comparing these values with the stress value of the bent portion of the secondary barrier in the conventional liquefied gas storage tank being about 66.8984 MPa and the temperature being about −135.857° C., it can be seen that the stress in the secondary barrier 4 (41$b$ and 42$b$) according to the embodiment is much less, which means a reduction in the effect due to the cooling or heating from the cryogenic substance, such as damage to the secondary barrier 4 (41$b$ and 42$b$) caused by the low-temperature stress, in the embodiment compared to the conventional one.

Figure 11:
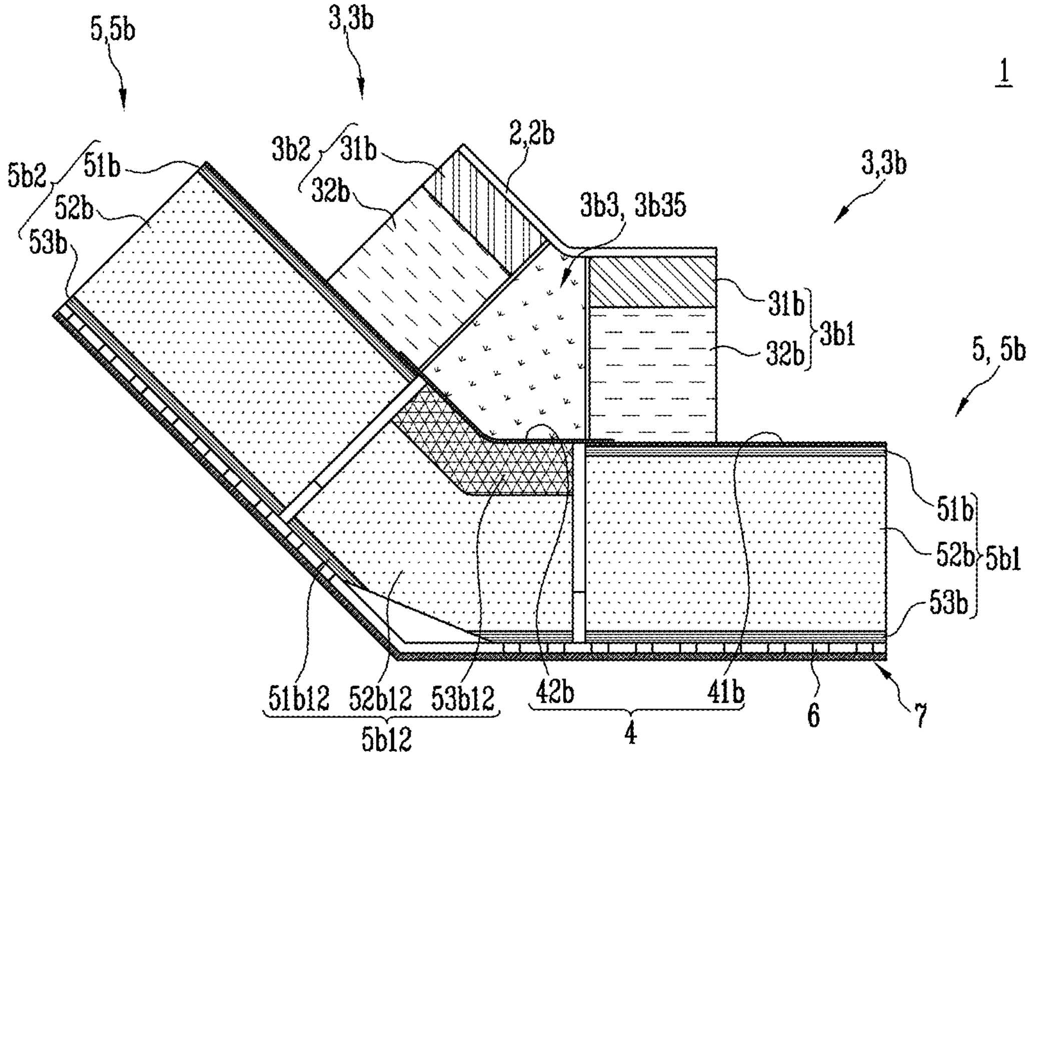
FIG. 11 is a cross-sectional view of a corner portion for explaining a liquefied gas storage tank according to a fifth embodiment of the present invention.
Figure 12:
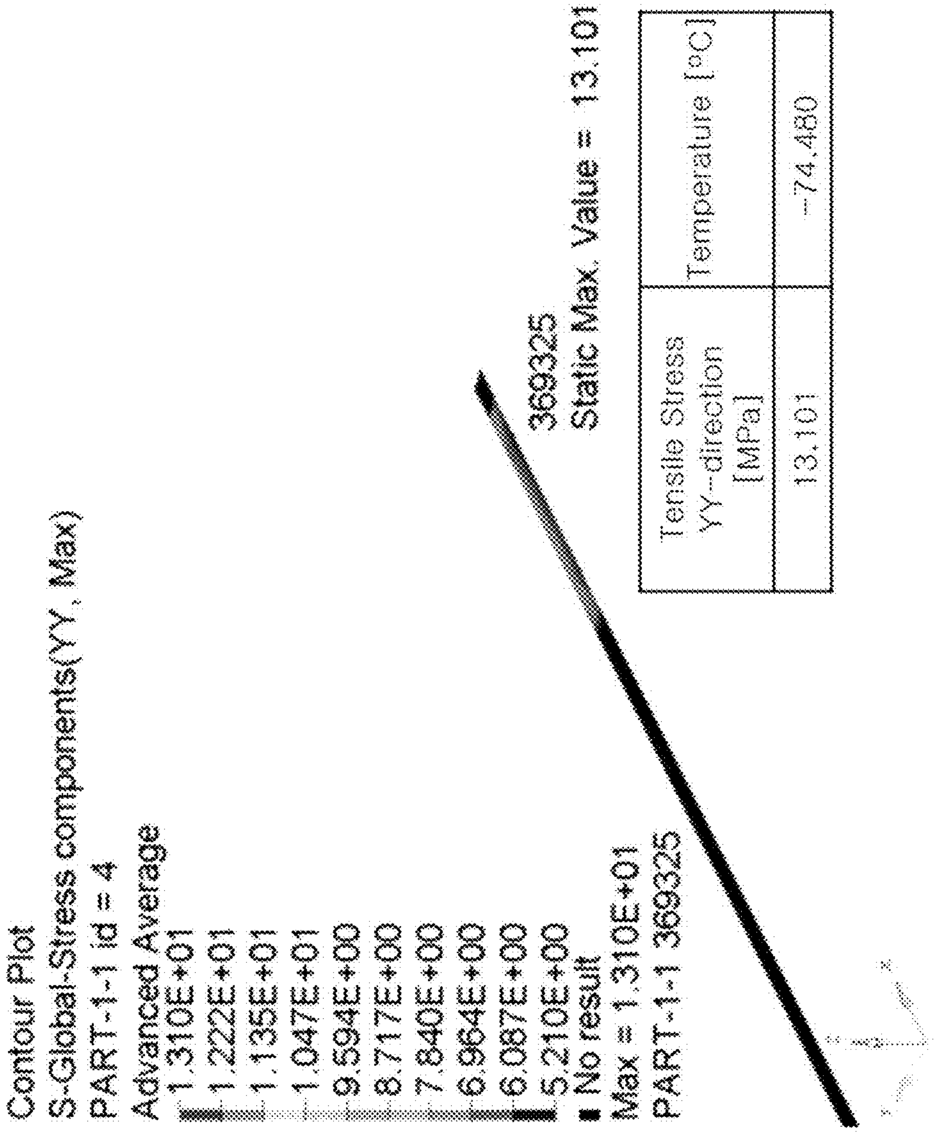
FIG. 12 is a view showing a structural analysis result for the corner portion of the liquefied gas storage tank according to the fifth embodiment of the present invention.

FIG. 11 is a cross-sectional view of a corner portion for explaining a liquefied gas storage tank according to a fifth embodiment of the present invention, and FIG. 12 is a view showing a structural analysis result for the corner portion of the liquefied gas storage tank according to the fifth embodiment of the present invention.

The planar structure of the liquefied gas storage tank 1 in the embodiment may be formed in a combination of the plurality of planar blocks as shown in FIG. 1, and the corner structure of the liquefied gas storage tank 1 may be formed in a combination of the plurality of corner blocks as shown in FIG. 11. The plurality of planar blocks may be connected to a plurality of corner blocks on a corner portion of the liquefied gas storage tank 1.

In the liquefied gas storage tank 1 according to the embodiment, a configuration of the planar block is the same as or similar to the configuration described above with reference to FIG. 1. In other words, as shown in FIG. 1, the planar block of the liquefied gas storage tank 1 in the embodiment may be disposed on the planar portion of the first surface or the second surface at difference angles, which forms the storage space accommodating liquefied gas, and may include the primary flat insulation wall 3$a$ fixing the primary flat barrier 2$a$ made of a metal material and disposed outside the primary flat barrier 2$a$, the secondary flat barrier 41$a$ provided outside the primary flat insulation wall 3$a$, and the secondary flat insulation wall 5$a$ disposed outside the secondary flat barrier 41$a$.

Therefore, here, a detailed description of the configuration of the planar block of the liquefied gas storage tank 1 will be omitted to avoid overlapping descriptions. Hereinafter, the configuration of the corner block of the liquefied gas storage tank 1 according to the embodiment will be described in detail with reference to FIGS. 1 and 11.

As shown in FIGS. 1 and 11, the liquefied gas storage tank 1 may include the primary barrier 2 in contact with the liquefied gas, the primary insulation wall 3 installed outside the primary barrier 2, the secondary barrier 4 installed outside the primary insulation wall 3, and the secondary insulation wall 5 disposed outside the secondary barrier 4. The liquefied gas storage tank 1 may be supported by a hull 7 through a mastic 6 installed between the secondary insulation wall 5 and the hull 7.

In the above description, the primary barrier 2 may include a primary flat barrier 2$a$ in the planar block and a primary corner barrier 2$b$ in the corner block, the primary insulation wall 3 may include a primary flat insulation wall 3$a$ in the planar block and a primary corner insulation wall 3$b$ in the corner block, the secondary barrier 4 may include a secondary flat barrier 41$a$ in the planar block and a secondary corner barrier 41$b$ in the corner block, and the secondary insulation wall 5 may include a secondary flat insulation wall 5$a$ in the planar block and a secondary corner insulation wall 5$b$ in the corner block. In the embodiment, as described in the first embodiment, the thickness of the primary insulation wall 3 and the thickness of the secondary insulation wall 5 may be the same or similar in the planar block and the corner block.

In the above description, when a plurality of planar blocks or a plurality of corner blocks are disposed adjacent to each other, the secondary barrier 4 in the planar block and the corner block may include a flat connecting barrier 42$a$ or a corner connecting barrier 42$b$ connecting the adjacent secondary flat barriers 41$a$ disposed adjacent to each other or the adjacent secondary corner barriers 41$b$ disposed adjacent to each other.

As shown in FIG. 11, the corner portion of the liquefied gas storage tank 1 according to the fifth embodiment of the present invention may be formed in a combination of the plurality of corner blocks. A corner structure of the liquefied gas storage tank 1 to be described below may be an obtuse angle corner structure having a predetermined angle, for example, an angle of 135°.

In the embodiment, unlike the drawings, it goes without saying that the primary corner insulation wall 3$b$ may be positioned to expose the secondary corner barrier 41$b$ formed on the secondary corner insulation wall 5$b$ at the center of the corner. Therefore, it goes without saying that the exposed secondary corner barriers 41$b$ may be finished by being interconnected by the corner connecting barrier 42$b$ or the primary corner insulation wall 3$b$ may be stacked on the secondary corner barrier 41$b$ and/or the corner connecting barrier 42$b$ after the corner connecting barrier 42$b$ is formed so that the primary corner insulation wall 3$b$ connects the adjacent secondary corner barriers 41$b$ disposed adjacent to each other. In the embodiment, the corner connecting barrier 42$b$ may be formed not only between the first and second inner fixing units 3$b$1 and 3$b$2, but also to extend at least a length overlapping the first and second inner fixing units 3$b$1 and 3$b$2.

The corner block of the liquefied gas storage tank 1 may be disposed at the corner portion in which the first surface and the second surface at different angles that form the storage space accommodating liquefied gas and meet each other and may include the primary corner insulation wall 3$b$ fixing the primary corner barrier 2$b$ made of the metal material and disposed outside the primary corner barrier 2$b$, the secondary corner barrier 41$b$ provided outside the primary corner insulation wall 3$b$, and the secondary corner insulation wall 5$b$ disposed outside the secondary corner barrier 41$b$.

The primary corner barrier 2$b$ may be disposed at the corner portion in which the first surface and the second surface at different angles meet each other to form the accommodation space accommodating the liquefied gas, which is a cryogenic substance, and may be made of a metal material. The primary corner barrier 2*b* can prevent the liquefied gas from leaking to the outside together with the secondary corner barrier 41*b*.

Since the primary corner barrier 2*b* in the embodiment is basically the same as or similar to that of the first embodiment, here, a detailed description thereof will be omitted.

The primary corner insulation wall 3*b* may be designed to withstand the external impact or the internal impact caused by the sloshing of the liquefied gas while blocking the influence of external heat and installed between the primary corner barrier 2*b* and the secondary corner barrier 41*b*. Since the configuration of the primary corner insulation wall 3*b* in the embodiment is the same as or similar to that of the first embodiment excluding that the primary outer plywood 33*b* is omitted, here, changed configurations will be mainly described.

The primary corner insulation wall 3*b* may be provided inside each of the first surface and the second surface and may include the primary inner fixing unit 3*b*1 and the secondary inner fixing unit 3*b*2 formed in a structure in which the primary inner plywood 31*b* and the primary corner insulating material 32*b* are sequentially stacked outward from the primary corner barrier 2*b*. Here, since the primary inner plywood 31*b* and the primary corner insulating material 32*b* in the embodiment may be the same as or similar to those of the first embodiment, a detailed description thereof will be omitted to avoid overlapping descriptions.

The first inner fixing unit 3*b*1 may be fixed to the first outer fixing unit 5*b*1 and provided inside the first surface, and the second inner fixing unit 3*b*2 may be fixed to the second outer fixing unit 5*b*2 and provided inside the second surface.

In addition, the primary corner insulation wall 3*b* may include the inner bent portion 3*b*3 formed by filling a space between the first inner fixing unit 3*b*1 and the second inner fixing unit 3*b*2 with an insulating material 3*b*35. Since the insulating material 3*b*35 of the inner bent portion 3*b*3 in the embodiment may be the same as or similar to that of the first embodiment, a detailed description thereof will be omitted to avoid overlapping descriptions.

The secondary corner barrier 41*b* may be installed between the primary corner insulation wall 3*b* and the secondary corner insulation wall 5*b*, and when the corner blocks are disposed adjacent to each other, the adjacent secondary corner barriers 41*b* between the first and second outer fixing units 5*b*1 and 5*b*2 may be connected by the corner connecting barrier 42*b* and can prevent the liquefied gas from leaking to the outside together with the primary corner barrier 2*b*. A basic configuration of the secondary corner barrier 41*b* in the embodiment may be the same as or similar to that of the first embodiment. However, the arrangement relationship of the secondary corner barrier 41*b* including the corner connecting barrier 42*b* in the embodiment may be changed because some components of the secondary corner insulation wall 5*b* are different from those of the first embodiment, which will be described below when the secondary corner insulation wall 5*b* is described.

The secondary corner insulation wall 5*b* may include the secondary inner plywood 51*b*, the secondary corner insulating material 52*b*, and the secondary outer plywood 53*b*. The secondary corner insulation wall 5*b* may be fixed inside each of the first surface and the second surface and may include the first outer fixing unit 5*b*1 and the second outer fixing unit 5*b*2 formed in a structure in which the second inner plywood 51*b*, the secondary corner insulating material 52*b*, and the secondary outer plywood 53*b* are sequentially stacked outward from the secondary corner barrier 41*b*.

The first inner fixing unit 3*b*1 may be fixed to the first outer fixing unit 5*b*1 and provided inside the first surface, and the second inner fixing unit 3*b*2 may be fixed to the second outer fixing unit 5*b*2 and provided inside the second surface.

In addition, the secondary corner insulation wall 5*b* may include an outer intermediate fixing unit 5*b*12 provided between the first outer fixing unit 5*b*1 and the second outer fixing unit 5*b*2 and having the bent portion of the secondary corner barrier 41*b* including the corner connecting barrier 42*b* seated thereon. The outer intermediate fixing unit 5*b*12 may include an outer intermediate plywood 51*b*12 fixed to each of the first surface and the second surface, an outer intermediate insulating material 52*b*12 provided inside the outer intermediate plywood 51*b*12, and an inner intermediate insulating material 53*b*12 provided inside the outer intermediate insulating material 52*b*12 and having the bent portion of the secondary corner barrier 41*b* including the corner connecting barrier 42*b* seated thereon.

The outer intermediate plywood 51*b*12 may be positioned collinearly with the secondary inner plywood 51*b* and may have the same configuration as the secondary inner plywood 51*b*.

The outer intermediate insulating material 52*b*12 may be made of polyurethane foam.

The inner intermediate insulating material 53*b*12 may be made of glass wool. By providing the outer intermediate fixing unit 5*b*12 in which the outer intermediate plywood 51*b*12, the outer intermediate insulating material 52*b*12, and the inner intermediate insulating material 53*b*12 are stacked between the first outer fixing unit 5*b*1 and the second outer fixing unit 5*b*2, the secondary corner barrier 41*b* including the corner connecting barrier 42*b* may be fixed to the secondary inner plywood 51*b* of the first outer fixing unit 5*b*1, the inner intermediate insulating material 53*b*12 of the outer intermediate fixing unit 5*b*12, and the secondary inner plywood 51*b* of the second outer fixing unit 5*b*2 and provided to be bent at a predetermined angle, for example, an angle of 135° inside the inner intermediate insulating material 53*b*12 of the outer intermediate fixing unit 5*b*12.

Therefore, in the embodiment, by providing the outer intermediate fixing unit 5*b*12 between the first outer fixing unit 5*b*1 and the second outer fixing unit 5*b*2 respectively fixed to the first surface and the second surface at different angles, it is possible to increase the flexibility of the secondary corner barrier 41*b* including the corner connecting barrier 42*b* formed above the inner intermediate insulating material 53*b*12 of the outer intermediate fixing unit 5*b*12 made of glass wool, thereby further preventing the damage to the secondary corner barrier 41*b* including the corner connecting barrier 42*b*.

In addition, in the embodiment, by forming the first outer fixing unit 5*b*1 and the second outer fixing unit 5*b*2 that are respectively fixed to the first surface and the second at different angles and spaced a predetermined distance from each other and providing the outer intermediate fixing unit 5*b*12 between the first and second outer fixing units 5*b*1 and 5*b*2, it is possible to mitigate contraction or expansion stresses caused by temperatures in the outer fixing units 5*b*1, 5*b*2, and 5*b*12 having two gaps in the embodiment by each gap formed between the first outer fixing unit 5*b*1 and the outer intermediate fixing unit 5*b*12 and between the second outer fixing unit 5*b*2 and the outer intermediate fixing unit 5*b*12 compared to the conventional outer fixing unit having one gap, thereby preventing the damage to the secondary corner barrier 41_b_ including the corner connecting barrier 42_b_ fixed to the outer fixing units 5_b_1, 5_b_2, and 5_b_12.

FIG. 12 shows a result of structural analysis for a stress value in a YY direction and a temperature distribution of the secondary barrier 4 (41_b_ and 42_b_) at a bent portion at which the first and second outer fixing units 5_b_1 and 5_b_2 face each other, and the stress value in the YY direction was 13.101 MPa, and the temperature was −74.480° C. Comparing these values with the stress value of the bent portion of the secondary barrier in the conventional liquefied gas storage tank being about 66.8984 MPa and the temperature being about −135.857° C., it can be seen that the stress in the secondary barrier 4 (41_b_ and 42_b_) according to the embodiment is much less, which means a reduction in the effect due to the cooling or heating from the cryogenic substance, such as damage to the secondary barrier 4 (41_b_ and 42_b_) caused by the low-temperature stress, in the embodiment compared to the conventional one.

Figure 13:
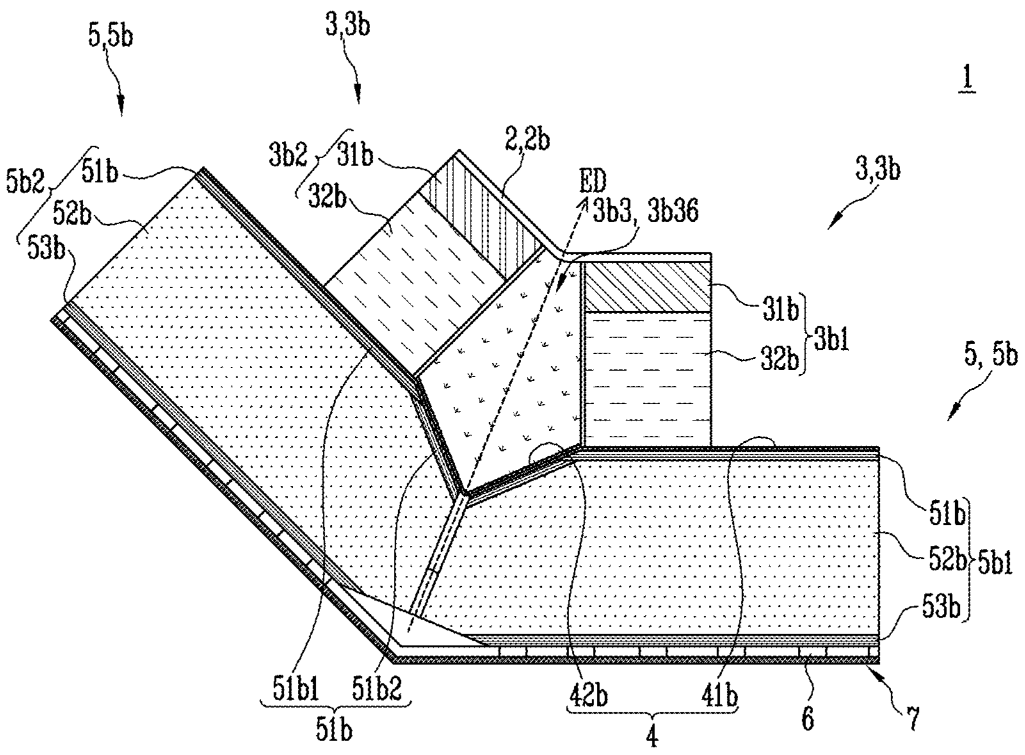
FIG. 13 is a cross-sectional view of a corner portion for describing a liquefied gas storage tank according to a sixth embodiment of the present invention.
Figure 14:
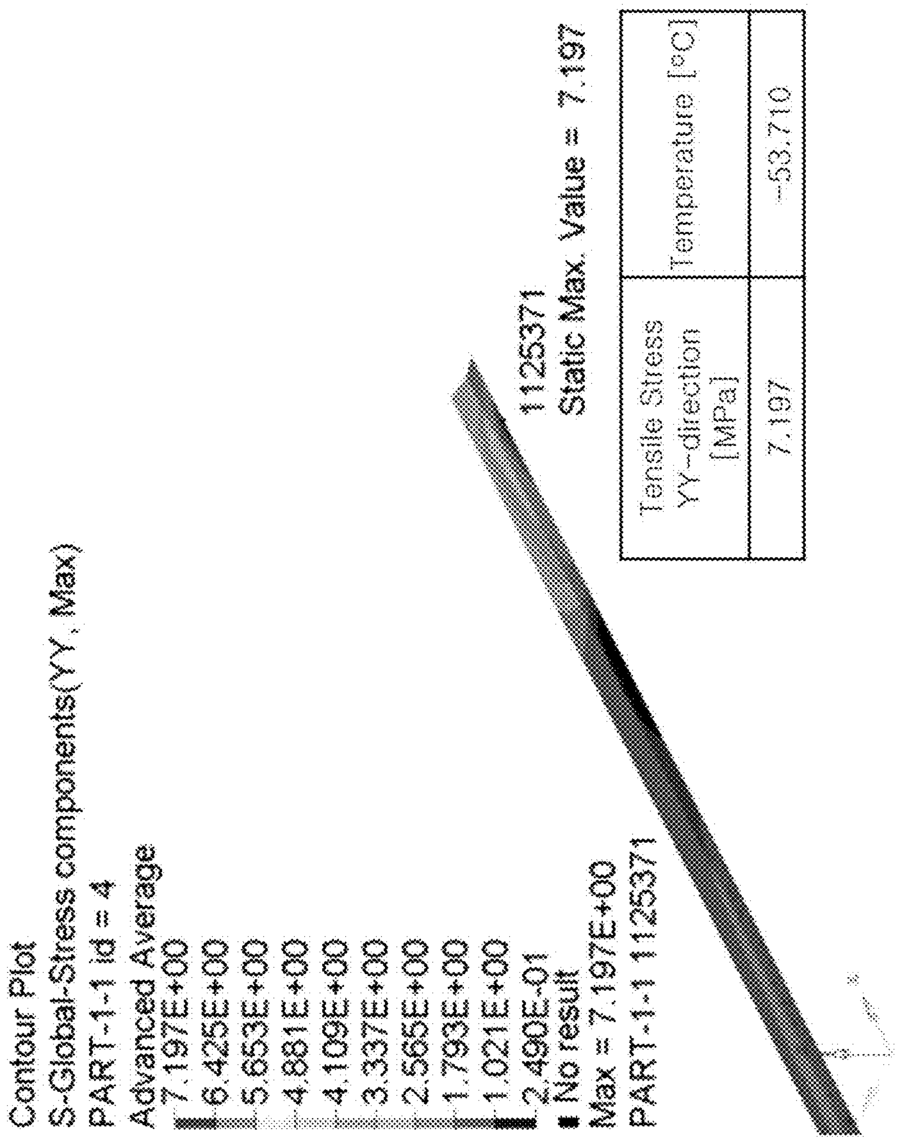
FIG. 14 is a view showing a structural analysis result for the corner portion of the liquefied gas storage tank according to the sixth embodiment of the present invention.

FIG. 13 is a cross-sectional view of a corner portion for describing a liquefied gas storage tank according to a sixth embodiment of the present invention, and FIG. 14 is a view showing a structural analysis result for the corner portion of the liquefied gas storage tank according to the sixth embodiment of the present invention. The planar structure of the liquefied gas storage tank 1 in the embodiment may be formed in a combination of the plurality of planar blocks as shown in FIG. 1, and the corner structure of the liquefied gas storage tank 1 may be formed in a combination of the plurality of corner blocks as shown in FIG. 13. The plurality of planar blocks may be connected to a plurality of corner blocks on a corner portion of the liquefied gas storage tank 1.

In the liquefied gas storage tank 1 according to the embodiment, a configuration of the planar block is the same as or similar to the configuration described above with reference to FIG. 1. In other words, as shown in FIG. 1, the planar block of the liquefied gas storage tank 1 in the embodiment may be disposed on the planar portion of the first surface or the second surface at difference angles, which forms the storage space accommodating liquefied gas, and may include the primary flat insulation wall 3_a_ fixing the primary flat barrier 2_a_ made of a metal material and disposed outside the primary flat barrier 2_a_, the secondary flat barrier 41_a_ provided outside the primary flat insulation wall 3_a_, and the secondary flat insulation wall 5_a_ disposed outside the secondary flat barrier 41_a_.

Therefore, here, a detailed description of the configuration of the planar block of the liquefied gas storage tank 1 will be omitted to avoid overlapping descriptions. Hereinafter, the configuration of the corner block of the liquefied gas storage tank 1 according to the embodiment will be described in detail with reference to FIGS. 1 and 13.

As shown in FIGS. 1 and 13, the liquefied gas storage tank 1 may include the primary barrier 2 in contact with the liquefied gas, the primary insulation wall 3 installed outside the primary barrier 2, the secondary barrier 4 installed outside the primary insulation wall 3, and the secondary insulation wall 5 disposed outside the secondary barrier 4. The liquefied gas storage tank 1 may be supported by a hull 7 through a mastic 6 installed between the secondary insulation wall 5 and the hull 7.

In the above description, the primary barrier 2 may include a primary flat barrier 2_a_ in the planar block and a primary corner barrier 2_b_ in the corner block, the primary insulation wall 3 may include a primary flat insulation wall 3_a_ in the planar block and a primary corner insulation wall 3_b_ in the corner block, the secondary barrier 4 may include a secondary flat barrier 41_a_ in the planar block and a secondary corner barrier 41_b_ in the corner block, and the secondary insulation wall 5 may include a secondary flat insulation wall 5_a_ in the planar block and a secondary corner insulation wall 5_b_ in the corner block. In the embodiment, as described in the first embodiment, the thickness of the primary insulation wall 3 and the thickness of the secondary insulation wall 5 may be the same or similar in the planar block and the corner block.

In the above description, when a plurality of planar blocks or a plurality of corner blocks are disposed adjacent to each other, the secondary barrier 4 in the planar block and the corner block may include a flat connecting barrier 42_a_ or a corner connecting barrier 42_b_ connecting the adjacent secondary flat barriers 41_a_ disposed adjacent to each other or the adjacent secondary corner barriers 41_b_ disposed adjacent to each other.

As shown in FIG. 13, the corner portion of the liquefied gas storage tank 1 according to the sixth embodiment of the present invention may be formed in a combination of the plurality of corner blocks. A corner structure of the liquefied gas storage tank 1 to be described below may be an obtuse angle corner structure having a predetermined angle, for example, an angle of 135°.

The corner block of the liquefied gas storage tank 1 may be disposed at the corner portion in which the first surface and the second surface at different angles that form the storage space accommodating liquefied gas and meet each other and may include the primary corner insulation wall 3_b_ fixing the primary corner barrier 2_b_ made of the metal material and disposed outside the primary corner barrier 2_b_, the secondary corner barrier 41_b_ provided outside the primary corner insulation wall 3_b_, and the secondary corner insulation wall 5_b_ disposed outside the secondary corner barrier 41_b_.

The primary corner barrier 2_b_ may be disposed at the corner portion in which the first surface and the second surface at different angles meet each other to form the accommodation space accommodating the liquefied gas, which is a cryogenic substance, and may be made of a metal material. The primary corner barrier 2_b_ and the secondary corner barrier 41_b_ can prevent the liquefied gas from leaking to the outside.

Since the primary corner barrier 2_b_ in the embodiment is basically the same as or similar to that of the first embodiment, here, a detailed description thereof will be omitted.

The primary corner insulation wall 3_b_ may be designed to withstand the external impact or the internal impact caused by the sloshing of the liquefied gas while blocking the influence of external heat and installed between the primary corner barrier 2_b_ and the secondary corner barrier 41_b_. Since a configuration of the primary corner insulation wall 3_b_ in the embodiment is the same as or similar to that of the first embodiment excluding that the primary outer plywood 33_b_ is omitted and a shape of an outer surface of the insulating material 3_b_31 of the inner bent portion 3_b_3 is changed, here, changed configurations will be mainly described.

The primary corner insulation wall 3_b_ may be provided inside each of the first surface and the second surface and may include the primary inner fixing unit 3_b_1 and the secondary inner fixing unit 3_b_2 formed in a structure in which the primary inner plywood 31_b_ and the primary corner insulating material 32_b_ are sequentially stacked outward from the primary corner barrier 2_b_. Here, since the primary inner plywood 31_b_ and the primary corner insulating material 32_b_ in the embodiment may be the same as or similar to those of the first embodiment, a detailed description thereof will be omitted to avoid overlapping descriptions.

The first inner fixing unit **3*b*1 may be fixed to the first outer fixing unit 5*b*1 and provided inside the first surface, and the second inner fixing unit 3*b*2 may be fixed to the second outer fixing unit 5*b*2 and provided inside the second surface. In addition, the primary corner insulation wall 3*b* may include the inner bent portion 3*b*3 formed by filling a space between the first inner fixing unit 3*b*1 and the second inner fixing unit 3*b*2 with an insulating material 3*b*36. An insulating material 3*b*36 of the inner bent portion 3*b*3 in the embodiment may be the same as or similar to that of the first embodiment. However, the shape of the outer surface of the insulating material 3*b*36 of the inner bent portion 3*b*3 in the embodiment may be changed because the configurations of the first and second outer fixing units 5*b*1 and 5*b*2** are changed.

In other words, since the chamfers are formed at the corners at which the first outer fixing unit **5*b*1 and the second outer fixing unit 5*b*2 face each other, the insulating material 3*b*36 of the inner bent portion 3*b*3 in the embodiment has a shape in which an outer surface protrudes outward from the first inner fixing unit 3*b*1 or the second inner fixing unit 3*b*2**.

The secondary corner barrier **41*b* may be installed between the primary corner insulation wall 3*b* and the secondary corner insulation wall 5*b*, and when the corner blocks are disposed adjacent to each other, the adjacent secondary corner barriers 41*b* between the first and second outer fixing units 5*b*1 and 5*b*2 may be connected by the corner connecting barrier 42*b* and can prevent the liquefied gas from leaking to the outside together with the primary corner barrier 2*b*. In the embodiment, the corner connecting barrier 42*b* may be formed not only between the first and second inner fixing units 3*b*1 and 3*b*2, but also to extend at least a length overlapping the first and second inner fixing units 3*b*1 and 3*b*2**.

A basic configuration of the secondary corner barrier **41*b* in the embodiment may be the same as or similar to that of the first embodiment. However, the arrangement relationship of the secondary corner barrier 41*b* including the corner connecting barrier 42*b* in the embodiment may be changed because some components of the secondary corner insulation wall 5*b* are different from those of the first embodiment, which will be described below when the secondary corner insulation wall 5*b*** is described.

The secondary corner insulation wall **5*b* may include the secondary inner plywood 51*b*, the secondary corner insulating material 52*b*, and the secondary outer plywood 53*b*. The secondary corner insulation wall 5*b* may be fixed inside each of the first surface and the second surface and may include the first outer fixing unit 5*b*1 and the second outer fixing unit 5*b*2 formed in a structure in which the second inner plywood 51*b*, the secondary corner insulating material 52*b*, and the secondary outer plywood 53*b* are sequentially stacked outward from the secondary corner barrier 41*b***.

The first outer fixing unit **5*b*1 and the second outer fixing unit 5*b*2 may be provided to be inclined in the direction ED in which a side surface at which the first outer fixing unit 5*b*1 and the second outer fixing unit 5*b*2** face each other equally divides the corner portion. In the embodiment, the corner portion has been described as being equally divided but the present invention is not limited thereto, and since the corner portion may not be equally divided according to a corner position, it goes without saying that the corner portion may be provided to be inclined in the direction ED in which the corner portion is unequally divided.

Chamfers may be formed at corners at which the first outer fixing unit **5*b*1 and the second outer fixing unit 5*b*2** face each other.

In the embodiment, the secondary inner plywood **51*b* may include a nearby plywood 51*b*1 parallel to the secondary outer plywood 53*b* and fixed on the secondary corner insulating material 52*b* and an inclined plywood 51*b*2 connected to the nearby plywood 51*b*1 and fixed on the secondary corner insulating material 52*b*. Therefore, unlike the first embodiment, the primary corner insulating material 32*b* may be provided on the nearby plywood 51*b*1, and the insulating material 3*b*36 of the inner bent portion 3*b*3 may be provided on the inclined plywood 51*b*2**.

By providing the inclined plywood **51*b*2 and the insulating material 3*b*36 of the inner bent portion 3*b*3 on the chamfer portions of the first outer fixing unit 5*b*1 and the second outer fixing unit 5*b*2, the secondary corner barrier 41*b* including the corner connecting barrier 42*b* may be fixed to the nearby plywood 51*b*1 of the first outer fixing unit 5*b*1, the inclined plywood 5*b*2 of the first outer fixing unit 5*b*1, the inclined plywood 5*b*2 of the second outer fixing unit 5*b*2, and the nearby plywood 51*b*1 of the second outer fixing unit 5*b*2**.

In addition, the secondary corner barrier **41*b* including the corner connecting barrier 42*b* may be bent to protrude outward so as to be seated on the chamfer portions of the first outer fixing unit 5*b*1 and the second outer fixing unit 5*b*2**.

In other words, the secondary corner barrier **41*b* including the corner connecting barrier 42*b* may be provided to be bent outward between the nearby plywood 51*b*1 of the first outer fixing unit 5*b*1 and the inclined plywood 51*b*2 of the first outer fixing unit 5*b*1, bent inward between the inclined plywood 51*b*2 of the first outer fixing unit 5*b*1 and the inclined plywood 51*b*2 of the second outer fixing unit 5*b*2, and bent outward between the inclined plywood 51*b*2 of the second outer fixing unit 5*b*2 and the nearby plywood 51*b*1 of the second outer fixing unit 5*b*2**.

Therefore, in the embodiment, by forming the chamfers at the corners of the first outer fixing unit **5*b*1 and the second outer fixing unit 5*b*2 that are respectively fixed to the first surface and the second surface at different angles and face each other and installing the secondary corner barrier 41*b* including the corner connecting barrier 42*b* along the surfaces of the first and second outer fixing units 5*b*1 and 5*b*2 including the chamfer portions, it is possible to increase the length of the portion in which the secondary corner barrier 41*b* including the corner connecting barrier 42*b* is bent to protrude outward and is not attached to the secondary corner insulation wall 5*b*, thereby not only further reducing the probability of the damage to the secondary corner barrier 41*b* including the corner connecting barrier 42*b* due to the increase in the flexibility of the secondary corner barrier 41*b* including the corner connecting barrier 42*b* but also easily absorbing the deformation of the hull and further reducing the low-temperature stress in the secondary corner barrier 41*b* including the corner connecting barrier 42*b***.

FIG. 14 shows a result of structural analysis for a stress value in a YY direction and a temperature distribution of the secondary barrier 4 (**41*b* and 42*b*) at a bent portion at which the first and second outer fixing units 5*b*1 and 5*b*2 face each other, and the stress value in the YY direction was 7.197 MPa, and the temperature was −53.710° C. Comparing these values with the stress value of the bent portion of the secondary barrier of the conventional liquefied gas storage tank being about 66.8984 MPa and the temperature being about −135.857° C., it can be seen that the stress is much less in the secondary barrier 4 (41*b* and 42*b*) according to the embodiment, which means a reduction in the effect caused by the cooling or heating from the cryogenic substance, such as damage to the secondary barrier 4 (41***b* and 42*b*) due to the low-temperature stress in the embodiment compared to the conventional one.

Figure 15:
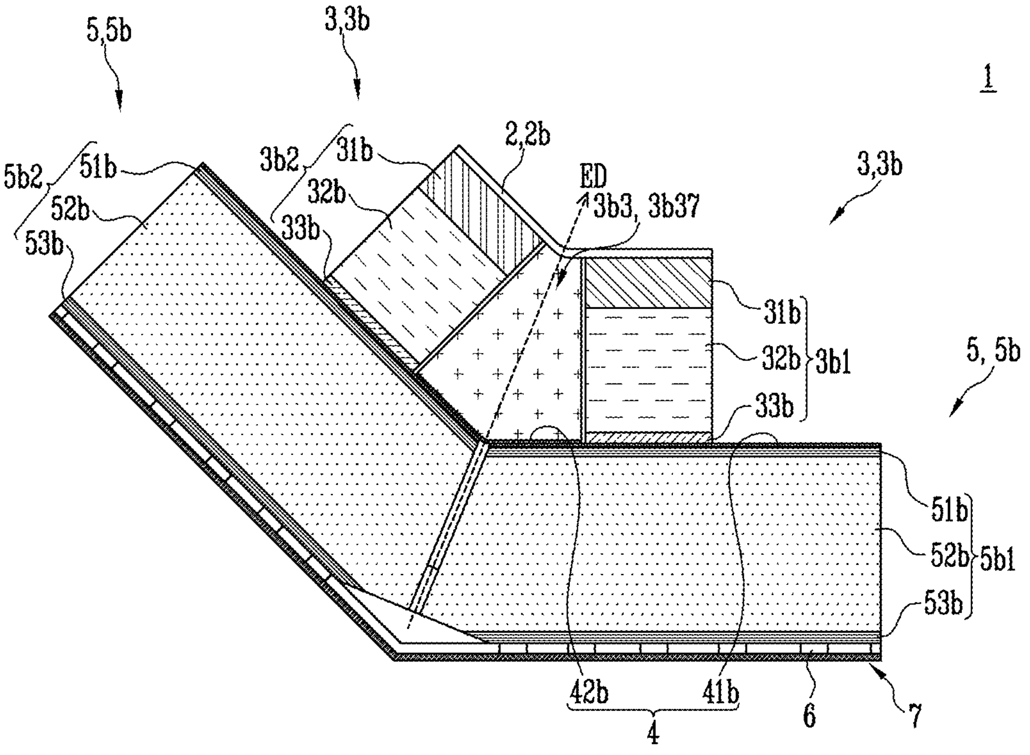
FIG. 15 is a cross-sectional view of a corner portion for describing a liquefied gas storage tank according to a seventh embodiment of the present invention.
Figure 16:
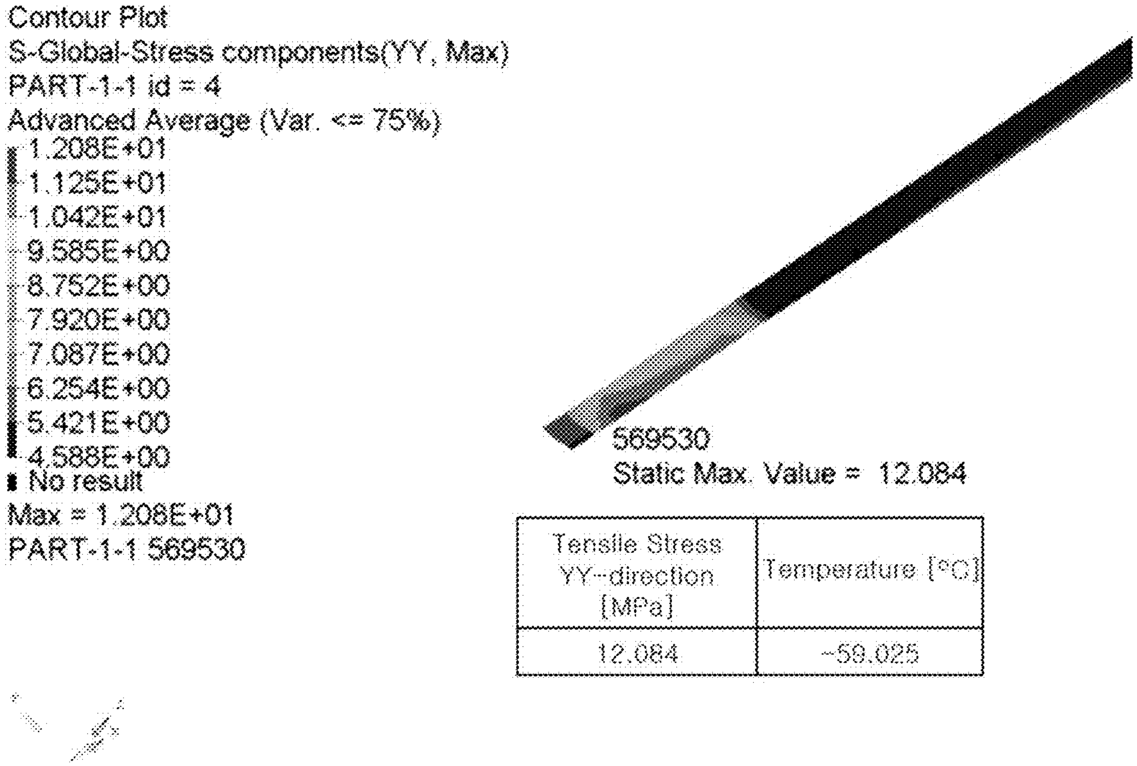
FIG. 16 is a view showing a structural analysis result for the corner portion of the liquefied gas storage tank according to the seventh embodiment of the present invention.

FIG. 15 is a cross-sectional view of a corner portion for describing a liquefied gas storage tank according to a seventh embodiment of the present invention, and FIG. 16 is a view showing a structural analysis result for the corner portion of the liquefied gas storage tank according to the seventh embodiment of the present invention.

As shown in FIG. 15, since a configuration other than the configuration of the inner bent portion 3*b*3 in the liquefied gas storage tank 1 according to the embodiment may be the same as or similar to that of the liquefied gas storage tank 1 according to the first embodiment, a detailed description of the same configuration will be omitted to avoid overlapping descriptions, and changed configurations will be mainly described.

Since a configuration of the primary corner insulation wall 3*b* in the embodiment is the same as or similar to that of the first embodiment excluding that a portion in which the inner bent portion 3*b*3 filled with the insulating material 3*b*31 is disposed is changed, here, changed configurations will be mainly described.

The primary corner insulation wall 3*b* in the embodiment may include a vacuum insulation panel 3*b*37 filling the inner bent portion 3*b*3 between the first inner fixing unit 3*b*1 and the second inner fixing unit 3*b*2.

In the embodiment, since the first inner fixing unit 3*b*1 and the second inner fixing unit 3*b*2 are non-structural members, the vacuum insulation panel 3*b*37, which is a structural member, is easily formed between the first inner fixing unit 3*b*1 and the second inner fixing unit 3*b*2. The vacuum insulation panel 3*b*37 can have excellent insulation performance among various insulating material, such as polyurethane foam, thereby increasing the insulation performance of the corner portion.

FIG. 16 shows a result of structural analysis for a stress value in a YY direction and a temperature distribution of the secondary barrier 4 (41*b* and 42*b*) at a bent portion at which the first and second outer fixing units 5*b*1 and 5*b*2 face each other, and the stress value in the YY direction was 12.084 MPa, and the temperature was −59.025° C. Comparing these values with the stress value of the bent portion of the secondary barrier of the conventional liquefied gas storage tank being about 66.8984 MPa and the temperature being about −135.857° C., it can be seen that the stress is much less in the secondary barrier 4 (41*b* and 42*b*) according to the embodiment, which means a reduction in the effect caused by the cooling or heating from the cryogenic substance, such as damage to the secondary barrier 4 (41*b* and 42*b*) due to the low-temperature stress in the embodiment compared to the conventional one.

Figure 17:
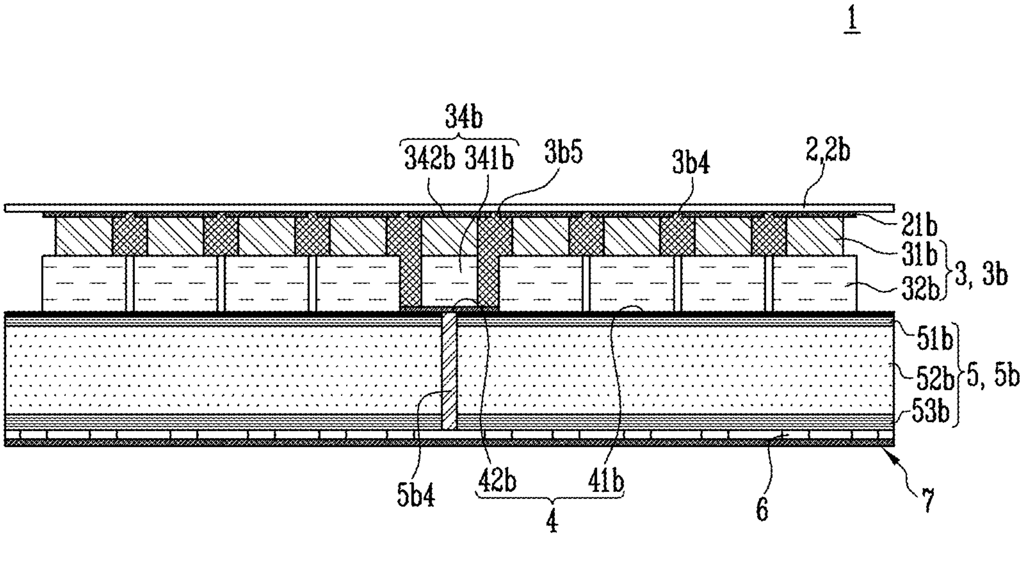
FIG. 17 is a partial front view of a corner portion for describing a liquefied gas storage tank according to an eighth embodiment of the present invention.

FIG. 17 is a partial front view of a corner portion for describing a liquefied gas storage tank according to an eighth embodiment of the present invention.

As shown in FIG. 1, the planar structure of the liquefied gas storage tank 1 in the embodiment may be formed in a combination of the plurality of planar blocks, and the corner structure of the liquefied gas storage tank 1 may be formed in a combination of the plurality of corner blocks as shown in FIG. 17. The plurality of planar blocks may be connected to a plurality of corner blocks on a corner portion of the liquefied gas storage tank 1.

In the liquefied gas storage tank 1 in the embodiment, a configuration of the planar block is the same as or similar to the configuration described above with reference to FIG. 1. In other words, as shown in FIG. 1, the planar block of the liquefied gas storage tank 1 in the embodiment may be disposed on the planar portion of the first surface or the second surface at difference angles, which forms the storage space accommodating liquefied gas, and may include the primary flat insulation wall 3*a* fixing the primary flat barrier 2*a* made of the metal material and disposed outside the primary flat barrier 2*a*, the secondary flat barrier 41*a* provided outside the primary flat insulation wall 3*a*, and the secondary flat insulation wall 5*a* disposed outside the secondary flat barrier 41*a*.

Therefore, here, a detailed description of the configuration of the planar block of the liquefied gas storage tank 1 will be omitted to avoid overlapping descriptions. Hereinafter, the configuration of the corner block of the liquefied gas storage tank 1 in the embodiment will be described in detail with reference to FIGS. 1 and 17.

As shown in FIGS. 1 and 17, the liquefied gas storage tank 1 may include the primary barrier 2 in contact with the liquefied gas, the primary insulation wall 3 installed outside the primary barrier 2, the secondary barrier 4 installed outside the primary insulation wall 3, and the secondary insulation wall 5 disposed outside the secondary barrier 4. The liquefied gas storage tank 1 may be supported on the hull 7 by the mastic 6 installed between the secondary insulation wall 5 and the hull 7.

In the above description, the primary barrier 2 may include the primary flat barrier 2*a* in the planar block and the primary corner barrier 2*b* in the corner block, the primary insulation wall 3 may include the primary flat insulation wall in the planar block and the primary corner insulation wall 3*b* in the corner block, the secondary barrier 4 may include the secondary flat barrier 41*a* in the planar block and the secondary corner barrier 41*b* in the corner block, and the secondary insulation wall 5 may include the secondary flat insulation wall 5*a* in the planar block and the secondary corner insulation wall 5*b* in the corner block. In the embodiment, as described in the first embodiment, the thickness of the primary insulation wall 3 and the thickness of the secondary insulation wall 5 may be the same or similar in the planar block and the corner block.

In the above description, when the plurality of planar blocks or the plurality of corner blocks are disposed adjacent to each other, the secondary barrier 4 in the planar block and the corner block may include the flat connecting barrier 42*a* or the corner connecting barrier 42*b* connecting the adjacent secondary flat barriers 41*a* disposed adjacent to each other or the adjacent secondary corner barriers 41*b* disposed adjacent to each other.

As shown in FIG. 17, the corner portion of the liquefied gas storage tank 1 according to the eighth embodiment of the present invention may be formed in a combination of the plurality of corner blocks.

The corner block of the liquefied gas storage tank 1 may be disposed at the corner portion in which the first surface and the second surface at different angles that form the storage space accommodating liquefied gas and meet each other and may include the primary corner insulation wall 3*b* fixing the primary corner barrier 2*b* made of the metal material and disposed outside the primary corner barrier 2*b*, the secondary corner barrier 41*b* provided outside the primary corner insulation wall 3*b*, and the secondary corner insulation wall 5*b* disposed outside the secondary corner barrier 41*b*.

The primary corner barrier 2*b* may be disposed at the corner portion in which the first surface and the second surface at different angles meet each other to form the accommodation space for accommodating the liquefied gas, which is a cryogenic substance, and may be made of the metal material. The primary corner barrier 2*b* can prevent the liquefied gas from leaking to the outside together with the secondary corner barrier 41*b*. Since the primary corner barrier 2*b* in the embodiment is basically the same as or similar to that of the first embodiment, a detailed description thereof will be omitted here.

The primary corner barrier 2*b* may be fixed to a barrier fixing member 21*b*.

The barrier fixing member 21*b* may be made of a metal material and installed on the primary corner insulation wall 3*b*. A plurality of primary corner insulation walls 3*b* may be disposed along sides of the corner portion on the secondary corner insulation wall 5*b*, and thus the barrier fixing member 21*b* may be independently installed on each of the plurality of primary corner insulation walls 3*b*.

The primary corner insulation wall 3*b* may be designed to withstand the external impact or the internal impact caused by the sloshing of the liquefied gas while blocking the influence of external heat and installed between the primary corner barrier 2*b* and the secondary corner barrier 41*b*.

The primary corner insulation wall 3*b* may include the primary corner insulating materials 32*b* provided inside each of the first surface and the second surface and fixed to the secondary corner barrier 41*b* and the primary inner plywood 31*b* disposed inside the primary corner insulating material 32*b*, having a step with the primary corner insulating material 32*b*, and having the primary corner barrier 2*b* fixed thereto.

A plurality of primary corner insulation walls 3*b* in which the primary inner plywood 31*b* and the primary corner insulating material 32*b* are sequentially stacked may be disposed along the side of the corner portion on the secondary corner insulation wall 5*b*.

In the embodiment, the primary corner insulation wall 3*b* has been described as including the primary inner plywood 31*b* and the primary corner insulating material 32*b*, but it goes without saying that the primary corner insulation wall 3*b* may be the same as or similar to the primary corner insulation wall 3*b* according to at least any one of the first embodiment to seventh embodiment.

The plurality of primary corner insulation walls 3*b* may be disposed adjacent to each other on the secondary corner insulation wall 5*b*, and the plurality of primary corner insulation walls 3*b* may be disposed to minimize a distance therebetween so that separately filling, such as glass wool, spaces between the plurality of primary corner insulation walls 3*b* with the insulating material is omitted.

As described above, when the plurality of primary corner insulation walls 3*b* are disposed, a step space is formed between the primary inner plywoods 31*b* forming the step with the primary corner insulating material 32*b*. The corner block in the embodiment includes a first inner packing material 3*b*4 filling the step space between the primary corner insulation walls 3*b* disposed adjacent to each other and having the primary corner barrier 21 seated thereon.

The first inner packing material 3*b*4 may be made of polyurethane foam or glass wool.

The plurality of primary corner insulation walls 3*b*, the secondary corner barrier 41*b*, and the secondary corner insulation wall 5*b* are portions of the configuration of the corner block, and the total width of the plurality of primary corner insulation walls 3*b* constituting the corner block may be smaller than that of the secondary corner insulation wall 5*b* that is another component of the corner block Therefore, a portion of the secondary corner barrier 41*b* may be exposed to outermost sides of the plurality of primary corner insulation walls 3*b*. When a plurality of corner blocks are disposed adjacent to each other along the sides of the corner portion, the corner connecting insulation wall 34*b* may be installed in a spatial portion between the adjacent outermost primary corner insulation walls 3*b* disposed adjacent to each other, that is, the spatial portion to which the secondary corner barrier 41*b* is exposed.

When the corner blocks are disposed adjacent to each other, the corner connecting insulation wall 34*b* may be disposed between the adjacent outermost primary corner insulation walls 3*b*, provided in a form in which the corner connecting insulating material 341*b* and the first corner connecting plywood 342*b* that are the same as or similar to the primary corner insulation wall 3*b* and stacked, and may have the thickness that is the same as or similar to the primary corner insulation wall 3*b*.

When the plurality of corner blocks are disposed adjacent to each other along the side of the corner portion, the corner connecting insulation wall 34*b* is installed to serve to block the influence of external heat while sealing the spatial portion formed between the adjacent secondary corner insulation walls 5*b* disposed adjacent to each other together with the corner connecting barrier 42*b*.

As described above, when the plurality of corner blocks are disposed adjacent to each other along the corner portion, spaces are formed between the corner connecting insulating material 42*b* and the primary corner insulating material 32*b* and between the first corner connecting plywood 342*b* and the primary inner plywood 31*b*, and the spaces are filled with a second inner packing material 3*b*5 on which the primary corner barrier 2*b* is seated to finish the formation of the primary corner insulation wall 3*b*.

The second inner packing material 3*b*5 may be made of polyurethane foam or glass wool.

The secondary corner barrier 41*b* may be installed between the primary corner insulation wall 3*b* and the secondary corner insulation wall 5*b* and can prevent the liquefied gas from leaking to the outside together with the primary corner barrier 2*b*.

The secondary corner barrier 41*b* is a portion of the configuration of the corner block together with the primary corner insulation wall 3*b* and the secondary corner insulation wall 5*b*, and when the corner blocks are disposed adjacent to each other, the adjacent secondary corner barriers 41*b* may be sealed and connected through the corner connecting barrier 42*b*.

When the corner blocks are disposed adjacent to each other, the corner connecting barrier 42*b* may connect the adjacent secondary corner barriers 41*b* exposed to the outside, and the corner connecting insulation wall 34*b* may be installed on the corner connecting barrier 42*b*.

The secondary corner insulation wall 5*b* may include the secondary inner plywood 51*b*, the secondary corner insulating material 52*b*, and the secondary outer plywood 53*b*. The secondary corner insulation wall 5*b* may be fixed inside each of the first surface and the second surface and formed in a structure in which the secondary inner plywood 51*b*, the secondary corner insulating material 52*b*, and the secondary outer plywood 53*b* are sequentially stacked outward from the secondary corner barrier 41*b*.

When the plurality of corner blocks are disposed adjacent to each other along the side of the corner portion, the space formed between the adjacent secondary corner insulation walls 5*b* disposed adjacent to each other may be filled with an outer packing material 5*b*4.

The outer packing material **5*b*4** may be made of polyurethane foam or glass wool.

Since the secondary corner insulation wall **5*b* in the embodiment may be the same as or similar to the secondary corner insulation wall 5*b*** according to at least any one of the first embodiment to seventh embodiment, here, a detailed description thereof will be omitted to avoid overlapping descriptions.

Therefore, in the embodiment, by arranging the plurality of primary corner insulation walls **3*b* including the primary inner plywood 31*b* forming the step with respect to the primary corner insulating material 32*b* on the secondary corner insulation wall 5*b* and forming the adjacent primary corner insulation materials 32*b* disposed adjacent thereto, it is possible to easily handle the installation of the barrier fixing member 21*b* through a stepped portion between the primary inner plywoods 31*b* disposed adjacent to each other but also reduce the consumption of the packing material because the packing material 3*b*4** is seated only on the stepped portion.

Figure 18:
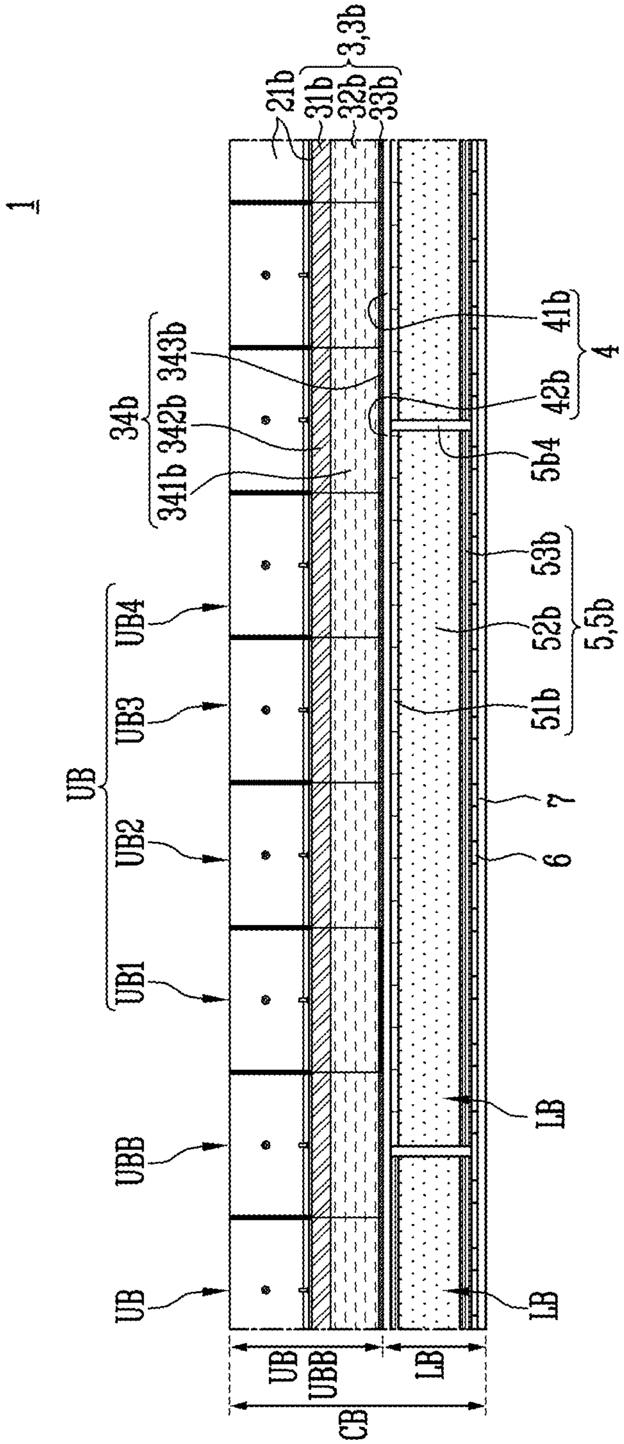
FIG. 18 is a partial front view of a corner portion for describing a liquefied gas storage tank according to a ninth embodiment of the present invention.
Figure 19:
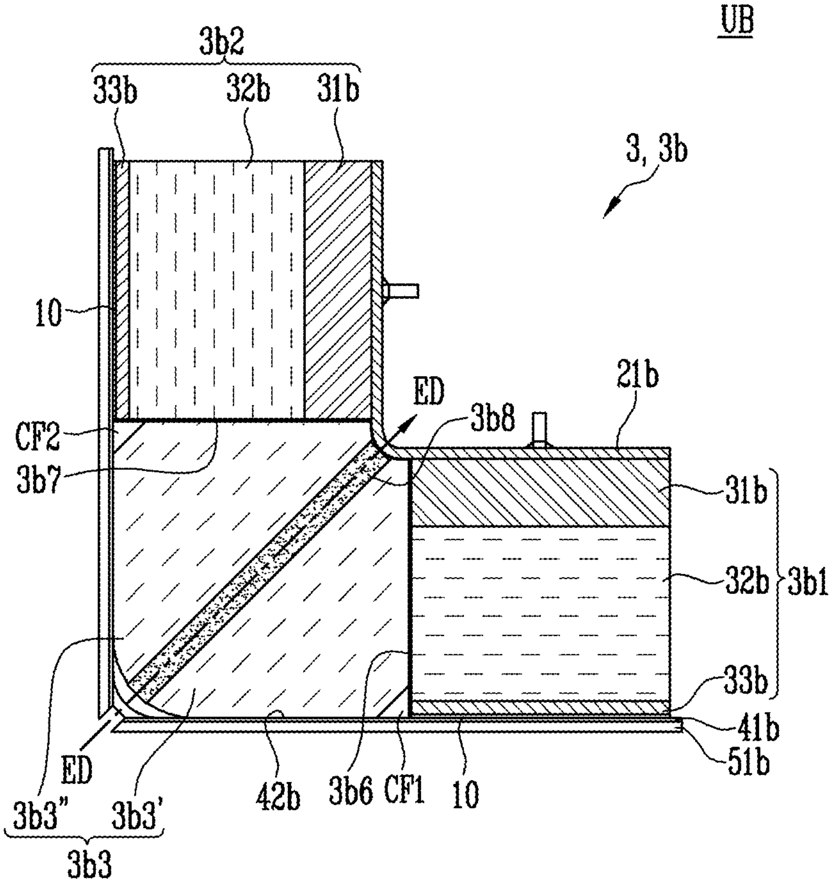
FIG. 19 is a side view showing a unit upper block constituting the upper block in FIG. 18.
Figure 20:
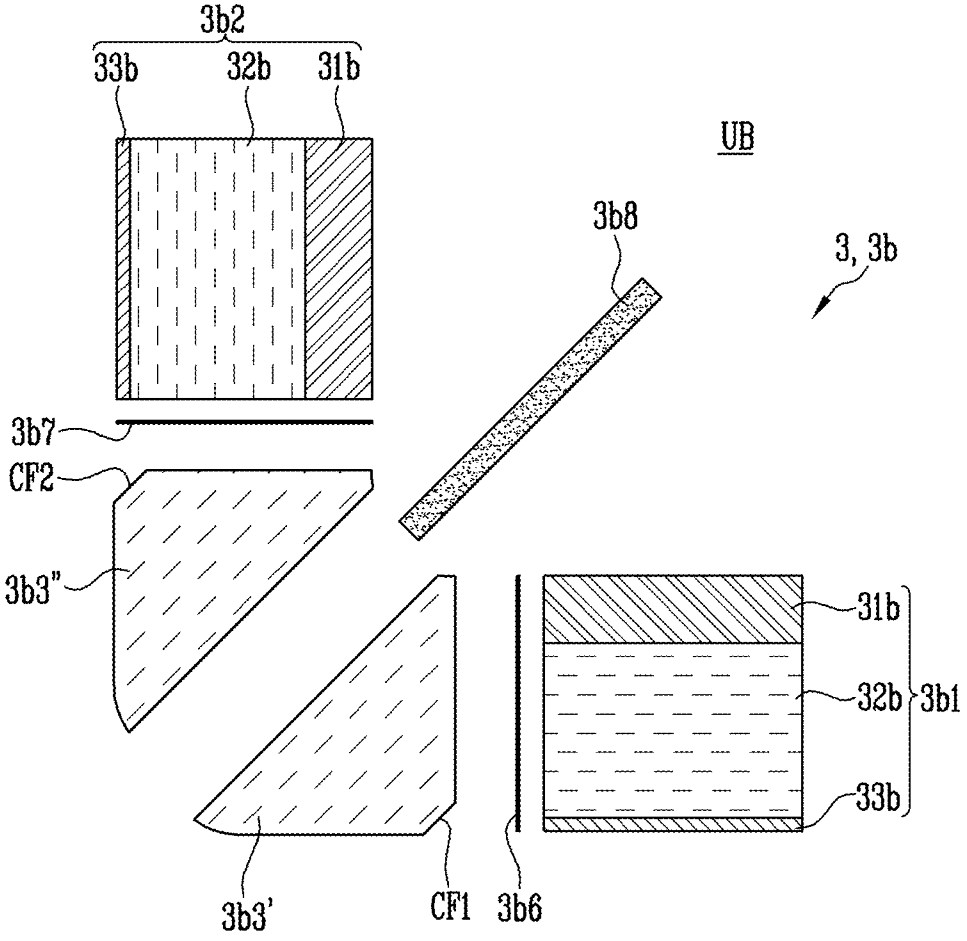
FIG. 20 is an exploded view of the unit upper block in FIG. 19.
Figure 21:
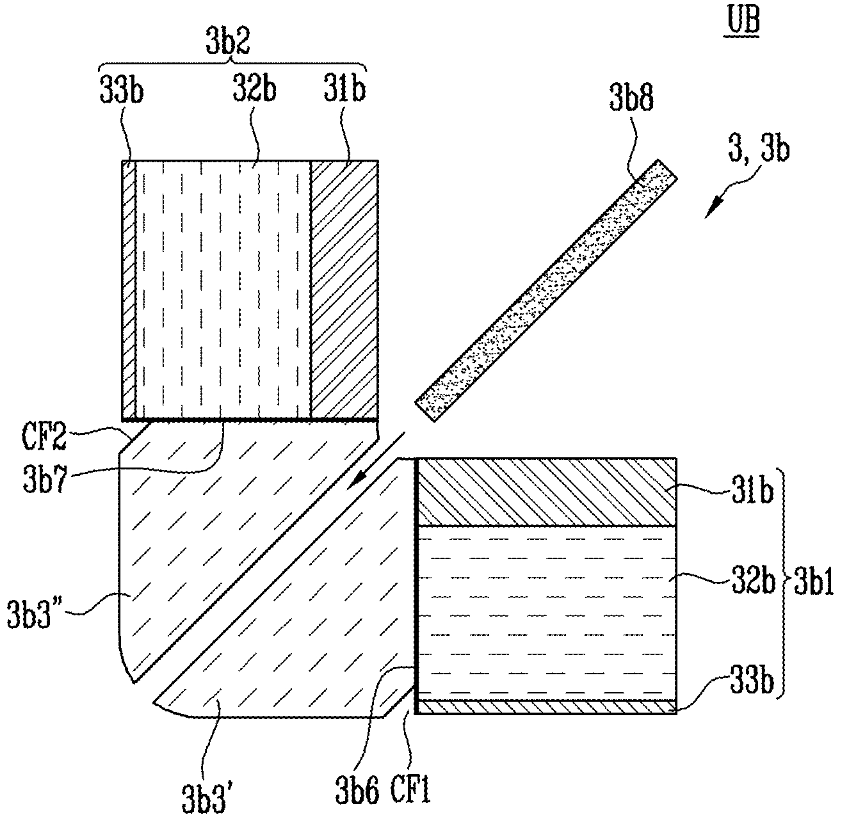
FIG. 21 is a view showing a process of assembling the unit upper block in FIG. 20.
Figure 22:
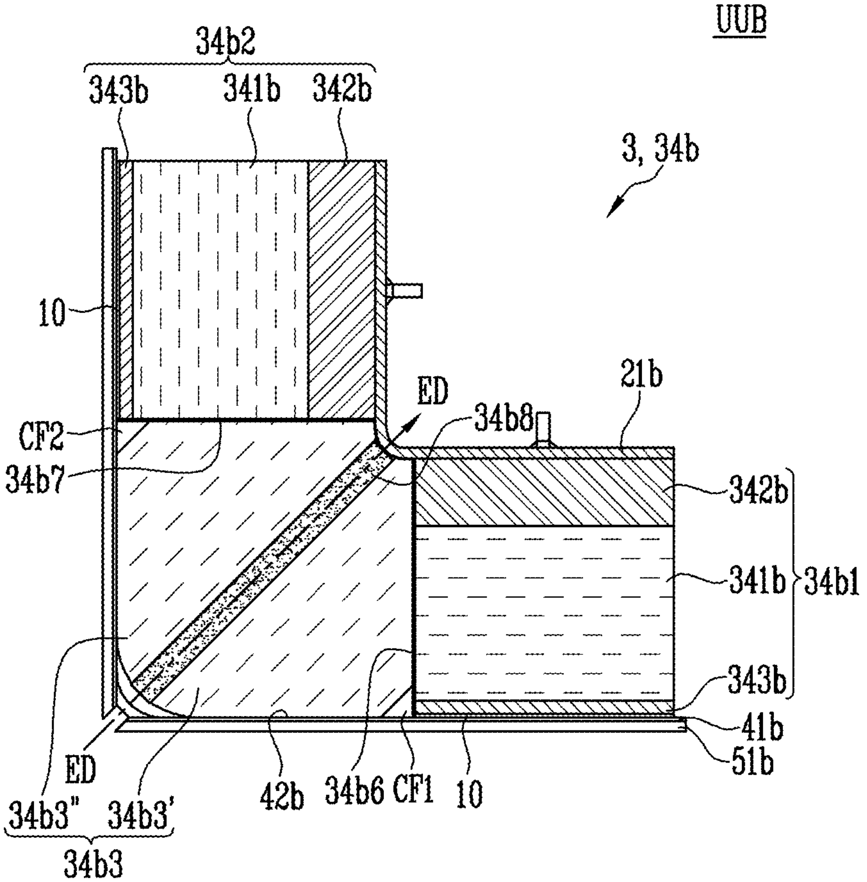
FIG. 22 is a side view showing an upper connecting block in FIG. 18.

FIG. 18 is a partial front view of a corner portion for describing a liquefied gas storage tank according to a ninth embodiment of the present invention, FIG. 19 is a side view showing a unit upper block constituting the upper block of FIG. 18, FIG. 20 is an exploded view of the unit upper block in FIG. 19, FIG. 21 is a view showing a process of assembling the unit upper block in FIG. 20, and FIG. 22 is a side view showing an upper connecting block in FIG. 18.

As shown in FIG. 18, the corner portion of the liquefied gas storage tank 1 according to the ninth embodiment of the present invention may be formed in a combination of a plurality of corner blocks CB. A primary structure of the corner block CB may include a lower block LB fixed to the hull 7 and formed of a single board, an upper block UB having a plurality of upper blocks UB1, UB2, UB3, and UB4 bonded on the lower block LB side by side disposed adjacent to one another, and an upper connecting block UBB connecting the adjacent lower blocks LB disposed adjacent to each other and bonded and connected to the secondary barrier 4 exposed between the adjacent upper blocks UB disposed adjacent to each other.

The upper block UB in the embodiment is described as having the four first to fourth unit upper blocks UB1, UB2, UB3, and UB4 side by side disposed adjacent to one another but the present invention is not limited thereto, and it goes without saying that the upper block may be formed of two or more unit upper blocks.

As in the first to eighth embodiments, the corner block CB in the embodiment may be disposed on the corner portion in which the first surface and the second surface at different angles form the storage space accommodating liquefied gas and meet each other, and although not shown, in a state in which the corner block CB is disposed, as described above, the corner portion of the liquefied gas storage tank 1 having an accommodation space for sealing and accommodating the liquefied gas, which is a cryogenic substance, is completed by forming the primary corner barrier **2*b*** made of a metal material on the upper block UB and the upper connecting block UBB.

The liquefied gas storage tank 1 in the embodiment is completed by connecting the corner block CB formed in the corner portion and a planar block formed in a planar portion, and here, the planar block may be a planar block having a structure shown in FIG. 1 in the first embodiment, but the present invention is not limited thereto.

In addition, the corner block CB divided into the lower block LB, the upper block UB, and the upper connecting block UBB in the embodiment will be described below in detail but the present invention is not limited thereto, and it goes without saying that the corner block CB may be the same as or similar to the structure of any one of the first to eighth embodiments.

As shown in FIG. 18, the lower block LB may have the upper block UB and the upper connecting block UBB installed on an upper surface thereof and may include the secondary corner barrier **41*b* bonded and connected to a lower surface of the upper block UB, the corner connecting barrier 42*b* connecting the adjacent secondary corner barriers 41*b* exposed to the outside because the upper block UB is not installed on the lower block LB when the lower blocks LB are disposed adjacent to each other and bonded and connected to a lower surface of the upper connecting block UBB, and the secondary corner insulation wall 5*b* including the secondary inner plywood 51*b*, the secondary corner insulating material 52*b*, and the secondary outer plywood 53*b***.

Since the lower block LB in the embodiment may be the same as or similar to the configuration of at least any one of the first to eighth embodiments, here, a detailed description thereof will be omitted to avoid overlapping descriptions.

The upper block UB may have the plurality of unit upper blocks, for example, the first to fourth unit upper blocks UB1, UB2, UB3, and UB4 side by side disposed adjacent to one another and may have the lower surface bonded on the lower block LB and an upper surface fixed to the barrier fixing member **21*b***.

As shown in FIGS. 18, 19, 20, and 21, each of the first to fourth unit upper blocks UB1, UB2, UB3, and UB4 has a primary structure formed of the primary corner insulation wall **3*b* disposed outside the barrier fixing member 21*b***.

In the above description, the primary corner insulation wall **3*b* may be provided inside each of the first surface and the second surface and may include the first inner fixing unit 3*b*1 and the second inner fixing unit 3*b*2 formed in a structure in which the primary inner plywood 31*b*, the primary corner insulating material 32*b*, and the primary outer plywood 33*b* are sequentially stacked outward from the barrier fixing member 21*b*. The second inner fixing unit 3*b*1 and the second inner fixing unit 3*b*2** may be symmetrically provided with respect to the direction ED in which the corner portion is equally divided.

In addition, the primary corner insulation wall **3*b* may include the inner bent portion 3*b*3 installed in the corner spatial portion between the first inner fixing unit 3*b*1 and the second inner fixing unit 3*b*2** and formed of an insulating material.

As shown in FIGS. 19, 20, and 21, the inner bent portion **3*b*3 in the embodiment may be formed to be divided into a first inner half bent portion 3*b*3' and a second inner half bent portion 3*b*3"** unlike the conventional integrated inner bent portion.

In other words, the first inner half bent portion **3*b*3' and the second inner half bent portion 3*b*3"** may have a triangular shape in which the conventional integrated inner bent portion is symmetrically cut in the direction ED in which the corner portion is equally divided.

A side surface of the first inner half bent portion **3*b*3' having the triangular shape may be perpendicular to the corner connecting barrier 42*b* of the secondary barrier 4 and bonded and connected to a side surface of the first inner fixing unit 3*b*1 by a first bonding unit 3*b*6**.

In addition, a side surface of the second inner half bent portion **3*b*3" having the triangular shape may be perpendicular to the corner connecting barrier 42*b* of the secondary barrier 4 and bonded and connected to a side surface of the second inner fixing unit 3*b*2 by a second bonding unit 3*b*7**.

An assembling process of the upper block UB in the embodiment is as follows.

First, each of the first inner fixing unit 3*b*1, the second inner fixing unit 3*b*2, the first inner half bent portion 3*b*3', and the second inner half bent portion 3*b*3" that are formed as four divided pieces may be provided.

The first inner fixing unit 3*b*1 and the first inner half bent portion 3*b*3' may be bonded using the first bonding unit 3*b*6.

The second inner fixing unit 3*b*2 and the second inner half bent portion 3*b*3" are bonded using the second bonding unit 3*b*7.

The first inner fixing unit 3*b*1 bonded and connected to the first inner half bent portion 3*b*3' is bonded and connected to the secondary barrier 4 using an adhesive 10.

The second inner fixing unit 3*b*2 bonded and connected to the second inner half bent portion 3*b*3" is bonded and connected to the secondary barrier 4 using the adhesive 10.

The assembly is completed by inserting and installing a first corner inner packing material 3*b*8 into the space between the first inner half bent portion 3*b*3' and the second inner half bent portion 3*b*3" formed by the bonding with the second barrier 4.

As described above, the primary corner insulation wall 3*b* in the embodiment may be assembled and installed to the corner portion in a state in which the first and second inner half bent portions 3*b*3' and 3*b*3" are bonded and connected to the first and second inner fixing units 3*b*1 and 3*b*2 by the first and second bonding units 3*b*6 and 3*b*7. In this case, the primary outer plywoods 53*b* of the first and second inner fixing units 3*b*1 and 3*b*2 may be fixed to the corner connecting barrier 42*b* of the secondary barrier 4 with the adhesive 10, and bottom surfaces of the first and second inner half bent portions 3*b*3' and 3*b*3" horizontal to the corner connecting barrier 42*b* are in a state of being not attached to the corner connecting barrier 42*b*.

In the assembled and installed state as described above, a space is inevitably formed between an inclined surface of the first inner half bent portion 3*b*3' and an inclined surface of the second inner half bent portion 3*b*3" that face each other, and in order to prevent a heat convection phenomenon caused through this space, the primary corner insulation wall 3*b* in the embodiment may further include the first corner inner packing material 3*b*8 for sealing the space between the first and second inner half bent portions 3*b*3' and 3*b*3".

The first corner inner packing material 3*b*8 may be formed of a vacuum insulation material using glass wool as a main raw material.

In addition, the first corner inner packing material 3*b*8 may be formed to have a positive (+) tolerance to seal the space in the state of being inserted into the space between the first and second inner half bent portions 3*b*3' and 3*b*3".

In the embodiment, the primary outer plywoods 53*b* of the first and second inner fixing units 3*b*1 and 3*b*2 may be in a state of being attached to the corner connecting barrier 42*b* of the secondary barrier 4, and the bottom surfaces of the first and second inner half bent portions 3*b*3' and 3*b*3" may be in a state of not being attached to the corner connecting barrier 42*b*, and in order to prevent the adhesive 10 from spreading to the non-adhesive region while securing a sufficient bonding force with the adhesive 10 in the adhesive region, it is necessary to provide a squeeze-out checking device capable of checking the squeeze-out of the adhesive 10.

In the embodiment, chamfers may be formed at right angle corner portions in which side surfaces and bottom surfaces of the first and second inner half bent portions 3*b*3' and 3*b*3" meet each other as the squeeze-out checking device. As shown in FIG. 19, the chamfer CF makes it possible to visually check the squeeze-out of the adhesive 10 by forming the space in the side surfaces of the primary outer plywoods 53*b* of the first and second inner fixing units 3*b*1 and 3*b*2 in the state in which the primary corner insulation wall 3*b* is installed in the corner portion.

The barrier fixing member 21*b* may be made of a metal material and installed on the primary corner insulation wall 3*b*.

As shown in FIGS. 18 and 19, the barrier fixing member 21*b* may be fixedly installed on the primary inner plywood 31*b* constituting the first inner fixing unit 3*b*1 and the second inner fixing unit 3*b*2 after the upper block UB formed of the first to fourth unit upper blocks UB1, UB2, UB3, and UB4 is bonded on the lower block LB along the side of the corner portion and may fix the first inner fixing unit 3*b*1 and the second inner fixing unit 3*b*2.

The barrier fixing member 21*b* may be independently installed on each of the first to fourth unit upper blocks UB1, UB2, UB3, and UB4.

Therefore, in the embodiment, by forming the inner bent portion 3*b*3 of the primary corner insulation wall 3*b* formed of the first inner half bent portion 3*b*3' bonded and connected to the first inner fixing unit 3*b*1 and the second inner half bent portion 3*b*3" bonded and connected to the second inner fixing unit 3*b*2, it is possible to block heat convection paths between the first inner fixing unit 3*b*1 and the first inner half bent portion 3*b*3' and between the second inner fixing unit 3*b*2 and the second inner half bent portion 3*b*3" even when the first and second inner half bent portions 3*b*3' and 3*b*3" expand or contract, thereby preventing the heat convection phenomenon in the inner bent portion 3*b*3.

In addition, in the embodiment, by finishing the space between the first and second inner half bent portions 3*b*3' and 3*b*3" with the first corner inner packing material 3*b*8 having the positive (+) tolerance, it is possible to block the heat convection path between the first and second inner half bent portions 3*b*3' and 3*b*3" even when the first and second inner half bent portions 3*b*3' and 3*b*3" expand or contract, thereby preventing the heat convection phenomenon in the inner bent portion 3*b*3.

In addition, in the embodiment, by forming the chamfers CF on the right angle corner portions in which the side surfaces and bottom surfaces of the first and second inner half bent portions 3*b*3' and 3*b*3" meet each other, it is possible to directly and visually check that the adhesive 10 in the adhesive region is squeezed out to the non-adhesive region when the primary outer plywoods 53*b* of the first and second inner fixing units 3*b*1 and 3*b*2 are attached to the corner connecting barrier 42*b* of the secondary barrier 4 with the adhesive 10, thereby preventing a bonding defect.

The upper connecting block UBB in the embodiment may be bonded and connected to upper surfaces of the lower blocks LB disposed adjacent to each other to connect the lower blocks LB. The upper connecting block UBB may be installed in a space exposed between the upper block UB formed of the first to fourth unit upper blocks UB1, UB2, UB3, and UB4 side by side disposed adjacent to each other and the upper block UB disposed adjacent thereto.

As shown in FIGS. 18 and 22, the upper connecting block UBB may be formed of the corner connecting insulation wall 34*b* disposed outside the barrier fixing member 21*b*.

The corner connecting insulation wall 34*b* of the upper connecting block UBB may be designed to withstand the external impact or the internal impact caused by the sloshing of the liquefied gas while blocking the influence of external heat together with the primary corner insulation wall 3*b* and installed between the barrier fixing member 21*b* and the corner connecting barrier 42*b*.

In the above description, the corner connecting insulation wall 34*b* may be provided inside each of the first surface and the second surface and may include the first corner connecting fixing unit 34*b*1 and the second corner connecting fixing unit 34*b*2 formed in a structure in which the first corner connecting plywood 342*b*, the corner connecting insulating material 341*b*, and the second corner connecting plywood 343*b* are sequentially stacked outward from the barrier fixing member 21*b*. The first corner connecting fixing unit 34*b*1 and the second corner connecting fixing unit 34*b*2 may be symmetrically provided with respect to the direction ED in which the corner portion is equally divided.

In addition, the corner connecting insulation wall 34*b* may include a corner connecting bent portion 34*b*3 installed in the corner spatial portion between the first corner connecting fixing unit 34*b*1 and the second corner connecting fixing unit 34*b*2 and formed of an insulating material.

As shown in FIG. 22, the corner connecting bent portion 34*b*3 in the embodiment may be formed to be divided into a first corner half bent portion 34*b*3' and a second corner half bent portion 34*b*3" unlike the conventional integrated inner bent portion.

A side surface of the first corner half bent portion 34*b*3' may be perpendicular to the corner connecting barrier 42*b* of the secondary barrier 4 and bonded and connected to a side surface of the first corner connecting fixing unit 34*b*1 by a first bonding unit 34*b*6.

In addition, a side surface of the second corner half bent portion 34*b*3" may be perpendicular to the corner connecting barrier 42*b* of the secondary barrier 4 and bonded and connected to a side surface of the second corner connecting fixing unit 34*b*2 by a second bonding unit 34*b*7.

The corner connecting insulation wall 34*b* in the embodiment may further include a second corner inner packing material 34*b*8 for sealing the space between the first and second corner half bent portions 34*b*3' and 34*b*3".

Since each of the first corner half bent portion 34*b*3', the second corner half bent portion 34*b*3", and the second corner inner packing material 34*b*8 in the upper connecting block UBB and each of the first inner half bent portion 3*b*3', the second inner half bent portion 3*b*3", and the first corner inner packing material 3*b*8 in the upper block UB have only different reference numerals and names and may have configurations that are the same or similar, here, a detailed description thereof will be omitted to avoid overlapping descriptions.

Figure 23:
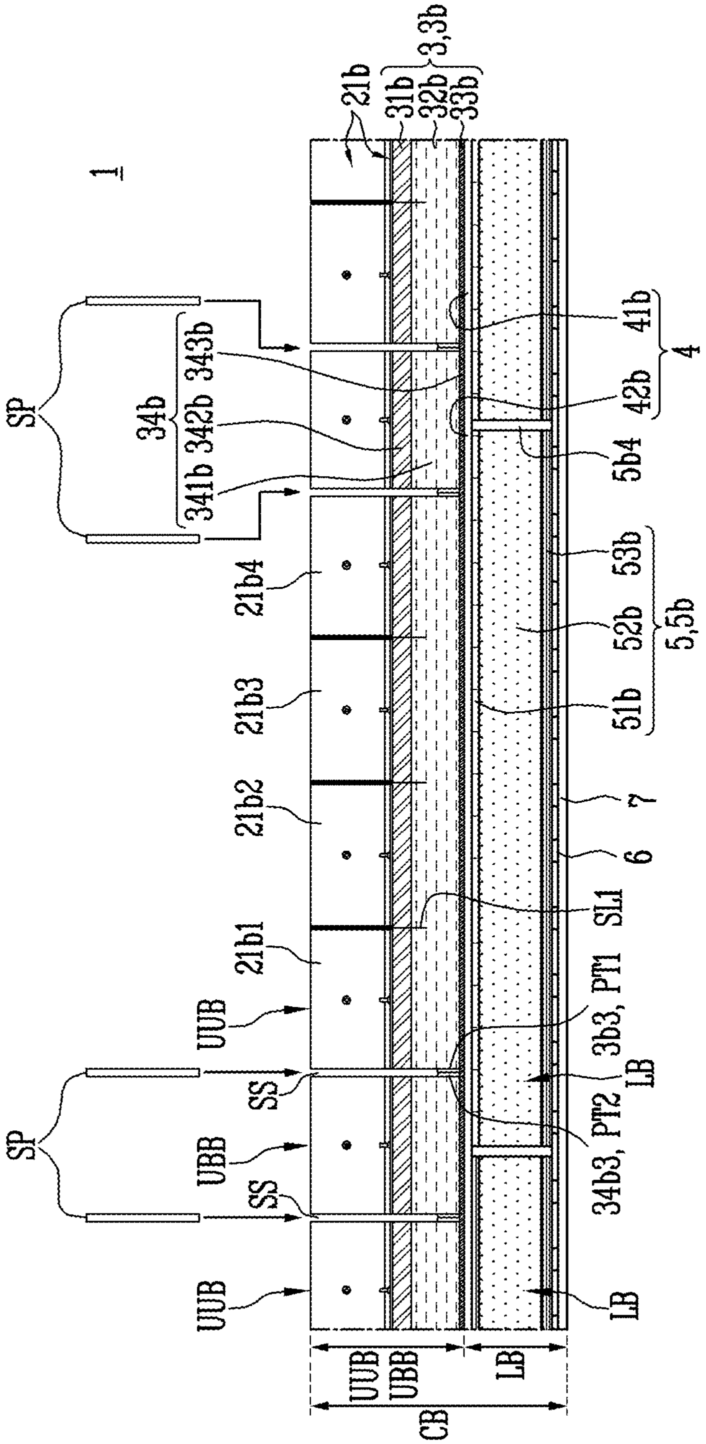
FIG. 23 is a partial front view of a corner portion for describing a liquefied gas storage tank according to a tenth embodiment of the present invention.
Figure 24:
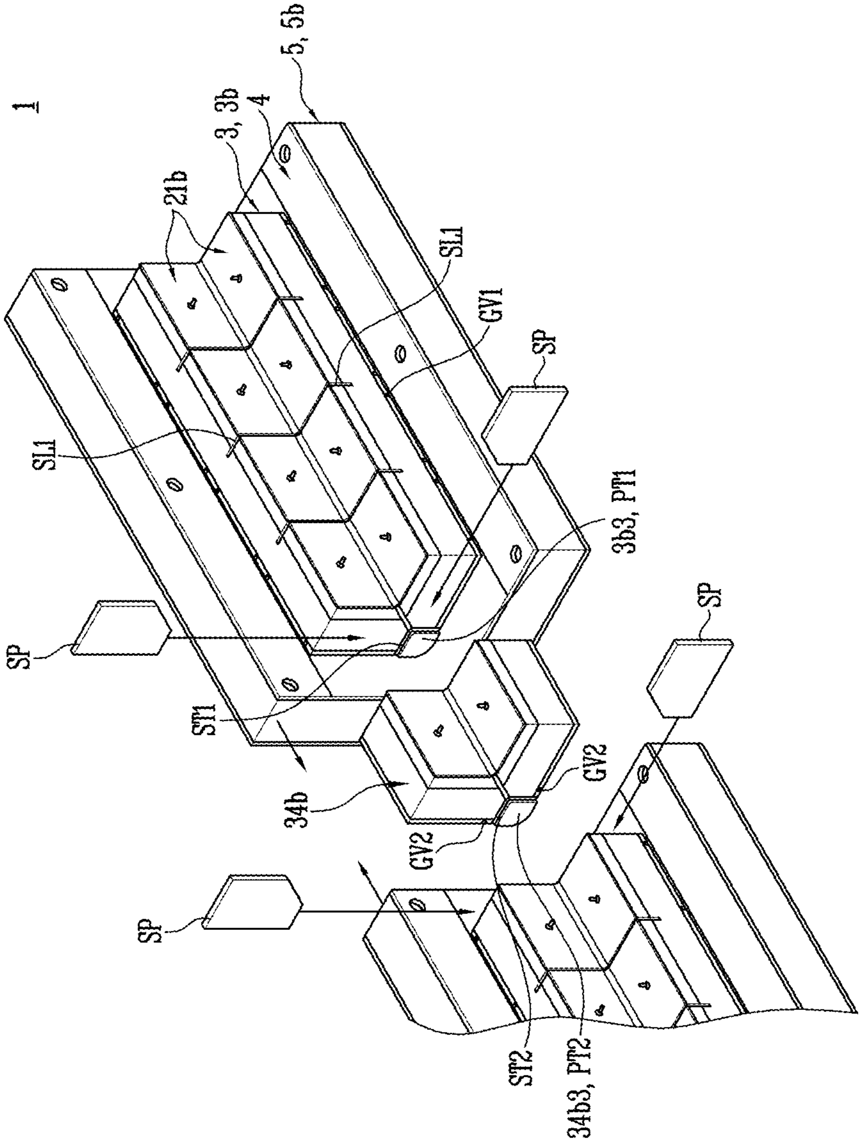
FIG. 24 is a partially exploded perspective view of the corner portion for describing the liquefied gas storage tank according to the tenth embodiment of the present invention.
Figure 25:
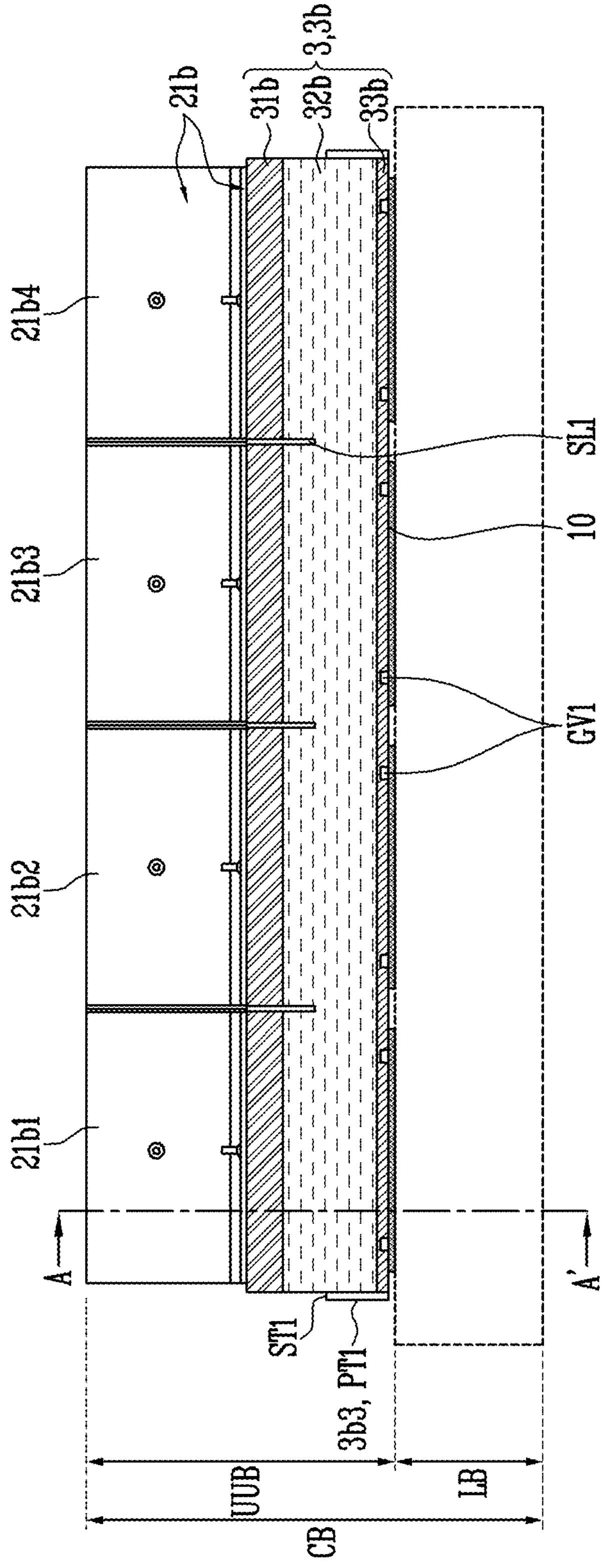
FIG. 25 is a front view showing an integrated upper block in FIG. 23.
Figure 26:
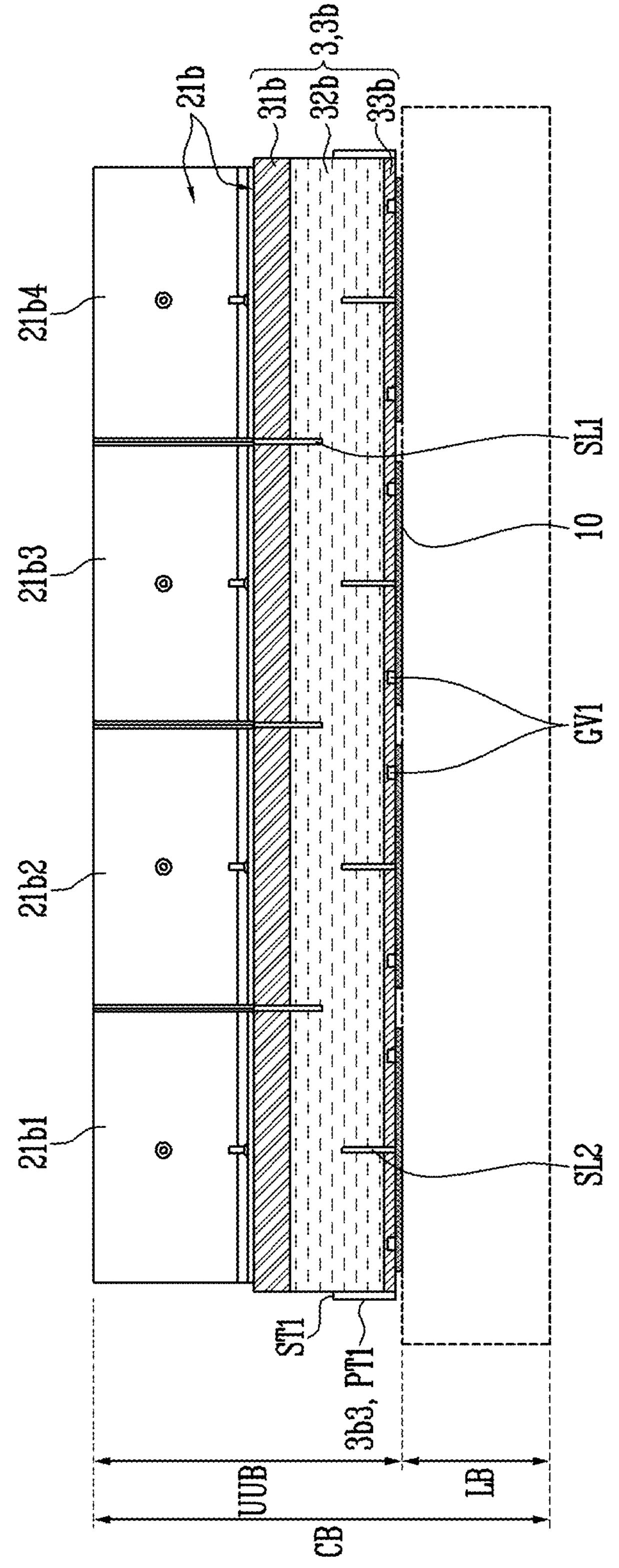
FIG. 26 is a front view showing another sample of the integrated upper block in FIG. 25.
Figure 27:
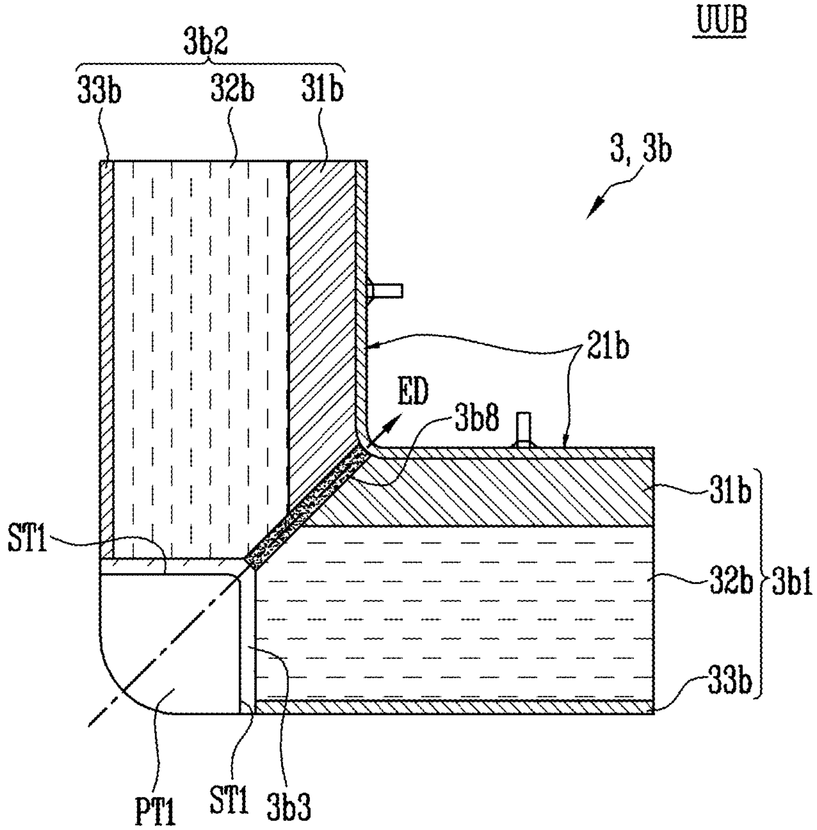
FIG. 27 is a side view of the integrated upper block in FIG. 25.
Figure 28:
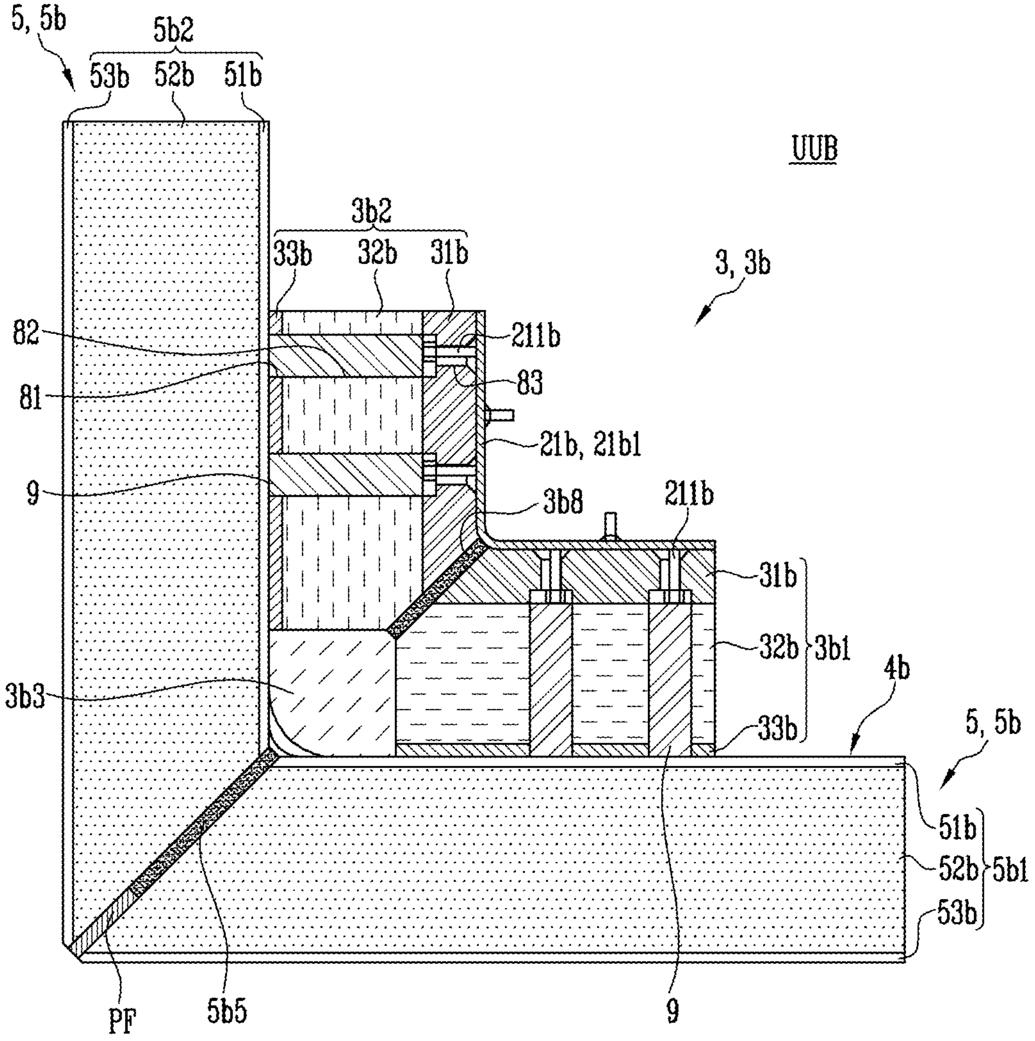
FIG. 28 is a cross-sectional view along line A-A' in FIG. 25.
Figure 29:
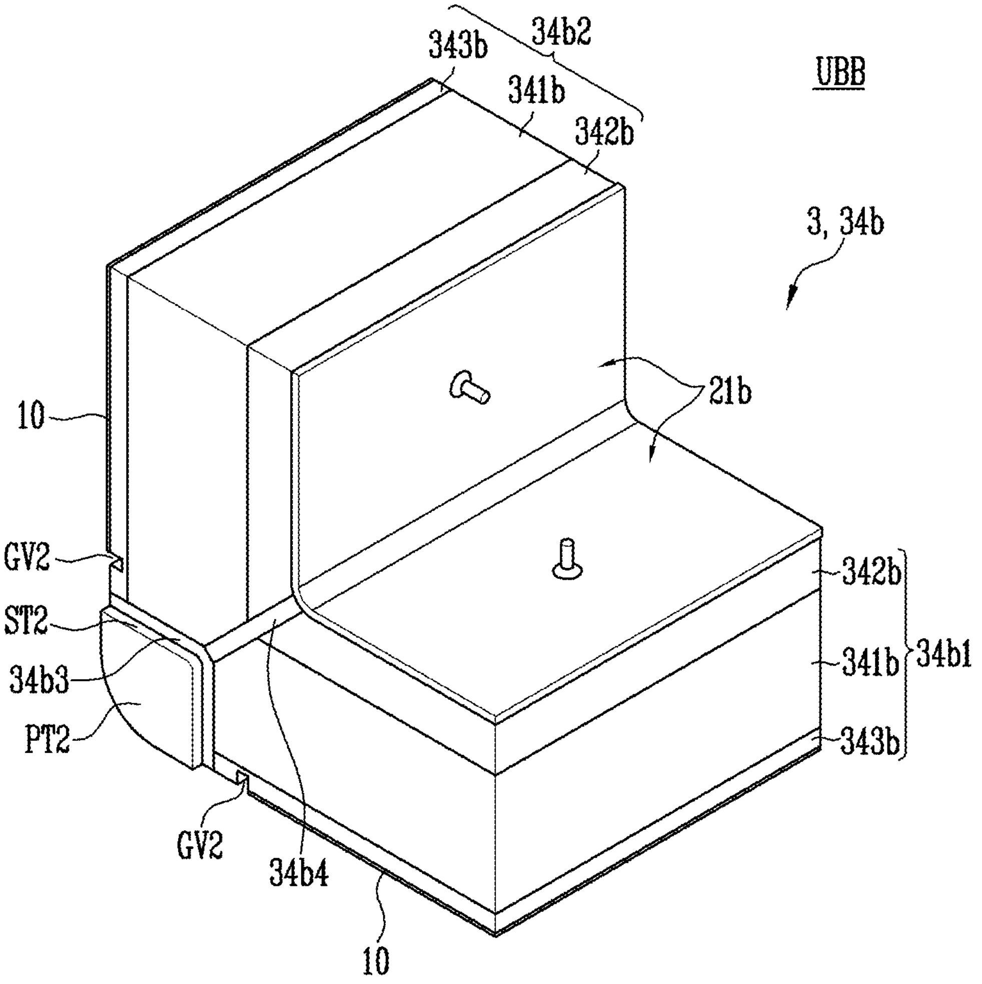
FIG. 29 is a perspective view showing the upper connecting block in FIG. 23.
Figure 30:
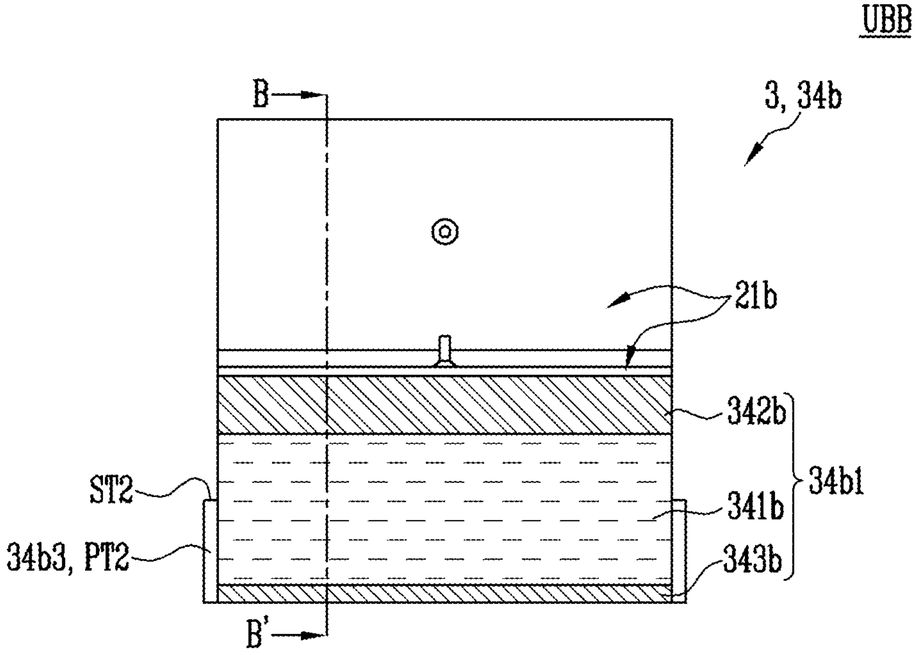
FIG. 30 is a front view showing the upper connecting block in FIG. 23.
Figure 31:
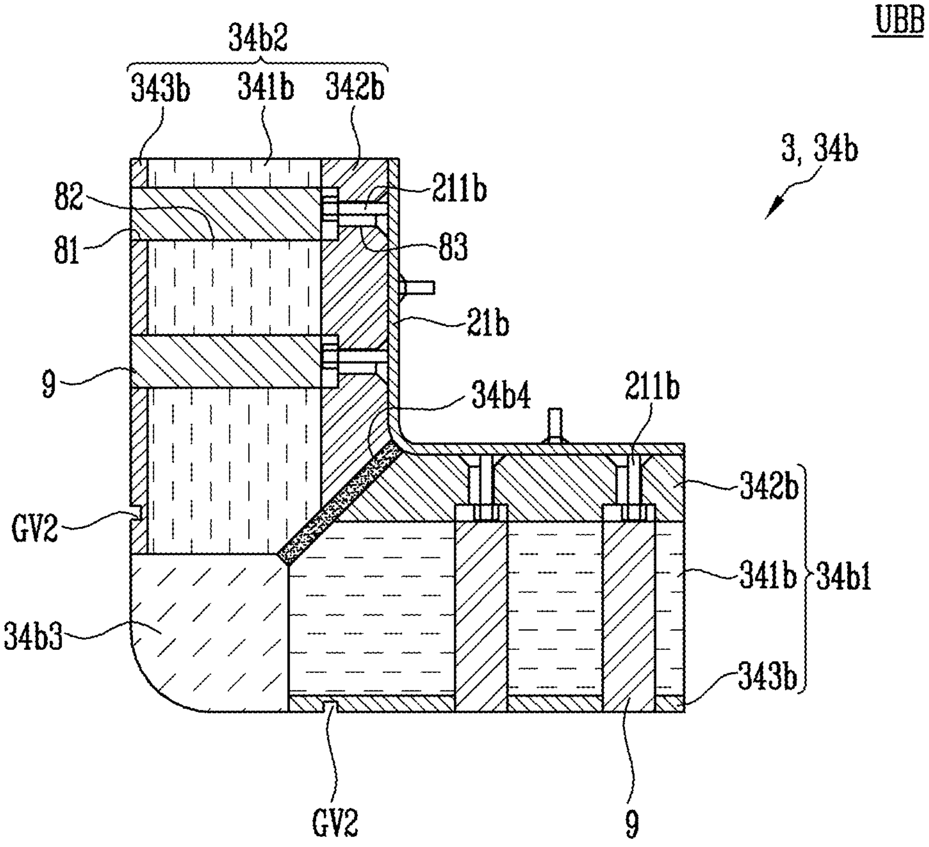
FIG. 31 is a cross-sectional view along line B-B' in FIG. 30.
Figure 32:
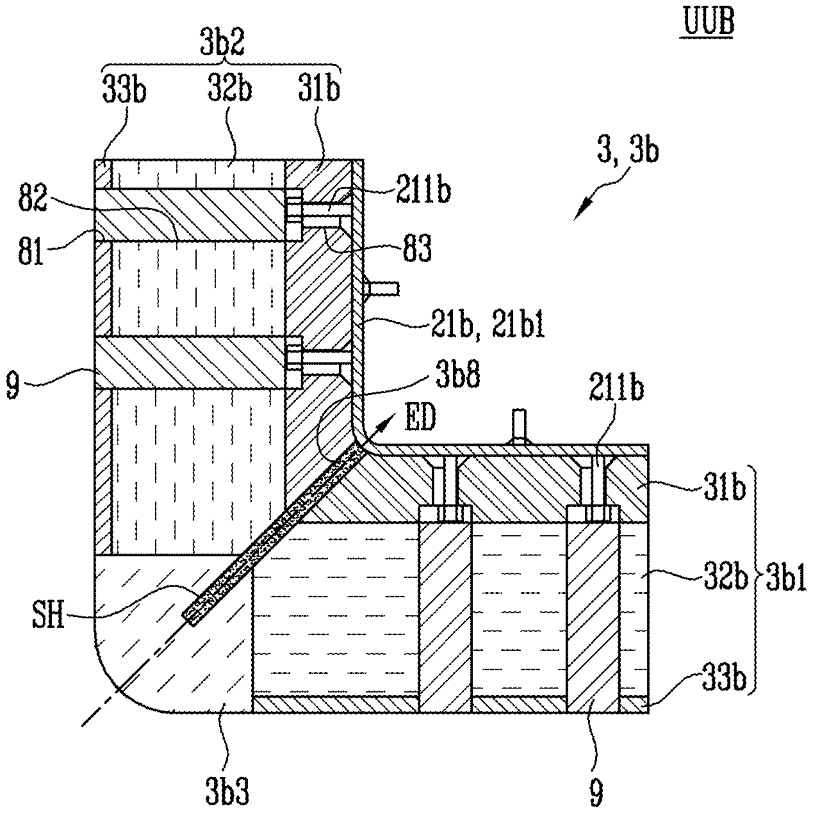
FIG. 32 is a cross-sectional view showing still another sample of the integrated upper block in FIG. 25.
Figure 33:
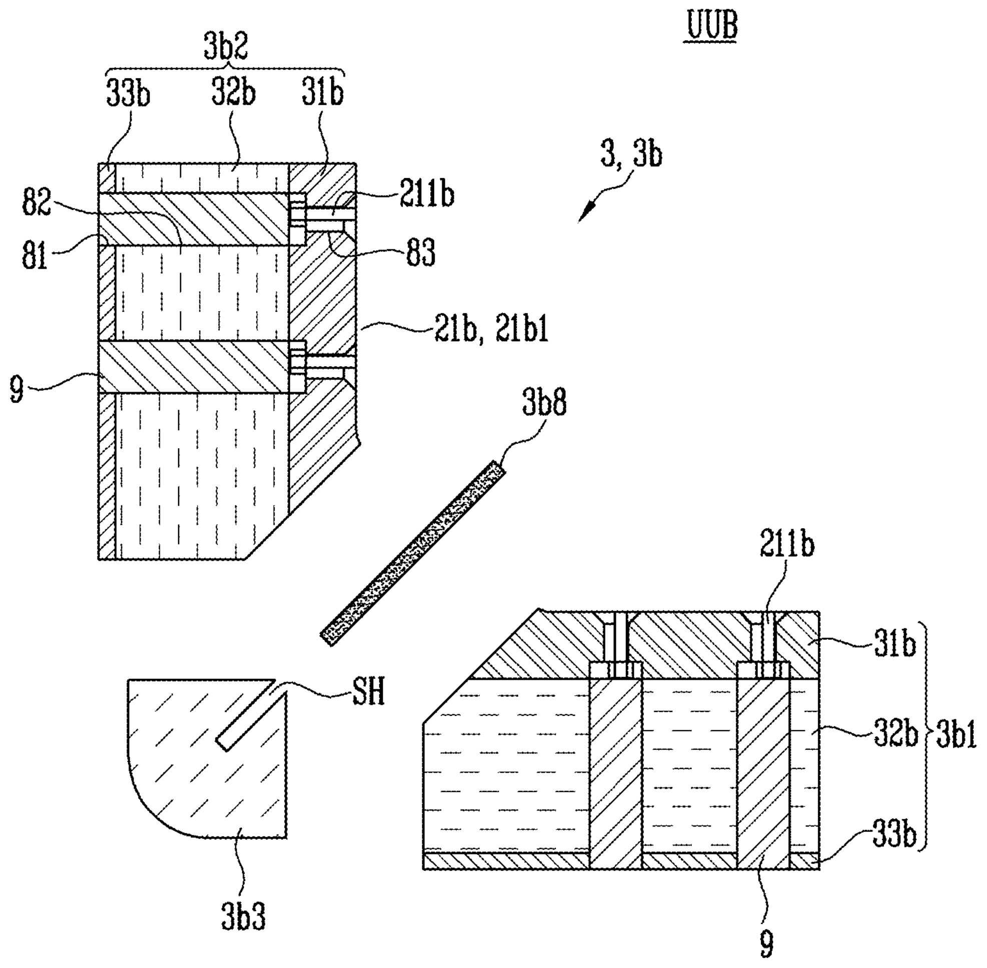
FIG. 33 is an exploded view of the integrated upper block in FIG. 32.

FIG. 23 is a partial front view of a corner portion for describing a liquefied gas storage tank according to a tenth embodiment of the present invention, FIG. 24 is a partially exploded perspective view of the corner portion for describing the liquefied gas storage tank according to the tenth embodiment of the present invention, FIG. 25 is a front view showing an integrated upper block in FIG. 23, FIG. 26 is a front view showing another sample of the integrated upper block in FIG. 25, FIG. 27 is a side view of the integrated upper block in FIG. 25, FIG. 28 is a cross-sectional view along line A-A' in FIG. 25, FIG. 29 is a perspective view showing the upper connecting block in FIG. 23, FIG. 30 is a front view showing the upper connecting block in FIG. 23, FIG. 31 is a cross-sectional view along line B-B' in FIG. 30, FIG. 32 is a cross-sectional view showing still another sample of the integrated upper block in FIG. 25, FIG. 33 is an exploded view of the integrated upper block in FIG. 32, and FIGS. 34 to 37 are views showing a comparison of convection paths and temperatures of secondary barriers that vary depending on structures of primary corner insulation walls and corner connecting insulation walls in the liquefied gas storage tank according to the tenth embodiment of the present invention and a liquefied gas storage tank according to a comparative example.

As shown in FIGS. 23 and 24, the corner portion of the liquefied gas storage tank 1 according to the tenth embodiment of the present invention may be formed in a combination of a plurality of corner blocks CB. A primary structure of the corner block CB may include a lower block LB fixed to the hull 7 and formed of a single board, an integrated upper block UUB bonded on the lower block LB and having widths smaller than front-rear and left-right widths of the lower block LB, and an upper connecting block UBB connecting the lower blocks LB disposed adjacent to each other and bonded and connected to the secondary barrier 4 exposed between the integrated upper blocks UUB disposed adjacent to each other.

The corner block CB divided into the lower block LB, the integrated upper block UUB, and the upper connecting block UBB in the embodiment will be described below in detail. However, a configuration of the embodiment may be the same as or similar to those of the above-described ninth embodiment or those of the first to eight embodiments, and in this case, a detailed description thereof will be omitted to avoid overlapping descriptions.

As shown in FIG. 23, the lower block LB may have the integrated upper block UUB and the upper connecting block UBB installed on an upper surface thereof and may include the secondary corner barrier 41*b* bonded and connected to a lower surface of the integrated upper block UUB, the corner connecting barrier 42*b* connecting the adjacent secondary corner barriers 41*b* exposed to the outside because the integrated upper block UUB is not installed thereon when the lower blocks LB are disposed adjacent to each other and bonded and connected to a lower surface of the upper connecting block UBB, and the secondary corner insulation wall 5*b* including the secondary inner plywood 51*b*, the secondary corner insulating material 52*b*, and the secondary outer plywood 53*b*.

Since a configuration of the lower block LB in the embodiment may be the same as or similar to that of at least one embodiment of the first to ninth embodiments, here, a detailed description thereof will be omitted to avoid overlapping descriptions.

The integrated upper block UUB may be bonded on the lower block LB and formed of the single board having the widths smaller than the front-rear and left-right widths of the lower block LB.

Specifically, the integrated upper block UUB may be formed of the single board by integrating a plurality of unit upper blocks into one compared to the conventional upper blocks having the plurality of unit upper blocks side by side disposed adjacent to each other. Here, like the upper block UB in the above-described ninth embodiment, the conventional upper block may have the four first to fourth unit upper blocks UB1, UB2, UB3, and UB4 side by side disposed adjacent to each other, and the integrated upper block UUB in the embodiment may be formed of the single board having the widths smaller than the front-rear and left-right widths of the conventional upper block UB having the first to fourth unit upper blocks UB1, UB2, UB3, and UB4 side by side disposed adjacent to each other.

In the embodiment, the integrated upper block UUB is described as being formed in a size in which the four first to fourth unit upper blocks UB1, UB2, UB3, and UB4 are integrated but the present invention is not limited thereto, and it goes without saying that the integrated upper block UUB may be formed in a size in which two or more unit upper blocks are integrated.

As shown in FIGS. 23, 24, 25, 26, and 27, the integrated upper block UUB may be formed of the primary corner insulation wall 3*b* including the first inner fixing unit 3*b*1 and the second inner fixing unit 3*b*2 formed in the single board structure in which one primary inner plywood 31*b*, one primary corner insulating material 32*b*, and one primary outer plywood 33*b* are sequentially stacked outward from the barrier fixing member 21*b* formed of a plurality of unit barrier fixing members 21*b*1, 21*b*2, 21*b*3, and 21*b*4. The second inner fixing unit 3*b*1 and the second inner fixing unit 3*b*2 may be symmetrically provided with respect to the direction ED in which the corner portion is equally divided.

The first and second inner fixing units 3*b*1 and 3*b*2 formed in the single board structure will be described below but may be fixed by the plurality of unit barrier fixing members 21*b*1, 21*b*2, 21*b*3, and 21*b*4.

Therefore, in the embodiment, by forming the integrated upper block UUB having the plurality of unit upper blocks UB1, UB2, UB3, and UB4 integrated into one compared to the conventional upper block UB having the plurality of unit upper blocks UB1, UB2, UB3, and UB4 side by side disposed adjacent to each other, it is possible to omit the heat convection paths generated between the conventional unit upper blocks UB1, UB2, UB3, and UB4, thereby reducing the heat convection phenomenon.

The primary corner insulation wall 3*b* may include the inner bent portion 3*b*3 installed in the corner spatial portion between the first inner fixing unit 3*b*1 and the second inner fixing unit 3*b*2 and formed of the insulating material.

As shown in FIGS. 25, 27, and 28, the inner bent portion 3*b*3 in the embodiment may have a reduced size that is about half of the sizes of the first and second inner fixing units 3*b*1 and 3*b*2 of the primary corner insulation wall 3*b* and have a symmetrical shape with respect to the direction ED in which the corner portion is equally divided.

Hereinafter, the inner bent portion 3*b*3 having the reduced size is described as being applied to the integrated upper block UUB having the plurality of unit upper blocks UB1, UB2, UB3, and UB4 integrated into one but the present invention is not limited thereto, and it goes without saying that the inner bent portion 3*b*3 may also be applied to the conventional upper block UB having the plurality of unit upper blocks UB1, UB2, UB3, and UB4 side by side disposed adjacent to each other.

Specifically, both side surfaces of the inner bent portion 3*b*3 having the reduced size, which are perpendicular to the corner connecting barrier 42*b* of the secondary barrier 4 inside the first surface and the second surface, may each have a height that is about half the total height of each of the first and second inner fixing units 3*b*1 and 3*b*2, for example, sizes in a range of 40% to 60% of the total height of the first and second inner fixing units 3*b*1 and 3*b*2.

As described above, as the size of the inner bent portion 3*b*3 is reduced, the shapes of the side surfaces of the first and second inner fixing units 3*b*1 and 3*b*2 may be changed.

Specifically, the first and second inner fixing units 3*b*1 and 3*b*2 in the embodiment may be symmetrically provided with respect to the direction ED in which the corner portion is equally divided, first side surfaces of the first and second inner fixing units 3*b*1 and 3*b*2 in close contact with both side surfaces of the inner bent portion 3*b*3 having the reduced size may be perpendicular to the corner connecting barrier 42*b* of the secondary barrier 4, and second side surfaces extending inward (toward the storage space) from the perpendicular first side surfaces may extend in the same direction as the direction ED of the division.

As described above, the primary corner insulation wall 3*b* in the embodiment may be assembled by fixing the primary outer plywoods 53*b* of the first and second inner fixing units 3*b*1 and 3*b*2 to the corner connecting barriers 42*b* of the secondary barrier 4 with the adhesive 10 in a state in which the second side surface of the first inner fixing unit 3*b*1 and the second side surface of the second inner fixing unit 3*b*2 are formed to face each other and inserting and installing the inner bent portion 3*b*3 having the reduced size into the corner space formed by the first and second inner fixing units 3*b*1 and 3*b*2.

In the assembled and installed state as described above, the spaces are inevitably formed between the first side surfaces of the first and second inner fixing units 3*b*1 and 3*b*2 in close contact with both side surfaces of the inner bent portion 3*b*3 having the reduced size and between the second side surfaces of the first and second inner fixing units 3*b*1 and 3*b*2 that face each other, and in order to prevent the heat convection phenomenon caused through these spaces, the primary corner insulation wall 3*b* in the embodiment may further include the corner inner packing material 3*b*8 for sealing the space between the second side surfaces of the first and second inner fixing units 3*b*1 and 3*b*2.

The corner inner packing material may be formed of a vacuum insulating material using glass wool as a main raw material.

In addition, the corner inner packing material 3*b*8 may be formed to have a positive (+) tolerance to seal the space in a state of being inserted into the space between the second side surfaces of the first and second inner fixing units 3*b*1 and 3*b*2.

As shown in FIGS. 32 and 33, the corner inner packing material 3*b*8 may be formed to be inserted into the inner bent portion 3*b*3 having the reduced size at a predetermined depth.

An insertion groove SH may be formed at a point at which both side surfaces of the inner bent portion 3*b*3 meet each other in the same direction as the division direction ED at a predetermined depth.

The insertion groove SH may be formed in a direction corresponding to the corner side of the storage tank, and a depth of the insertion groove SH may be smaller than or equal to half the thickness of the inner bent portion 3*b*3, but the present invention is not limited thereto.

Therefore, in the embodiment, not only by reducing the size of the inner bent portion 3*b*3, it is possible to reduce the space (the non-adhesive region in the corner portion between the inner bent portion and the secondary barrier) in which the heat convection is generated, but also by forming the corner inner packing material 3*b*8 between the second side surfaces of the first and second inner fixing units 3*b*1 and 3*b*2 in a state in which the first side surfaces and the second side surfaces of the first and second inner fixing units 3*b*1 and 3*b*2, which may be the heat convection paths, are bent, it is possible to reduce a reduced area due to a change in temperature compared to the conventional inner bent portion formed at the same height as the first and second inner fixing units 3*b*1 and 3*b*2, thereby reducing the heat convection phenomenon.

In addition, in the embodiment, by inserting the corner inner bent portion 3*b*8 into the inner bent portion 3*b*3 to the predetermined depth, it is possible to further reduce the heat convection phenomenon in the inner bent portion 3*b*3.

As shown in FIGS. 24 and 27, the inner bent portion **3*b*3 having the reduced size in the embodiment may have first protrusions PT1** provided on both side surfaces thereof.

The first protrusion PT1 may extend outward from the corner spatial portion as much as a predetermined length from the inner bent portion **3*b*3 inserted into the corner spatial portion formed by the first and second inner fixing units 3*b*1 and 3*b*2**.

The first protrusion PT1 may have a cross-sectional shape which is similar to a shape of the inner bent portion **3*b*3 and in which a curved portion, which is in contact with the corner connecting barrier 42*b* of the secondary barrier 4, collinearly extends from the curved portion of the inner bent portion 3*b*3 and extend to form first steps ST1 between both side surfaces that are perpendicular to the corner connecting barrier 42*b* of the secondary barrier 4 and both side surfaces of the inner bent portion 3*b*3**.

In other words, by forming the first protrusion PT1 in the embodiment that has a smaller size than the inner bent portion **3*b*3 and forming the first protrusion PT1 that has the first step ST1 with the inner bent portion 3*b*3, it is possible to form a curved heat convection path by the first step ST1**, thereby preventing the heat convection phenomenon, which will be described below.

As shown in FIGS. 23, 24, and 25, the integrated upper block UUB in the embodiment may include a plurality of upper slits SL1 formed in an upper portion thereof at a predetermined depth in order to cope with contraction and expansion stresses of the primary corner insulation wall **3*b*** having the single board structure.

In order to maximally mitigate the contraction or expansion stress caused by the temperature applied to the primary corner insulation wall **3*b*, the upper slit SL1 may have a depth that is smaller than or equal to half the thickness of the primary corner insulation wall 3*b* constituting the integrated upper block UUB, for example, a depth in a range of 30% to 50% of the thickness of the primary corner insulation wall 3*b***.

It is preferable that the upper slit SL1 pass through the primary inner plywood **31*b*, which is an upper layer of the primary corner insulation wall 3*b*, and be formed to at least a portion of the primary corner insulating material 32*b*, which is an intermediate layer, to cope with the contraction or expansion stress of the primary corner insulating material 32*b***.

By forming the upper slit SL1 at the depth corresponding to the thickness that is smaller than or equal to half the thickness of the primary corner insulation wall **3*b*, it is possible to not only maximally mitigate the contraction or expansion stress caused by the temperature applied to the primary corner insulation wall 3*b*, but also reduce the heat convection space and prevent cold air from being transmitted from the corner block CB to the planar block by the insulating material (not shown) formed between the primary flat insulation wall 3*a* in the planar block shown in FIG. 1 and the primary corner insulation wall 3*b*** in the corner block CB in the embodiment.

The upper slits SL1 in the embodiment may be formed at corresponding positions between the plurality of unit barrier fixing members **21*b*1, 21*b*2, 21*b*3, and 21*b*4 installed on the upper surface of the integrated upper block UUB of the portion corresponding to each of the plurality of unit upper blocks UB1, UB2, UB3, and UB4 constituting the conventional upper block UB and the present invention is not limited to these positions, and it goes without saying that the upper slits SL1** may be formed at any position spaced a predetermined distance from each other.

In addition, as shown in FIG. 26, the integrated upper block UUB in the embodiment may include a plurality of lower slits SL2 formed in a lower portion of the integrated upper block UUB at a predetermined depth to cope with the contraction or expansion stress of the primary corner insulation wall **3*b*** having the single board structure.

In order to maximally mitigate the contraction or expansion stress caused by the temperature applied to the primary corner insulation wall **3*b*, the lower slit SL2 may have a depth that is smaller than or equal to half the thickness of the primary corner insulation wall 3*b* constituting the integrated upper block UUB, for example, a depth in a range of 30% to 50% of the thickness of the primary corner insulation wall 3*b***.

It is preferable that the lower slit SL1 pass through the primary inner plywood **31*b*, which is a lower layer of the primary corner insulation wall 3*b*, and be formed to at least a portion of the primary corner insulating material 32*b*, which is an intermediate layer, to cope with the contraction or expansion stress of the primary corner insulating material 32*b***.

The lower slits SL2 in the embodiment may be formed at positions formed to be misaligned with the upper slits SL1 and the present invention is not limited to these positions, and it goes without saying that the lower slits SL2 may be formed at any position spaced a predetermined distance from each other.

Therefore, in the embodiment, by forming the upper slit SL1 in the upper portion of the integrated upper block UUB at the predetermined depth and forming the lower slit SL2 in the lower portion of the integrated upper block UUB at the predetermined depth so as to be formed to be misaligned with the upper slit SL1, it is possible to mitigate the contraction and expansion stresses of the integrated upper block UUB by the upper and lower slits SL1 and SL2.

In addition, the integrated upper block UUB in the embodiment may be bonded and connected to the upper portion of the secondary corner barrier **41*b* with the adhesive 10, and an attached area is greater than that of the conventional upper block, and thus in order to prevent the adhesive 10 from spreading to the non-adhesive region while securing the sufficient bonding force with the adhesive 10 in the adhesive region, it is necessary to provide the squeeze-out checking device which may check the squeeze-out of the adhesive 10**.

In the embodiment, as shown in FIGS. 24, 25, and 26, when the primary outer plywood **53*b* is boned on the secondary barrier 4 with the adhesive 10, as a device for checking the squeeze-out of the adhesive 10 into the non-adhesive region and preventing the adhesive 10 from overflowing onto the non-adhesive region, a plurality of first grooves GV1 may be formed in the primary outer plywood 53*b*** in the integrated upper block UUB.

In the above description, a plurality of non-adhesive regions may be set at intermediate portions in addition to both side edge portions of the primary outer plywood **53*b***.

Each of the plurality of non-adhesive regions may be set at a predetermined distance and width in a direction perpendicular to the corner side of the storage tank. For example, the plurality of non-adhesive regions may be set at corresponding positions between the plurality of unit barrier fixing members **21*b*1, 21*b*2, 21*b*3, and 21*b*4 installed on the upper surface of the integrated upper block UUB of the portion corresponding to each of the plurality of unit upper blocks UB1, UB2, UB3, and UB4** constituting the conventional upper block UB and the present invention is not limited to these positions, and it goes without saying that the non-adhesive regions may be set at any position spaced a predetermined distance from each other.

In the embodiment, the reason why the plurality of non-adhesive regions are set in the primary outer plywood 53*b* bonded and connected to the secondary barrier 4 with the adhesive 10 is because partially bonding of the primary outer plywood 53*b* with the adhesive 10 can further reduce a bonding defect rate of the adhesive 10 than bonding of the entire primary outer plywood 53*b* with the adhesive 10.

The plurality of first grooves GV1 may be formed in the primary outer plywood 53*b* in the direction perpendicular to the corner side of the storage tank.

Specifically, the plurality of first grooves GV1 may be formed along boundary portions of both sides of each of the plurality of non-adhesive regions.

When the plurality of non-adhesive regions are set at the corresponding positions between the plurality of unit barrier fixing members 21*b*1, 21*b*2, 21*b*3, and 21*b*4, the plurality of first grooves GV1 are disposed to be misaligned with the plurality of upper slits SL1 and thus it can be more advantageous than a case in which the plurality of upper slits SL1 are disposed collinearly in terms of a mechanical strength.

As shown in FIGS. 23, 24, 25, and 26, the barrier fixing member 21*b* formed of the plurality of unit barrier fixing members 21*b*1, 21*b*2, 21*b*3, and 21*b*4 may be installed on the integrated upper block UUB formed as described above.

Hereinafter, the barrier fixing member 21*b* is described as being formed of the four first, second, third, and fourth unit barrier fixing members 21*b*1, 21*b*2, 21*b*3, and 21*b*4, but the present invention is not limited thereto.

Each of the first, second, third, and fourth barrier fixing members 21*b*1, 21*b*2, 21*b*3, and 21*b*4 may be made of a metal material, side by side installed adjacent to each other above the primary corner insulation wall 3*b* constituting the integrated upper block UUB, and bent at a predetermined angle inside the first surface and the second surface, for example, bent at the same angle as an angle formed by the first surface and the second surface at different angles that form the storage space accommodating the liquefied gas.

In the embodiment, the first, second, third, and fourth unit barrier fixing members 21*b*1, 21*b*2, 21*b*3, and 21*b*4 may be installed on one integrated upper block UUB.

In other words, the integrated upper block UUB in the embodiment is different from the conventional upper block UB in terms of configuration in that since the integrated upper block UUB in the embodiment is formed in the single board structure in which one primary inner plywood 31*b*, one primary corner insulating material 32*b*, and one primary outer plywood 33*b* are sequentially stacked, the first, second, third, and fourth unit barrier fixing members 21*b*1, 21*b*2, 21*b*3, and 21*b*4 may be disposed and installed side by side on the one primary inner plywood 31*b*, while the conventional upper block UB formed of the plurality of unit upper blocks UB1, UB2, UB3, and UB4 has each unit barrier fixing member independently installed for each unit upper block.

Each of the first, second, third, and fourth unit barrier fixing members 21*b*1, 21*b*2, 21*b*3, and 21*b*4 may be disposed at distances considering the contraction and expansion stresses of the primary corner insulation wall 3*b*, and the number of disposed unit barrier fixing members may vary depending on the size of the integrated upper block UUB formed of the single board.

In addition, when the plurality of upper slits SL1 are formed at the corresponding positions between the first, second, third, and fourth unit barrier fixing members 21*b*1, 21*b*2, 21*b*3, and 21*b*4, the first, second, third, and fourth unit barrier fixing members 21*b*1, 21*b*2, 21*b*3, and 21*b*4 may cope with the contraction or expansion of the primary corner insulating material 32*b*.

Generally, the barrier fixing member is provided with a reinforcing member, such as a stiffener, along an edge of a rear surface of the primary corner insulation wall 3*b* in order to hold the upper portion of the primary corner insulation wall and firmly fix the upper block UB, and the first, second, third, and fourth unit barrier fixing members 21*b*1, 21*b*2, 21*b*3, and 21*b*4 in the embodiment are disposed on the one primary inner plywood 31*b* having a planar upper surface, and thus the rear surface thereof is inevitably planar.

Therefore, as shown in FIG. 28, each of the first, second, third, and fourth unit barrier fixing members 21*b*1, 21*b*2, 21*b*3, and 21*b*4 may be installed on the primary corner insulation wall 3*b* using a plurality of coupling members 211*b* provided on the rear surface thereof. The coupling member 211*b* may be formed of a stud bolt and a nut.

Hereinafter, an assembling process of fixing the first inner fixing unit 3*b*1 and the second inner fixing unit 3*b*2 included in the integrated upper block UUB using each of the first, second, third, and fourth unit barrier fixing members 21*b*1, 21*b*2, 21*b*3, and 21*b*4 will be described. Since each of the first, second, third, and fourth unit barrier fixing members 21*b*1, 21*b*2, 21*b*3, and 21*b*4 is formed identically, the first unit barrier fixing member 21*b*1 will be described below as an example.

A primary assembling process completes the assembling of the first and second inner fixing units 3*b*1 and 3*b*2 after bonding the primary outer plywoods 33*b* of the first and second inner fixing units 3*b*1 and 3*b*2 having a plurality of first holes 81 to outer side surfaces of the primary corner insulating materials 32*b* of the first and second inner fixing units 3*b*1 and 3*b*2 having a plurality of second holes 82 and bonding the primary inner plywoods 31*b* of the first and second inner fixing units 3*b*1 and 3*b*2 having a plurality of third holes 83 to inner side surfaces of the primary corner insulating materials 32*b* having the plurality of second holes 82 and inserts the corner inner packing material 3*b*8 into the spatial portion between the first and second inner fixing units 3*b*1 and 3*b*2. Here, in a secondary assembling process to be described below, the corner inner packing material 3*b*8 may fix the first and second inner fixing units 3*b*1 and 3*b*2 using the coupling member 211*b* that are in a state of being compressively installed, thereby maintaining the positive (+) tolerance.

Here, the first, second, and third holes 81, 82, and 83 may be formed on an extension line of the position corresponding to each of the plurality of coupling members 211*b* provided on the first unit barrier fixing member 21*b*1. The first and second holes 81 and 82 may have a hole shape in which the primary outer plywood 33*b* and the primary corner insulating material 32*b* may communicate with each other by bonding and may be sealed by inserting a foam plug 9 into the communicating holes, and the third hole 83 may be formed in a size in which the coupling member 211*b* may be inserted.

In the secondary assembling process, the first unit barrier fixing member 21*b*1 is in close contact with the upper surface of the primary inner plywood 31*b* so that the plurality of coupling members 211*b* are inserted into the plurality of third holes 83 formed in the primary inner plywood 31*b* in the state in which the primary outer plywood 33*b*, the primary corner insulating material 32*b*, and the primary inner plywood 31*b* are bonded.

A tertiary assembling process fastens the coupling members 211b with bolts through the communicating holes formed by the plurality of first and second holes 81 and 82 so that the first unit barrier fixing member 21b1 is fixed to the upper surface of the primary inner plywood 31b.

A quaternary assembling process inserts the foam plugs 9 into the communicating holes formed by the plurality of first and second holes 81 and 82 in the state in which the first unit barrier fixing member 21b1 is fixed to the primary inner plywood 31b. Here, the foam plug may have a size corresponding to the communicating hole and may be made of a material that is the same as or similar to that of the primary corner insulating material 32b.

Then, the assembling process of the integrated upper bock UUB is finished after inserting the inner bent portion 3b3 having the reduced size into the corner spatial portion between the primary inner fixing unit 3b1 and the second inner fixing unit 3b2 formed by the structure in which primary outer plywood 33b, the primary corner insulating material 32b, and the primary inner plywood 31b are bonded.

As described above, the integrated upper block UUB in the embodiment has a structure in which the primary outer plywood 33b having the plurality of first holes 81, the primary corner insulating material 32b having the plurality of second holes 82, and the primary inner plywood 31b having the plurality of third holes 83 are first bonded and then the first, second, third, and fourth unit barrier fixing members 21b1, 21b2, 21b3, and 21b4 are fastened by bolts.

In the embodiment, the inner bent portion 3b3 having the reduced size has been described as being installed at the end of the assembling process, but it goes without saying that the inner bent portion 3b3 may be installed between the primary assembling process and the secondary assembling process.

As shown in FIG. 28, a corner outer packing material 5b5 may be inserted and installed to the space between the primary outer fixing unit 5b1 and the second outer fixing unit 5b2, and the space may be finished with a plywood filler PF having a predetermined length.

As shown in FIG. 23, the upper connecting block UBB in the embodiment may be bonded and connected to the upper surfaces of the lower blocks LB disposed adjacent to each other to connect the lower blocks LB.

The upper connecting block UBB may be installed in the space exposed between the integrated upper block UUB, which has the single board structure in which the conventional first to fourth unit upper blocks UB1, UB2, UB3, and UB4 are integrated, and the integrated upper block UUB, which has the same structure as the above integrated upper block UBB and disposed adjacent thereto.

The upper connecting block UBB may be formed of the corner connecting insulation wall 34b disposed outside the barrier fixing member 21b.

The corner connecting insulation wall 34b of the upper connecting block UBB may be designed to withstand the external impact or the internal impact caused by the sloshing of the liquefied gas while blocking the influence of external heat together with the primary corner insulation wall 3b of the integrated upper block UUB and installed between the barrier fixing member 21b and the corner connecting barrier 42b.

As shown in FIGS. 29 and 30, the corner connecting insulation wall 34b may be provided inside each of the first surface and the second surface and may include the primary corner connecting fixing unit 34b1 and the second corner connecting fixing unit 34b2 formed in a structure in which the first corner connecting plywood 342b, the corner connecting insulating material 341b, and the second corner connecting plywood 343b are sequentially stacked outward from the barrier fixing member 21b.

In the embodiment, comparing the corner connecting insulation wall 34b of the upper connecting block UBB with the primary corner insulation wall 3b of the above-described integrated upper block UUB, the corner connecting insulation wall 34b of the upper connecting block UBB and the primary corner insulation wall 3b of the above-described integrated upper block UUB have only different reference numerals and sizes, and their configurations are the same or similar.

The corner connecting insulation wall 34b may include the corner connecting bent portion 34b3 installed in the corner spatial portion between the first corner connecting fixing unit 34b1 and the second corner connecting fixing unit 34b2 and formed of the insulating material.

As shown in FIGS. 29 and 30, since the corner connecting bent portion 34b3 in the embodiment may have a shape that is the same as or similar to that of the inner bent portion 3b3 of the primary corner insulation wall 3b, the shapes of the side surfaces of the first corner connecting fixing unit 34b1 and the second corner connecting fixing unit 34b2 may also be the same as or similar to the shapes of the side surfaces of the first and second inner fixing units 3b1 and 3b2. The corner connecting bent portion 34b3 having the reduced size may be inserted and installed to the corner space formed by the first and second corner connecting fixing units 34b1 and 34b2 having the above-described shapes of the side surfaces.

In other words, both side surfaces of the inner bent portion 34b3 that are perpendicular to the secondary barrier 4 may each have a height reduced from a total height of each of the first and second corner connecting fixing units 34b1 and 34b2, for example, the heights of both side surfaces of the corner connecting bent portion 34b3 that are in a range of 40% to 60% of the total height of each of the first and second corner connecting fixing units 34b1 and 34b2.

In addition, the corner inner packing material 34b3 may be inserted and installed to the space between the first and second corner connecting fixing members 34b1 and 34b2, and the corner inner packing material 34b4 may be the same as or similar to the corner inner packing material 3b8 inserted and installed to the space between the first and second inner fixing units 3b1 and 3b2.

In other words, comparing the upper connecting block UBB with the integrated upper block UUB, the upper connecting block UBB and the integrated upper block UUB have only different sizes in a direction horizontal to the corner side of the storage tank, and each of the corner connecting insulation wall 34b, the corner connecting bent portion 34b3, and the corner inner packing material 34b4 may be the same as or similar to the primary corner insulation wall 3b, the inner bent portion 3b3, and the corner inner packing material 3b8 in the integrated upper block UUB, and thus here, a detailed description thereof will be omitted to avoid overlapping descriptions.

Therefore, in the embodiment, not only by reducing the size of the corner connecting bent portion 34b3, it is possible to reduce the space (non-adhesive region in the corner portion between the corner connecting bent portion and the secondary barrier) in which the heat convection is generated, but also by forming the corner inner packing material 34b4 in the space between the first and second corner connecting fixing units 34b1 and 34b2, which may be a heat convection path, it is possible to further reduce the area affected by the change in temperature than in the conventional corner connecting bent portion formed at the same height as the first and second corner connecting fixing units **34*b*1 and 34*b*2**, thereby reducing the heat convection phenomenon.

In addition, in the embodiment, by inserting the corner inner packing material **34*b*4 into the corner connecting bent portion 34*b*3 at a predetermined depth, it is possible to further reduce the heat convection phenomenon in the corner connecting bent portion 34*b*3**.

As shown in FIGS. 29 and 30, the corner connecting bent portion having the reduced size in the embodiment may have second protrusions PT2 provided on both side surfaces thereof.

The second protrusion PT2 may extend outward from the corner spatial portion as much as a predetermined length from the corner connecting bent portion **34*b*3 inserted into the corner spatial portion formed by the first and second corner connecting fixing units 34*b*1 and 34*b*2**.

The second protrusion PT2 may have a cross-sectional shape which is similar to a shape of the corner connecting bent portion **34*b*3 and in which a curved portion, which is in contact with the corner connecting barrier 42*b* of the secondary barrier 4, collinearly extends from the curved portion of the corner connecting bent portion 34*b*3 and extend to form second steps ST2 between both side surfaces that are perpendicular to the corner connecting barrier 42*b* of the secondary barrier 4 and both side surfaces of the corner connecting bent portion 34*b*3**.

In other words, by forming the second protrusion PT2 in the embodiment smaller than the size of the corner connecting bent portion **34*b*3 and forming the second protrusion PT2 having the second step ST2 with the corner connecting bent portion 34*b*3, it is possible to form a curved heat convection path by the second step ST2**, thereby preventing the heat convection phenomenon, which will be described below.

The second protrusion PT2 provided on the corner connecting bent portion **34*b*3 may be the same as or similar to the first protrusion PT1 provided on the inner bent portion 3*b*3, and as shown in FIGS. 23 and 24, when the upper connecting block UBB is installed between the adjacent integrated upper blocks UUB, the second protrusion PT2 may be in contact with the first protrusion PT2, and step spaces may be formed between the first and second inner fixing units 3*b*1 and 3*b*2 and the first and second corner connecting fixing units 34*b*1 and 34*b*2 by the first and second protrusions PT1 and PT2**.

In the embodiment, the process is finished with a stuffing piece SP in order to prevent the heat convection phenomenon caused through the step spaces formed by the first and second protrusions PT1 and PT2.

As shown in FIGS. 23 and 24, the stuffing piece SP may be inserted into the step spaces formed by the second protrusions PT2 provided on the corner connecting bent portion **34*b*3 and the first protrusions PT1 provided on the inner bent portion 3*b*3**.

The stuffing piece SP may have a shape corresponding to a shape of the step space, may be made of a material that is the same as or similar to that of the inner bent portion **3*b*3 or the corner connecting bent portion 34*b*3**, for example, low-density polyurethane foam, and may also be formed of the vacuum insulating material using glass wool as a main raw material.

In addition, when the step spaces formed by the first and second protrusions PT1 and PT2 are, for example, 20 mm, the stuffing piece SP may be formed with a thickness of 30 mm to seal the step spaces.

In a state in which the stuffing piece SP is inserted, heat convection paths formed on both side surfaces of the stuffing piece SP and heat convection paths formed on portions in which the first and second protrusions PT1 and PT2 are in contact with each other become curved paths.

Therefore, in the embodiment, by providing the first protrusions PT1 on the inner bent portion **3*b*3 having the reduced size, providing the second protrusions PT2 on the corner connecting bent portion 34*b*3 having the reduced size, and finishing the step spaces formed by the first and second protrusions PT1 and PT2** with the stuffing piece SP, the heat convection paths formed between the integrated upper block UUB and the upper connecting block UBB may become the curved paths by the protruding structure and the stuffing piece SP, thereby reducing the heat convection phenomenon.

Meanwhile, in a state in which the temperature of the primary barrier 2 was −196° C. and the temperature of the hull 7 was 10° C., as a result of computational fluid dynamics (CFD) analysis for a case in which the inner bent portion **3*b*3 and the corner connecting bent portion 34*b*3, which had the reduced sizes, were applied as in the embodiment and a case in which the inner bent portion 3*b*3 and the corner connecting bent portion 34*b*3, which had current sizes, in the embodiment, a heat flux was 8.73 $W/m^2$, the average temperature of the secondary barrier 4 was −90.15° C., and the average temperature of the hull 7 was 8.79° C., and in the conventional case, the heat flux was 12.95 $W/m^2$, the average temperature of the secondary barrier 4 was −145.19° C., and the average temperature of the hull 7** was 8.2° C. In view of the results, it can be seen that the embodiment is superior to the conventional case.

In addition, when the upper connecting block UBB in the embodiment is bonded and connected to the upper portion of the secondary corner barrier **41*b* with the adhesive 10, it is necessary to provide the squeeze-out checking device which can check the squeeze-out of the adhesive 10**.

In the embodiment, as shown in FIGS. 24, 29, and 31, when the second corner connecting plywood **343*b* is bonded on the secondary barrier 4 with the adhesive 10, as the device for checking the squeeze-out of the adhesive 10 into the non-adhesive region, a second groove GV2 may be formed in the second corner connecting plywood 343*b*** in the upper connecting block UBB.

The second groove GV2 may be formed in the second corner connecting plywood **343*b*, which is the adhesive region, in a direction horizontal to the corner side of the storage tank and formed in a portion adjacent to a rear edge of the second corner connecting plywood 343*b* to check the squeeze-out of the adhesive 10 by the corner connecting bent portion 34*b*3**, which is the non-adhesive region.

Therefore, in the embodiment, by forming the second groove GV2 in the second corner connecting plywood **343*b* in the upper connecting block UBB connected to the corner connecting barrier 42*b* in the direction horizontal to the corner side of the liquefied storage tank and forming the second groove GV2 in the portion adjacent to the rear edge of the second corner connecting plywood 343*b*, which is the adhesive region, it is possible to not only directly and visually check the squeeze-out of the adhesive 10 into the corner connecting bent portion 34*b*3, which is the non-adhesive region, but also prevent a load applied to the secondary barrier 4 from being further increased by a non-adhesive section of the corner portion reduced as the adhesive 10 is squeezed out and bonded and connected to the non-adhesive section over the second groove GV2**, thereby preventing the bonding defect of the upper connecting block UBB.

Figure 34A:
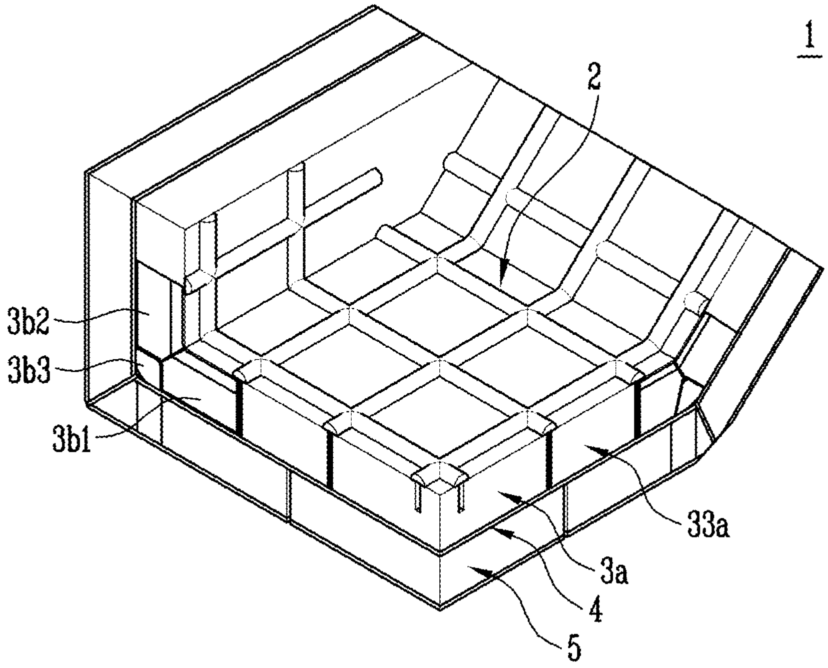
FIGS. 34 to 37 are views showing a comparison of convection paths, which vary depending on structures of primary corner insulation walls and corner connecting insulation walls in the liquefied gas storage tank according to the tenth embodiment of the present invention and a liquefied gas storage tank according to a comparative example, and temperature of the secondary barriers.
Figure 34B:
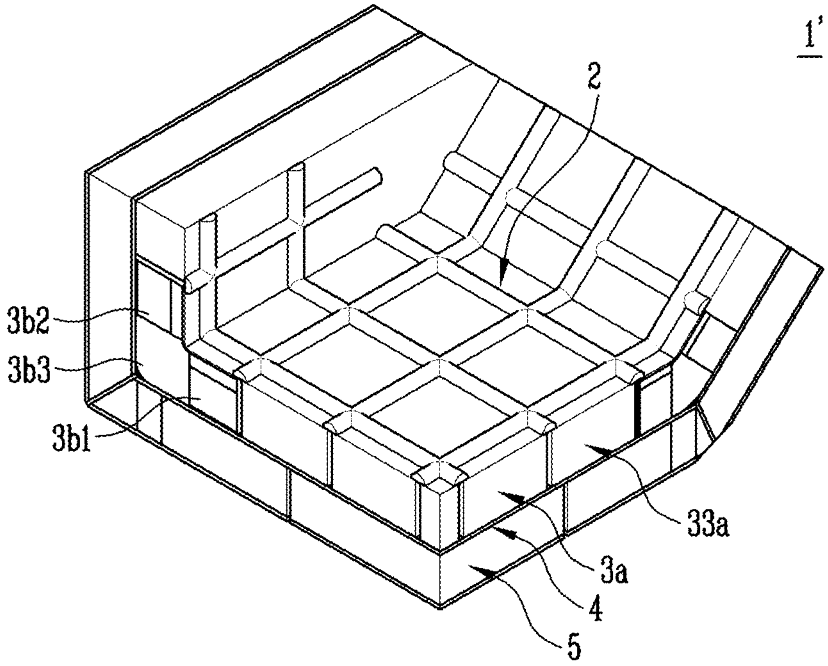

Hereinafter, a comparison of convection paths that vary depending on the structures of the corner blocks CB and temperature differences caused by the convection paths in the liquefied gas storage tank 1 according to the embodiment and the liquefied gas storage tank 1' according to the comparative example will be described with reference to FIGS. 34 to 37. Here, FIG. 34A shows that the corner block CB in the liquefied gas storage tank 1 according to the embodiment is applied, and FIG. 34B shows that the corner block CB in the liquefied gas storage tank 1' according to the comparative example is applied.

The liquefied gas storage tank 1' according to the comparative example may be, for example, the liquefied gas storage tank in the above-described ninth embodiment shown in FIG. 18.

In the liquefied gas storage tank 1 according to the embodiment and the liquefied gas storage tank 1' according to the comparative example, the primary flat insulation walls 3*a* having the same structure or different structures may be applied, but hereinafter, a comparison of the convection paths due to a structural difference of the corner block CB and the temperature differences caused by the convection paths will be described regardless of the structure of the primary flat insulation wall 3*a*.

Figure 35A:
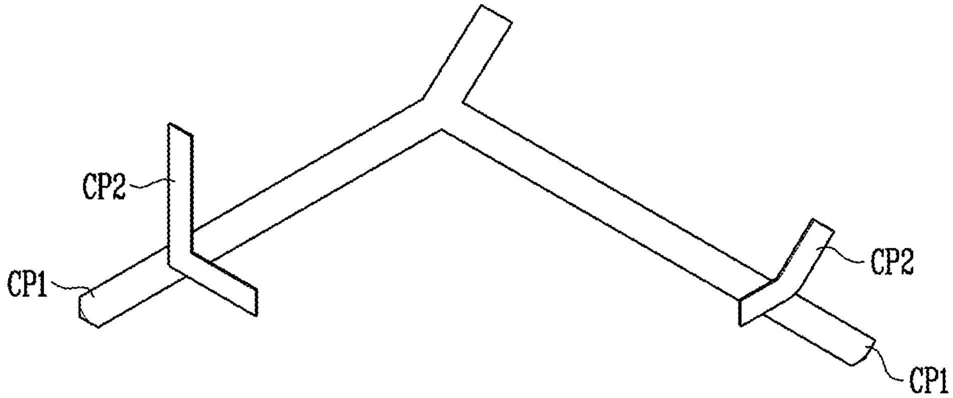
Figure 36:
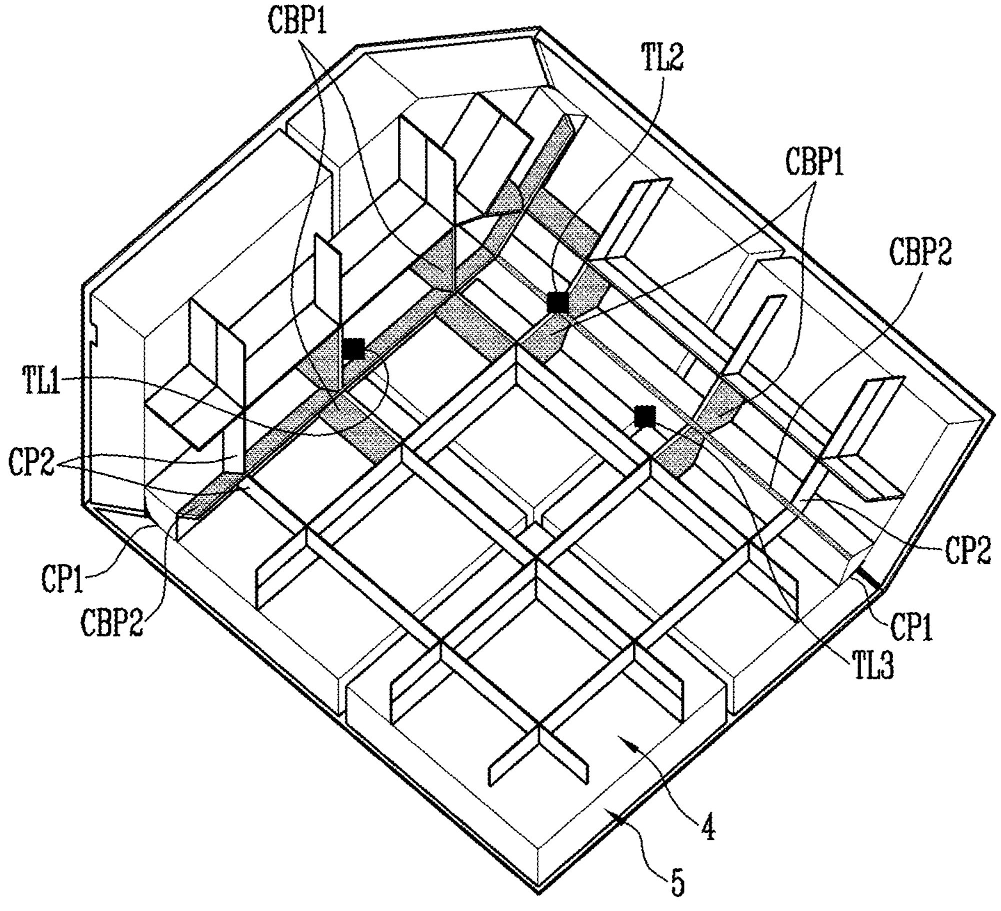

FIGS. 35A and 36 show first and second convection paths CP1 and CP2 and first and second convection blocking paths CBP1 and CBP2 in the liquefied gas storage tank 1 according to the embodiment.

The first convection path CP1 is a path corresponding to the non-adhesive region between the inner bent portion 3*b*3 formed at the height that is half the total height of each of the first and second inner fixing units 3*b*1 and 3*b*2 and the secondary barrier 4 and between the corner connecting bent portion 34*b*3 formed at the height that is half the total height of each of the first and second connecting fixing units 34*b*1 and 34*b*2 and the secondary barrier 4.

The second convection path CP2 is a path corresponding to the upper slit SL1 formed at the depth corresponding to the length that is half the thickness of the primary corner insulation wall 3*b*.

The first convection blocking path CBP1 is a blocking path corresponding to the stiffing piece SP inserted into the step space formed by the first protrusion PT1 provided on the inner bent portion 3*b*3 and the second protrusion PT2 provided on the corner connecting bent portion 34*b*3.

The second convection blocking path CBP2 is a blocking path corresponding to the corner inner packing materials 3*b*8 and 34*b*4 inserted into the spaces between the first and second inner fixing units 3*b*1 and 3*b*2 and the first and second corner fixing units 34*b*1 and 34*b*2.

Figure 35B:
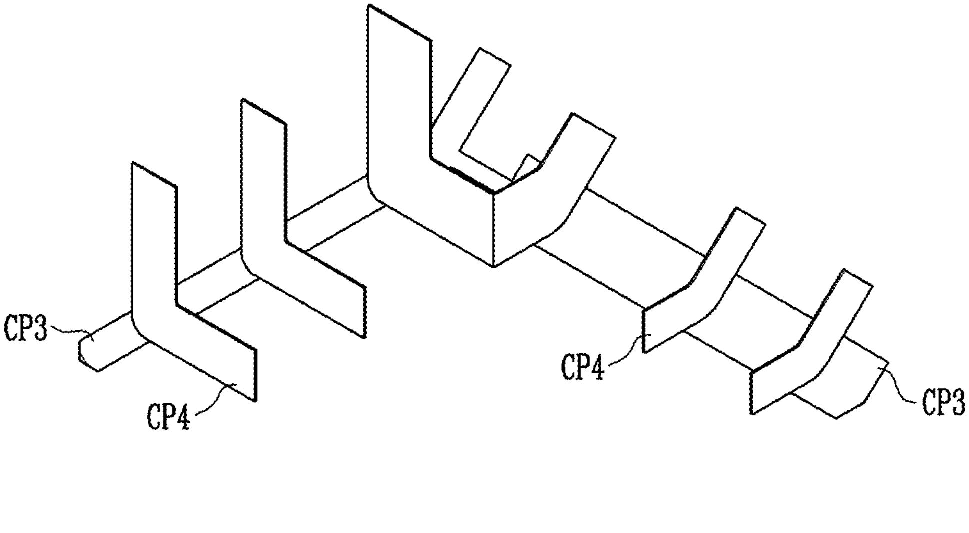

FIG. 35B shows third and fourth convection paths CP3 and CP4 in the liquefied gas storage tank 1' according to the comparative example.

The third convection path CP3 is a path corresponding to the non-adhesive region between the inner bent portion 3*b*3 formed at the same height as the total height of each of the first and second inner fixing units 3*b*1 and 3*b*2 and the secondary barrier 4 and between the corner connecting bent portion 34*b*3 formed at the same height as the total height of each of the first and second corner connecting fixing units 34*b*1 and 34*b*2 and the secondary barrier 4.

As shown in FIGS. 34, 35, and 36, it can be seen that convection regions of the first and second convection paths CP1 and CP2 in the liquefied gas storage tank 1 according to the embodiment are smaller than those of the third and fourth convection paths CP3 and CP4 in the liquefied gas storage tank 1' according to the comparative example.

In addition, as shown in FIG. 35B, the convection is generated between the upper primary barrier 2 and the lower secondary barrier 4 in the liquefied gas storage tank 1' according to the comparative example, but as shown in FIG. 35A, the convection is blocked by the corner inner packing material 3*b*8 in the liquefied gas storage tank 1 according to the embodiment, and thus the temperature is less reduced in the secondary barrier 4 of the liquefied gas storage tank 1 according to the embodiment than in the liquefied gas storage tank 1' according to the comparative example.

The temperature difference also occurs in the secondary barrier 4 of each of the liquefied gas storage tank 1 according to the embodiment and the liquefied gas storage tank 1' according to the comparative example due to the difference in the convection paths.

As temperature measurement conditions, in a state in which the temperature of the primary barrier 2 was −196° C. and the temperature of the hull 7 was 10° C., the temperature was measured while changing positions of first, second, and third temperature sensors TL1, TL2, and TL3, and although not shown, the temperature was also measured by attaching the temperature sensors to the same positions in the liquefied gas storage tank 1' according to the comparative example.

Figure 37A:
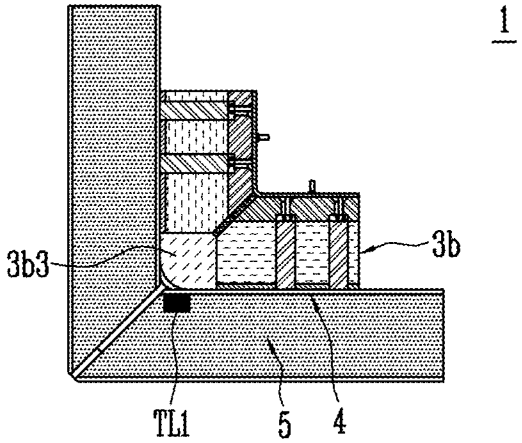

As shown in FIGS. 36 and 37A, at the position where the first temperature sensor TL1 was attached, the liquefied gas storage tank 1 according to the embodiment was measured as −43.4° C., and the liquefied gas storage tank 1' according to the comparative example was measured as −130.1° C.

Figure 37B:
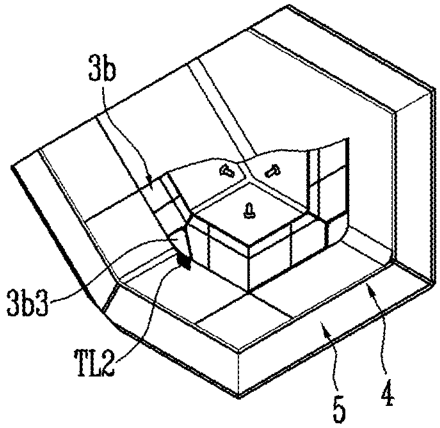

As shown in FIGS. 36 and 37B, at the position where the second temperature sensor TL2 was attached, the liquefied gas storage tank 1 according to the embodiment was measured as −66.5° C., and the liquefied gas storage tank 1' according to the comparative example was measured as −154.6° C.

Figure 37C:
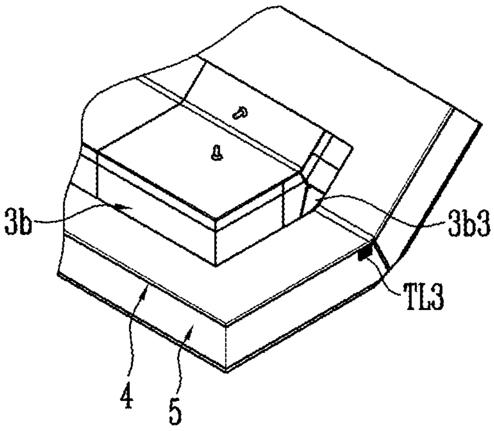

As shown in FIGS. 36 and 37C, at the position where the third temperature sensor TL3 was attached, the liquefied gas storage tank 1 according to the embodiment was measured as −80.3° C., and the liquefied gas storage tank 1' according to the comparative example was measured as −164.7° C.

It can be seen that these results are due to narrower and smaller convection path in the liquefied gas storage tank 1 according to the embodiment than in the liquefied gas storage tank 1' according to the comparative example.

The present invention is not limited to the above-described embodiments and may include a combination of the embodiments or a combination of at least any one of the embodiments and a known technology as another embodiment.

Although the present invention has been described above in detail through specific embodiments, this is to specifically describe the present invention, the present invention is not limited thereto, and it will be apparent that modifications or improvements thereof are possible by those skilled in the art without departing from the technical spirit of the present invention.

All simple modifications or changes of the present invention fall within the scope of the present invention, and the specific scope of the present invention will be clarified by the appended claims.

[Description of reference numerals]

| | |
|---|---|
| 1: liquefied gas storage tank | 2: primary barrier |
| 2a: primary flat barrier | 2b: primary corner barrier |
| 21b: barrier fixing member | 21b1: first unit barrier fixing member |
| 21b2: second unit barrier fixing member | |
| 21b3: third unit barrier fixing member | |
| 21b4: fourth unit barrier fixing member | 211b: coupling member |
| 3: primary insulation wall | 3a: primary flat insulation wall |
| 31a: primary flat plywood | 32a: primary flat insulating material |
| 33a: flat connecting insulation wall | 331a: flat connecting plywood |
| 332a: flat connecting insulating material | 3b: primary corner insulation wall |
| 3b1: first inner fixing unit | 3b2: second inner fixing unit |
| 31b: primary inner plywood | 32b: primary corner insulating material |
| 33b: primary outer plywood | 3b12: inner intermediate fixing unit |
| 31b12: inner intermediate plywood | |
| 32b12: corner intermediate insulating material | |
| 34b: corner connecting insulating material | |
| 34b1: first corner connecting fixing unit | |
| 34b2: second corner connecting fixing unit | |
| 341b: corner connecting insulating material | |
| 342b: first corner connecting plywood | |
| 343b: second corner connecting plywood | |
| 34b3: corner connecting bent portion | 34b3': first corner half bent portion |
| 34b3'': second corner half bent portion | 34b4: corner inner packing material |
| 3b3: inner bent portion | 3b3': first inner half bent portion |
| 3b3'': second inner half bent portion | 3b31: insulating material |
| 3b32: insulating material | 3b33: outer insulating material |
| 3b34: inner insulating material | 3b35: insulating material |
| 3b36: insulating material | 3b37: vacuum insulation panel |
| 3b4: first inner packing material | 3b5: second inner packing material |
| 3b6, 34b6: first bonding unit | 3b7, 34b7: second bonding unit |
| 3b8, 34b8: first and second corner inner packing materials | |
| 4: secondary barrier | |
| 41a: secondary flat barrier | 42a: flat connecting barrier |
| 41b: secondary corner barrier | 42b: corner connecting barrier |
| 5: secondary insulation wall | 5a: secondary flat insulation wall |
| 51a: secondary flat insulating material | 52a: secondary flat plywood |
| 5b: secondary corner insulation wall | 5b1: first outer fixing unit |
| 5b2: second outer fixing unit | 51b: secondary inner plywood |
| 51b1: nearby plywood | 51b2: inclined plywood |
| 52b: secondary corner insulating material | 53b: secondary outer plywood |
| 5b12: outer intermediate fixing unit | 51b12: outer intermediate plywood |
| 52b12: outer intermediate insulating material | |
| 53b12: inner intermediate insulating material | |
| 5b3: outer bent portion | 5b31: insulating material |
| 5b32: insulating material | 5b4: outer packing material |
| 5b5: corner outer packing material | 6: mastic |
| 7: hull | 81: first hole |
| 82: second hole | 83: third hole |
| 9: foam plug | 10: adhesive |
| CB: corner block | CBP1: first convection blocking path |
| CBP2: second convection blocking path | CP1: first convection path |
| CP2: second convection path | CP3: third convection path |
| CP4: fourth convection path | CF1: first chamfer |
| CF2: second chamfer | ED: direction of division |
| GV1: first groove | GV2: second groove |
| LB: lower block | PF: plywood filler |
| PT1: first protrusion | PT2: second protrusion |
| SH: insertion groove | SL1: upper slit |
| SL2: lower slit | SP: stuffing piece |
| UB: upper block | UB1: first unit upper block |
| UB2: second unit upper block | UB3: third unit upper block |
| UB4: fourth unit upper block | UBB: upper connecting block |
| UUB: integrated upper block | ST1: first step |
| ST2: second step | SS: step space |
| TL1: first temperature sensor | TL2: second temperature sensor |
| TL3: third temperature sensor | |

The invention claimed is:

1. A liquefied gas storage tank comprising a corner block that is disposed on a corner portion in which a first surface and a second surface at different angles meet each other and forms a storage space accommodating liquefied gas, wherein the corner block includes a lower block provided inside the first and second surfaces and formed of a single board, an upper block bonded and connected to a secondary barrier of the lower block, and an upper connecting block bonded and connected to the secondary barrier on an upper surface of the lower block disposed adjacent thereto to connect the lower block, the upper block includes a first inner fixing unit and a second inner fixing unit respectively provided inside the first surface and the second surface, bonded and connected to the secondary barrier, and each having a structure in which a primary inner plywood, a primary corner insulating material, and a primary outer plywood are stacked, and an inner bent portion installed at a corner spatial portion between the first inner fixing unit and the second inner fixing unit, wherein the secondary barrier extends laterally and outwardly beyond the primary outer plywood, and the inner bent portion has two side surfaces that are perpendicular to the secondary barrier, each side surface has a height reduced from a total height of each of the first and second inner fixing units.

2. The liquefied gas storage tank of claim 1, wherein the inner bent portion has first protrusions provided on both side surfaces, and a first protrusion extends outward from the corner spatial portion as much as a predetermined length from the inner bent portion inserted into the corner spatial portion formed by the first and second inner fixing units, the first protrusion has a cross-sectional shape which is similar to a shape of the inner bent portion and in which a curved portion, which is in contact with the secondary barrier, collinearly extends from a curved portion of the inner bent portion, and the first protrusion extends to form first steps between both side surfaces perpendicular to the secondary barrier and both side surfaces of the inner bent portion.

3. The liquefied gas storage tank of claim 2, wherein the upper connecting block includes:

a first corner connecting fixing unit and a second corner connecting fixing unit respectively provided inside the first surface and the second surface, bonded and connected to the secondary barrier, and each having a structure in which a first corner connecting plywood, a corner connecting insulating material, and a second corner connecting plywood are stacked; and a corner connecting bent portion installed in a corner spatial portion between the first corner connecting fixing unit and the second corner connecting fixing unit, wherein the corner connecting bent portion has two side surfaces that are perpendicular to the secondary barrier, each side surface has a height reduced from a total height of each of the first and second corner connecting fixing units, second protrusions are provided on both side surfaces, and a second protrusion extends outward from the corner spatial portion as much as a predetermined length from the corner connecting bent portion inserted into the corner spatial portion formed by the first and second corner connecting fixing units, the second protrusion has a cross-sectional shape which is similar to a shape of the corner connecting bent portion and in which a curved portion, which is in contact with the secondary barrier, collinearly extends from a curved portion of the corner connecting bent portion, and the second protrusion extends to form second steps between both side surfaces that are perpendicular to the secondary barrier and both side surfaces of the corner connecting bent portion.

4. The liquefied gas storage tank of claim 3, wherein the first and second protrusions are in contact with each other when the upper connecting block is installed between adjacent upper blocks, and step spaces are formed between the first and second inner fixing units and the first and second corner connecting fixing units, a stuffing piece is inserted and installed in a step space, and the stuffing piece has a positive (+) tolerance to seal the step space and is formed in a shape corresponding to a shape of the step space.

5. The liquefied gas storage tank of claim 1, wherein the first and second inner fixing units are symmetrically provided with respect to a direction in which the corner portion is equally divided, and have first side surfaces that are in close contact with both side surfaces of the inner bent portion and perpendicular to the secondary barrier and second side surfaces that extend from the first side surfaces toward the storage space in the same direction as the direction of the division, the upper block further includes a corner inner packing material inserted and installed in spaces formed between the first side surfaces in close contact with both side surfaces of the inner bent portion and between the second side surfaces facing each other, and the corner inner packing material is formed to have a positive (+) tolerance to seal the space in a state of being inserted into the space between the second side surfaces.

6. A liquefied gas storage tank comprising a corner block that is disposed on a corner portion in which a first surface and a second surface at different angles meet each other and forms a storage space accommodating liquefied gas, wherein the corner block includes a lower block provided inside the first surface and the second surface and formed of a single board, an integrated upper block bonded and connected to a secondary barrier of the lower block and formed of a single board, an upper connecting block bonded and connected to the secondary barrier exposed between the integrated upper block disposed adjacent to each other, and a barrier fixing member installed on an upper surface of the integrated upper block and configured to fix a primary barrier, the integrated upper block includes one primary outer plywood provided inside each of the first surface and the second surface and bonded and connected to the secondary barrier, wherein the secondary barrier extends laterally and outwardly beyond the primary outer plywood, one primary corner insulating material stacked on the primary outer plywood, and one primary inner plywood stacked on the primary corner insulating material, and the barrier fixing member is formed of a plurality of unit barrier fixing members side by side installed adjacent to each other on the one primary inner plywood.

7. The liquefied gas storage tank of claim 6, wherein the integrated upper block includes a plurality of upper slits formed in an upper portion thereof at a predetermined depth, and the plurality of upper slits pass through the primary inner plywood and are formed to at least a portion of the primary corner insulating material in order to cope with contraction or expansion stress of the primary corner insulating material, and are formed at corresponding positions between the plurality of unit barrier fixing members so that the plurality of unit barrier fixing members interlock with contraction or expansion of the primary corner insulating material.

8. The liquefied gas storage tank of claim 7, wherein the primary outer plywood has a plurality of first grooves formed in a lower surface bonded and connected to the secondary barrier, the plurality of first grooves are formed in a direction perpendicular to a corner side of the storage tank to check a squeeze-out of an adhesive into a non-adhesive region when the primary outer plywood is bonded on the secondary barrier with the adhesive, the non-adhesive region is provided as a plurality of non-adhesive regions set at intermediate portions in addition to both side edge portions of the primary outer plywood, and each of the plurality of non-adhesive regions is set at a predetermined distance and width in the direction perpendicular to the corner side of the storage tank and set at a corresponding position between the plurality of unit barrier fixing members.

9. The liquefied gas storage tank of claim 8, wherein the plurality of first grooves are formed along both side boundary portions of the plurality of non-adhesive regions and disposed to be misaligned with the plurality of upper slits.

10. The liquefied gas storage tank of claim 6, wherein the integrated upper block includes a plurality of upper slits formed in an upper portion thereof at a predetermined depth, and a plurality of lower slits formed in a lower portion thereof at a predetermined depth, wherein the plurality of upper slits and the plurality of lower slits are formed at positions that are misaligned.

11. A liquefied gas storage tank comprising a corner block that is disposed on a corner portion in which a first surface and a second surface at different angles meet each other and forms a storage space accommodating liquefied gas, wherein the corner block includes a lower block provided inside the first and second surfaces and formed of a single board, an upper block bonded and connected to a secondary barrier of the lower block, and an upper connecting block bonded and connected to the secondary barrier on an upper surface of the lower block disposed adjacent thereto to connect the lower block, the upper connecting block includes a first corner connecting fixing unit and a second corner connecting fixing unit respectively provided inside the first surface and the second surface, bonded and connected to the secondary barrier, and each having a structure in which a first corner connecting plywood, a corner connecting insulating material, and a second corner connecting plywood are stacked, wherein the secondary barrier extends laterally and outwardly beyond the first corner connecting plywood, and a corner connecting bent portion installed in a corner spatial portion between the first corner connecting fixing unit and the second corner connecting fixing unit, wherein the corner connecting bent portion has two side surfaces that are perpendicular to the secondary barrier, each side surface has a height reduced from a total height of each of the first and second corner connecting fixing units.

12. The liquefied gas storage tank of claim 11, wherein the corner connecting bent portion has second protrusions provided on both side surfaces, and a second protrusion extends outward from the corner spatial portion as much as a predetermined length from the corner connecting bent portion inserted into the corner spatial portion formed by the first and second corner connecting fixing units, the second protrusion has a cross-sectional shape which is similar to a shape of the corner connecting bent portion and in which a curved portion, which is in contact with the secondary barrier, collinearly extends from a curved portion of the corner connecting bent portion, and the second protrusion extends to form second steps between both side surfaces that are perpendicular to the secondary barrier and both side surfaces of the corner connecting bent portion.

13. The liquefied gas storage tank of claim 11, wherein the first and second corner connecting fixing units are symmetrically provided with respect to a direction in which the corner portion is equally divided, and have first side surfaces that are in close contact with both side surfaces of the corner connecting bent portion and perpendicular to the secondary barrier and second side surfaces that extend from the first side surfaces toward the storage space in the same direction as the direction of the division, the upper connecting block further includes a corner inner packing material inserted and installed in spaces formed between the first side surfaces in close contact with both side surfaces of the corner connecting bent portion and between the second side surfaces facing each other, and the corner inner packing material is formed to have a positive (+) tolerance to seal the space in a state of being inserted into the space between the second side surfaces.

14. The liquefied gas storage tank of claim 11, wherein the second corner connecting plywood has a second groove formed in a lower surface bonded and connected to the secondary barrier, and the second groove is formed in a direction horizontal to a corner side of the storage space to check a squeeze-out of an adhesive into a non-adhesive region when the second corner connecting plywood is bonded on the secondary barrier with the adhesive.

15. The liquefied gas storage tank of claim 14, wherein the second groove is formed in a portion adjacent to a rear edge of the second corner connecting plywood to check the squeeze-out of the adhesive into the corner connecting bent portion that is the non-adhesive region.

* * * * *